US012753023B2

(12) United States Patent
Cristoforetti et al.

(10) Patent No.: US 12,753,023 B2
(45) Date of Patent: Oct. 6, 2026

(54) CONVEYOR, SYSTEM AND PROCESS FOR HANDLING ITEMS

(71) Applicant: MECHANICA SISTEMI S.r.l., Paderno Dugnano (IT)

(72) Inventors: Giorgio Cristoforetti, Varese (IT); Luis Kewin Gonzalez Gonzalez, Paderno Dugnano (IT); Kavinda Pradeep Herath Herath Mudiyanselage, Milan (IT)

(73) Assignee: MECHANICA SISTEMI S.r.l., Paderno Dugnano (IT)

( * ) Notice: Subject to any disclaimer, the term of this patent is extended or adjusted under 35 U.S.C. 154(b) by 178 days.

(21) Appl. No.: 18/739,158

(22) Filed: Jun. 10, 2024

(65) Prior Publication Data

US 2024/0417187 A1 Dec. 19, 2024

(30) Foreign Application Priority Data

| | | |
|---|---|---|
| Jun. 13, 2023 | (IT) | 102023000012084 |
| Oct. 16, 2023 | (IT) | 102023000021525 |
| Feb. 8, 2024 | (IT) | 102024000002665 |
| Feb. 29, 2024 | (IT) | 102024000004471 |

(51) Int. Cl.

| | |
|---|---|
| ***B65G 17/24*** | (2006.01) |
| ***B65G 47/32*** | (2006.01) |
| ***B65G 47/68*** | (2006.01) |

(52) U.S. Cl.
CPC ............ *B65G 47/32* (2013.01); *B65G 17/24* (2013.01); *B65G 2201/02* (2013.01)

(58) Field of Classification Search
CPC ........ B65G 17/24; B65G 47/32; B65G 47/68; B65G 2201/02
USPC ........................................................ 198/418.7
See application file for complete search history.

(56) References Cited

U.S. PATENT DOCUMENTS

| | | | | |
|---|---|---|---|---|
| 4,232,778 A | | 11/1980 | Rysti | |
| 4,614,264 A | | 9/1986 | Fishburne | |
| 5,069,440 A | | 12/1991 | Lazzarotti | |
| 5,222,586 A | | 6/1993 | Ydoate et al. | |
| 5,701,989 A | | 12/1997 | Boone et al. | |
| 5,950,800 A | * | 9/1999 | Terrell | B65G 47/1492 198/452 |

(Continued)

FOREIGN PATENT DOCUMENTS

| | | |
|---|---|---|
| AU | 5 629 380 A | 9/1981 |
| CN | 113 184 270 A | 7/2021 |

(Continued)

OTHER PUBLICATIONS

European Apln 24180907.8, Search Report (Oct. 15, 2024)(10 pages).

(Continued)

*Primary Examiner* — Douglas A Hess
(74) *Attorney, Agent, or Firm* — Nixon & Vanderhye P.C.

(57) ABSTRACT

A conveyor configured including a de-stratifying module having a first sector with an upper surface receiving items and a second sector with an upper surface receiving, wherein the second sector is consecutive to the first sector; a sorter moving items and sorter is consecutively to the de-stratifying module; a converging module moving items and is consecutive to the sorter; a descent connecting the sorter with the converging module.

16 Claims, 18 Drawing Sheets

(56) References Cited

U.S. PATENT DOCUMENTS

| | | | | | |
|---|---|---|---|---|---|
| 6,259,967 | B1 | 7/2001 | Hartlepp et al. | | |
| 6,401,936 | B1 * | 6/2002 | Isaacs | B65G 43/08 | 198/367.1 |
| 6,412,621 | B1 * | 7/2002 | De Vree | B65G 47/5145 | 198/347.4 |
| 6,609,607 | B2 * | 8/2003 | Woltjer | B65G 47/71 | 198/457.03 |
| 6,690,995 | B2 * | 2/2004 | Prutu | G01G 19/005 | 198/572 |
| 7,816,617 | B2 * | 10/2010 | Bennett | B07C 3/02 | 198/370.01 |
| 9,038,810 | B2 * | 5/2015 | Schroader | B65G 47/682 | 198/407 |
| 9,624,043 | B2 * | 4/2017 | Koetje | B07C 5/16 | |
| 10,246,267 | B2 | 4/2019 | Ragan | | |
| 10,450,146 | B2 * | 10/2019 | Kim | B65G 47/49 | |
| 10,640,302 | B2 * | 5/2020 | German | B65G 47/844 | |
| 10,815,068 | B2 | 10/2020 | Daboub | | |
| 10,988,327 | B1 * | 4/2021 | Layne | B65G 47/5181 | |
| 11,242,207 | B2 * | 2/2022 | Schroader | B65G 39/18 | |
| 12,151,895 | B1 * | 11/2024 | McGrath | B65G 11/083 | |
| 2003/0141165 | A1 | 7/2003 | Reznik et al. | | |
| 2010/0300836 | A1 | 12/2010 | Fourney et al. | | |
| 2019/0225432 | A1 | 7/2019 | Grant et al. | | |
| 2020/0041568 | A1 | 2/2020 | Oehler | | |

FOREIGN PATENT DOCUMENTS

| | | | | |
|---|---|---|---|---|
| DE | 69313905 | T2 | 1/1998 | |
| EP | 1 345 822 | B1 | 6/2005 | |
| EP | 2072423 | B1 | 6/2011 | |
| EP | 3115322 | A1 | 1/2017 | |
| EP | 4134340 | A1 | 2/2023 | |
| FR | 1389571 | A | 2/1965 | |
| FR | 2105540 | A7 | 4/1972 | |
| JP | H01150617 | A | 6/1989 | |
| WO | 9903765 | A1 | 1/1999 | |
| WO | 2004039706 | A1 | 5/2004 | |
| WO | 2020041458 | A1 | 2/2020 | |
| WO | 2020041568 | A1 | 2/2020 | |
| WO | WO-2023048032 | A1 * | 3/2023 | B65G 47/31 |
| WO | 2023058446 | A1 | 4/2023 | |

OTHER PUBLICATIONS

Italian Apln 202400004471, Search Report and Opinion (Sep. 17, 2024)(11 pages).

Italian Search Report for IT 202300012084, completed Dec. 14, 2023, 9 pages.

Italian Search Report for IT202300021525, completed Apr. 9, 2024, 7 pages.

Written Opinion cited in IT 202400002665 completed Jul. 15, 2024, 7 pages.

* cited by examiner

CONVEYOR, SYSTEM AND PROCESS FOR HANDLING ITEMS

RELATED APPLICATIONS

This application incorporates by reference and claims priority to the following Italian patent applications: 102023000012084, filed Jun. 13, 2023; 102023000021525, filed Oct. 16, 2023; 102024000002665, filed Feb. 8, 2024, and 102024000004471, filed Feb. 29, 2024.

FIELD OF THE INVENTION

The present invention relates to a conveyor for handling items. In particular, the conveyor object by the present invention may be used in the industrial field, such as the mail sorting and distribution sector, the shipping sector, for handling finished or in-process items to further process stations. The present invention also relates to a process of handling items, as well as a handling system comprising said conveyor.

BACKGROUND

Handling systems suitable for transporting items are well known in both the service and industrial sectors. Indeed, many commercial and industrial activities require that a predetermined number of items arranged in bulk be sorted automatically. The equipment used to carry out such operations are known as singularizers and are, for example, used in the mail sorting and distribution sector, the shipping sector.

Known singularizers comprise a converging module consisting of a central high-friction conveyor belt flanked on either side by two respective tilted-axis roller conveyors. Downstream of the converging module a diverging is present; the diverging module consists of a central high-friction belt and two side roller conveyors designed to impart advancement motion to the items and a corresponding lateral motion away from the central belt. Singularizers equipped with a recirculation path to advancement non-singularized items back to the converging module are further known. Such a type of singularizer is described, for example, in U.S. Pat. No. 5,701,989.

A further type of singularizer is described in patent application US 2010/0300836 A1, which shows a first item alignment module followed by two converging modules, perpendicular to each other: the modules essentially define a single flat supporting surface.

The Applicant noted how the known singularizers described above are unable to ensure proper singularization of items wherein they are supplied in bulk and at least partially overlapped.

Conveyors presenting a descent tract followed by one or more ascent tracts are also known. For example, U.S. Pat. No. 6,259,967 B1 and patent application WO 2020/041458 A1 show a ramp followed by at least one conveyor. In contrast, Patent Application No. WO 2023/058446 A1, U.S. Pat. No. 5,069,440 and European patent 2 072 423 B1 show a descent conveyor belt directly feeding an ascent conveyor belt. These systems allow the conveyor to drop downward any overlapping items.

However, the Applicant noted how the latter systems generate a buildup of items between the descent and ascent tracts. This condition prevents items from being effectively de-stratified; therefore, items must be supplied to the descent tract very slowly to avoid unwanted accumulation, a condition that negatively affects the overall productivity of the conveyor.

SUMMARY

The present invention may be applied to solve at least one of the drawbacks and/or limitations of the preceding solutions.

A first embodiment of the present invention is to make available a conveyor capable of efficiently and reliably sorting a plurality of items arriving in bulk. It is then an object of the invention to make available a conveyor flexible in use, capable of quickly and reliably sorting items of different nature, shape and size. It is a further purpose of the present invention to make available a compact conveyor that is at the same time simple in construction; in particular, it is the purpose of the present invention to make available a conveyor that may provide effective handling of a plurality of items for the purpose of singularizing them quickly and in limited space.

These purposes and others, which will appear more from the description below, are achieved by a conveyor and a process of handling items according to one or more of the attached claims.

In a 1st aspect a conveyor (1) for handling items (P) is provided, said conveyor comprises at least one de-stratifying module (2) comprising at least one transport sector having an upper surface suitable for receiving in support one or more items (P). In an aspect 1bis according to the preceding aspect the at least one transport sector is configured to move one or more items along an advancement trajectory (A).

In a 2nd aspect according to any one of the preceding two aspects the at least one transport sector comprises:

- at least one first sector (3) having an upper surface (5) suitable for receiving in support one or more items,
- at least one second sector (4) having a respective upper surface (6) suitable for receiving one or more items in support.

In an aspect 2bis according to the preceding aspect the first sector (3) and the second sector (4) are configured to move a plurality of items (P) along the advancement trajectory (A). In a 3rd aspect according to the aspect 2nd or 2bis, the second sector (4) is consecutive to the first sector (3), with respect to the advancement trajectory (A) of the items along said conveyor. In a 4th aspect according to any one of aspects from 2nd to 3rd the first sector (3) and the second sector (4) are configured to move the items independently of each other.

In a 5th aspect according to any one of the aspects from 2nd to 4th the upper surface (5) of the first sector is tilted with respect to the upper surface (6) of the second sector. In a 6th aspect according to any one of the aspects from 2nd to 5th the upper surface (5) of the first sector (3) defines a support plane. In a 7th aspect according to the preceding aspect the support plane of the first sector (3) is horizontal or is configured to be tilted with respect to an ideal horizontal plane. In an 8th aspect according to the preceding aspect, the support plane of the first sector is tilted with respect to the horizontal ideal plane by a predetermined angle ($\alpha$). In a 9th aspect according to the preceding aspect the predetermined angle ($\alpha$) of inclination of the support plane of the first sector (3) is lower than 20°, optionally between 5° and 18°, even more optionally between 12° and 16°.

In a 10th aspect according to any one of aspects from 2nd to 9th, the upper surface (5) of the first sector (3) is configured to define a descent path. In an 11th aspect according to any one of the aspects from the 2nd to the 10th, the upper surface (5) of the first sector (3) defines a descent path facing the second sector (4).

In a 12th aspect according to any one of aspects from 2nd to 11th, the upper surface (6) of the second sector (4) defines a respective support plane. In a 13th aspect according to the preceding aspect the support plane of the second sector (4) is configured to be tilted with respect to an ideal horizontal plane. In a 14th aspect according to the preceding aspect, the support plane of the second sector (4) is tilted with respect to the horizontal ideal plane by a predetermined angle (β). In a 15th aspect according to the preceding aspect, the predetermined angle (β) of inclination of the support plane of the second sector (4) is greater than 5°, optionally between 10° and 30°, even more optionally between 20° and 30°.

In a 16th aspect according to any one of the preceding aspects from 2nd to 15th, the upper surface (6) of the second sector (4) is configured to define an ascent path. In a 17th aspect according to any one of the preceding aspects from 12th to 16th the support plane of the second sector (4) is tilted with respect to the support plane of the first sector (3) by an angle (γ) greater than 120°, optionally ranging from 130° to 160°; optionally the angle (γ) is measured between the upper surfaces (5, 6) of the first and second sector (3, 4) toward the support side of the items.

In an 18th aspect according to any one of the aspects from 2nd to 17th, the first sector (3) extends longitudinally between an input (3*a*) and an output (3*b*), optionally defining a length of said first sector. In a 19th aspect according to the preceding aspect, the first sector (3) is configured to move items (P) along the advancement trajectory (A) between the input (3*a*) and output (3*b*). In a 20th aspect according to any one of the preceding two aspects, the upper surface (5) of the first sector extends between said input (3*a*) and output (3*b*). In a 21st aspect according to any one of the three preceding aspects the upper surface (5) of the first sector (3) has a length defined by the distance present between said input (3*a*) and output (3*b*). In a 22nd aspect according to the preceding aspect, the length of the upper surface (5) of the first sector (3) is between 1200 and 5000 mm, optionally between 1500 and 2500 mm. In a 23rd aspect according to any one of the preceding two aspects, the length of the upper surface (5) of the first sector (3) coincides with the total length of the first sector itself.

In a 24th aspect according to any one of the preceding aspects the first sector (3) has a width, measured orthogonally to the advancement trajectory (A) of the items on the first sector (3), lower than its own length. In a 25th aspect according to the preceding aspect, the ratio between the length and the width of the upper surface (5) of the first sector (3) is greater than 1.2, optionally between 1.5 and 2.5. In a 26th aspect according to any one of the two preceding aspects above, the width of the upper surface (5) of the first sector (3) is between 700 and 2000 mm, optionally between 1000 and 1500 mm.

In a 27th aspect according to any one of the aspects from 2nd to 26th, the second sector (4) extends longitudinally between an input (4*a*) and an output (4*b*), optionally to define a length of said second sector. In a 28th aspect according to the preceding aspect, the second sector (4) is configured to move items along the advancement trajectory (A) between the input (4*a*) and output (4*b*) of the second sector (4). In a 29th aspect according to any one of the preceding two aspects, the length of the second sector (4) is greater than 600 mm, optionally between 700 mm and 2000 mm, even more optionally between 700 mm and 1200 mm.

In a 30th aspect according to any one of the aspects from 27th to 29th, the upper surface (6) has a length defined by at least one tract between the input (4*a*) and output (4*b*) of the second sector (4). In a 31st aspect according to any one of the aspects from 27th to 30th the upper surface (6) of the second sector (4) has a length defined by the distance between the input (4*a*) and the output (4*b*) of the second sector (4). In a 32nd aspect according to any one of the aspects from 27th to 30th the upper surface (6) of the second sector (4) extends in length from the output (4*b*) to an intermediate zone of said second sector (4), optionally interposed between the input (4*a*) and the output (4*b*) of said second sector (4). In a 33rd aspect according to any one of the aspects from 30th to 32nd, the length of the upper surface (6) of the second sector (4) is between 200 and 2000 mm, optionally between 400 and 1200 mm. In a 34th according to any one of the aspects from 30th to 33rd the total length of the second sector is greater than the length of the upper surface (6) of the same second sector (4). In a 35th aspect according to any one of the aspects from the 30th to the 34th, the ratio of the total length of the second sector (4) to the on upper surface (6) is greater than 1.2, optionally between 1.5 and 3.

In a 36th aspect according to any one of the aspects from 27th to 35th aspects, the upper surface of the second sector (4) has a width, optionally measured orthogonally to the advancement trajectory (A), lower than its own length. In a 37th aspect according to the preceding aspect, the ratio between the length and the width of the upper surface (6) of the second sector (4) is between 0.3 and 2. In a 38th aspect according to any one of the preceding two aspects, the width of the upper surface (6) of the second sector (4) is between 500 and 2000 mm, optionally between 700 and 1500 mm.

In a 39th aspect according to any one of the aspects from the 27th to the 38th, the ratio between the length of the first sector (3) and the length of the second sector (4) is greater than 1.1, optionally it is between 1.3 and 2. In a 40th aspect according to any one of the aspects from the 30th to the 39th, the ratio between the length of the upper surface (5) of the first sector (3) and the length of the upper surface (6) of the second sector (4) is between 0.2 and 1, optionally between 0.2 and 0.7.

In a 41st aspect according to any one of the aspects from 2nd to 40th the at least one transport sector comprises an intermediate sector (60) interposed between the first sector (3) and the second sector (4). In a 42nd aspect according to the preceding aspect the intermediate sector (60) is configured to directly receive one or more items from the first sector (3) and move one or more of said items to the second sector (4). In a 43rd aspect according to the aspect 41st or 42nd, the intermediate sector (60) is configured to move a plurality of items (P) along the advancement trajectory (A). In a 44th aspect according to any one of the aspects from 41st to 43rd the intermediate sector (60) is immediately consecutive to the first sector (3), with respect to the advancement trajectory (A). In a 45th aspect according to any one of the aspects from 41st to 44th the intermediate sector (60) is arranged immediately upstream of the second sector (4), relative to the advancement trajectory (A).

In a 46th aspect according to any one of the aspects from 41st to 45th the intermediate sector (60) is independent in movement with respect to the first sector (3) and the second sector (4). In a 47th aspect according to any one of the aspects from 41st to 46th the intermediate sector (60), the first sector (3) and the second sector (4) are configured to move items independently of each other.

In a 48th aspect according to any one of the aspects from 41st to 47th, the intermediate sector (60) has an upper surface (61) suitable for receiving in support one or more items (P).

In a 49th aspect according to the preceding aspect, the upper surface (61) of the intermediate sector (60) defines a respective support plane tilted to the support plane of the second sector (4). In a 50th aspect according to the preceding aspect the support plane of the intermediate sector (60) is horizontal. In a 51st aspect according to any one of the preceding two aspects, the support plane defined by the upper surface (61) of the intermediate sector (60) is tilted with respect to the support plane of the first sector (3) by an angle ($\theta_1$) between 150° and 175°, optionally between 160° and 170°; optionally said angle ($\theta_1$) is measured from the side of the upper surfaces (5, 61) suitable for receiving the supporting items.

In a 52nd aspect according to any one of the aspects from 49th to 51st, the support plane defined by the upper surface (61) of the intermediate sector (60) is tilted with respect to the support plane of the second sector (4) by an angle ($\theta_2$) between 140° and 170°, optionally between 150° and 160°; optionally, the angle ($\theta_2$) is measured from the side of the upper surfaces (6, 61) suitable for receiving the supporting items. In a 53rd aspect according to any one of the aspects from 48th to 52nd the upper surface (61) of the intermediate sector (60) is configured to define a flat path.

In a 54th aspect according to any one of the aspects from 41st to 53rd the intermediate sector (60) extends longitudinally between an input (60*a*) and an output (60*b*), optionally to define a length of said intermediate sector. In a 55th aspect according to the preceding aspect, the intermediate sector (60) is configured to move items (P) along the advancement trajectory (A) for at least one tract of said intermediate sector, defined between an input (60*a*) and an output (60*b*). In a 56th aspect according to any one of the preceding two aspects, the length of the intermediate sector (60) is greater than 600 mm, optionally between 700 mm and 2000 mm, even more optionally between 700 mm and 1200 mm.

In a 57th aspect according to any one of the aspects from 48th to 56th the upper surface (61) has a length defined by at least one tract between the input (60*a*) and output (60*b*) of the intermediate sector (60). In a 58th aspect according to any one of the aspects from 48th to 57th, the upper surface (61) of the intermediate sector (60) has a length defined by the distance between the input (60*a*) and the output (60*b*). In a 59th aspect according to any one of the aspects from 48th to 58th the upper surface (61) of the intermediate sector (60) extends in length from the output (60*b*) to an intermediate zone of said intermediate sector (60), optionally interposed between the input (60*a*) and the output (60*b*) of said intermediate sector (60). In a 60th according to any one of the aspects from 48th to 59th, the length of the upper surface (61) of the intermediate sector (60) is between 200 and 2000 mm, optionally between 400 and 1200 mm. In a 61st according to any one of the aspects from 48th to 60th the total length of the intermediate sector is greater than the length of the upper surface (61) of the same intermediate sector. In a 62nd aspect according to any one of the aspects from 48th to 61st the ratio of the total length of the intermediate sector (60) to the on upper surface (61) of the same sector is greater than 1.2, optionally between 1.5 and 3.

In a 63rd aspect according to any one of the aspects from 48th to 62nd, the intermediate sector (60) has a width, optionally measured orthogonally to the advancement trajectory (A) of the items on the intermediate sector (60), lower than the length of said intermediate sector (60). In a 64th aspect according to any one of aspects from 48th to 63rd, the ratio between the length to the width of the upper surface (61) of the intermediate sector (60) is between 0.3 and 2. In a 65th aspect according to any one of the two preceding aspects, the width of the upper surface (61) of the intermediate sector (60) is between 500 and 2000 mm, optionally between 700 and 1500 mm. In a 66th aspect according to any one of the aspects from 48th to 65th the ratio between the length of the first sector (3) and the length of the intermediate sector (60) is greater than 1.1, optionally between 1.3 and 2. In a 67th aspect according to any one of the aspects from 48th to 66th the ratio of the length of the second sector (4) to the length of the intermediate sector (60) is between 0.7 and 2, optionally between 0.8 and 1.5. In a 68th aspect according to any one of the aspects from 48th to 67th, the ratio between the length of the upper surface (5) of the first sector (3) and the length of the upper surface (61) of the intermediate sector (60) is between 0.2 and 1, optionally between 0.2 and 0.7. In a 69th aspect according to any one of the aspects from 48th to 68th, the ratio between the length of the upper surface (6) of the second sector (4) and the length of the upper surface (61) of the intermediate sector (60) is between 0.7 and 2, optionally between 0.8 and 1.5.

In a 70th aspect according to any one of the aspects from 18th to 69th the input (3*a*) and output (3*b*) of the first sector (3) are respectively configured to be placed at different distances from the ground. In a 71st aspect according to any one of the aspects from 18th to 70th the input (3*a*) of the first sector (3) is configured to be placed at a distance (D1) from the ground, wherein the output (3*b*) of the first sector (3) is configured to be placed at a distance (D2) from the ground, wherein the distance (D1) between the input (3*a*) and the ground is greater than the distance (D2) between the output (3*b*) and the ground. In a 72nd aspect according to any one of the aspects from 18th to 71st the distance (D1) between the input (3*a*) of the first sector (3) and the ground is between 800 and 1700 mm, even more optionally between 1000 and 1500. In a 73rd aspect according to any one of the aspects from 18th to 72nd the distance (D2) between the output (3*b*) of the first sector (3) and the ground is between 600 and 1500, even more optionally between 700 and 1200 mm.

In a 74th aspect according to any one of the aspects from 27th to 73rd the input (4*a*) and output (4*b*) of the second sector (4) are configured to be placed at different distances from the ground. In a 75th aspect according to any one of the aspects from 27th to 74th the input (4*a*) of the second sector (4) is configured to be placed at a distance (D3) from the ground, wherein the output (4*b*) of the second sector (4) is configured to be placed at a distance (D4) from the ground, wherein said distance (D3) between the input (4*a*) of the second sector and the ground is lower than the distance (D4) between said output (4*b*) of the second sector and the ground.

In a 76th aspect according to any one of the aspects from 27th to 75th the distance (D3) between the input (4*a*) of the second sector (4) and the ground is between 600 and 1500, even more optionally between 700 and 1200 mm. In a 77th aspect according to any one of the aspects from 27th to 76th the distance (D4) between the output (4*b*) of the second sector (4) and the ground is between 800 and 1700 mm, optionally between 1000 and 1500 mm.

In a 78th aspect according to any one of the aspects from 27th to 77th the output (3*b*) of the first sector (3) is placed above the input (4*a*) of the second sector (4). In a 79th aspect according to any one of the aspects from 75th to 78th the distance (D1) between the input (3*a*) of the first sector (3) and the ground is greater than the distance (D4) between the output (4*b*) of the second sector (4) and the ground.

In an 80th aspect according to any one of the aspects from 41st to 79th the output (3*b*) of the first sector (3) is placed above the input (60*a*) of the intermediate sector (60). In an 81st aspect according to any one of the aspects from 41st to 80th the output (3*b*) of the first sector (3) is placed above the output (60*b*) of the intermediate sector (60). In an 82nd aspect according to any one of the aspects from 41st to 81st the output (3*b*) of the first sector (3) is placed above an initial tract of the upper surface (61) of the intermediate sector (60), optionally spaced from the output (60*b*) of the intermediate sector (60). In an 83rd aspect according to any one of aspects from 41st to 82nd the input (60*a*) of the intermediate sector (60) is placed below the upper surface (5) of the first sector. In an 84th aspect according to any one of the aspects from 41st to 83rd the output (60*b*) of the intermediate sector (60) is placed below the upper surface (5) of the first sector. In an 85th aspect according to any one of the aspects from 41st to 84th the upper surface (61) of the intermediate sector (60) is placed below the output (4*b*) of the second sector (4). In an 86th aspect according to any one of the aspects from 41 st to 85th the output (60*b*) of the intermediate sector (60) is placed above the input (4*a*) of the second sector (4). In an 87th aspect according to any one of the aspects from 41st to 86th the output (60*b*) of the intermediate sector (60) is placed below the output (4*b*) of the second sector (4). In an 88th aspect according to any one of the aspects from 41st to 87th the output (60*b*) of the intermediate sector (60) is overlapped to at least one tract of the upper surface (6) of the second sector (4). In an 89th aspect according to any one of the aspects from 41st to 88th the output (60*b*) of the intermediate sector (60) is placed above an initial tract of the upper surface (6) of the second sector (4), optionally spaced from the output (4*b*) of the second sector (4).

In a 90th aspect according to any one of the aspects from 2nd to 89th the first sector (3) is configured to move an ideal point of the upper surface (5) of said first sector (3), optionally during an active condition of said first sector (3), at a first speed. In a 91st aspect according to any one of the aspects from 2nd to 90th the second sector (4) is configured to move an ideal point of the upper surface (6) of said second sector (4), optionally during an active condition of said second sector (4), at a second speed. In a 92nd aspect according to the preceding aspect, the first speed is lower than the second speed. In a 93rd aspect according to any one of the preceding two aspects the ratio between the second speed defined by the second sector (4) and the first speed defined by the first sector (3) is between 1.5 and 15, optionally between 1.5 and 10, even more optionally between 2 and 7.

In a 94th aspect according to any one of the four preceding aspects, the first speed of the first sector (3) is variable. In a 95th aspect according to any one of the five preceding aspects the first sector (3), optionally during the active condition, is configured to move at least a part of the upper surface (5) (optionally of an ideal point of the upper surface 5) according to at least one of the following motions: continuous motion, intermittent motion, reciprocating motion. In a 96th aspect according to any one of the preceding six aspects, the first sector (3), optionally during the active condition, is configured to move at least a part of the upper surface (optionally at least an ideal point of the upper surface 5) according to a reciprocating motion, during which said first sector (3) performs at least one reversal of motion. In a 97th aspect according to any one of the preceding seven aspects the first sector (3), optionally during the active condition, is configured to:

- perform a plurality of advancement displacements of an ideal point of the upper surface (5) of said first sector (3), wherein each advancement displacement is performed at an advancement speed,
- perform a plurality of return displacements of the same ideal point of the upper surface (5) of said first sector (3), wherein each return displacement is performed at a return speed,
- optionally wherein two consecutive advancement displacements are interspersed with a return displacement (optionally the return displacement is interposed between two advancement displacements to define a reciprocating motion of the first sector 3).

In a 98th aspect according to the preceding aspect the ratio between the advancement speed (optionally the modulus of advancement speed) to the return speed (optionally the modulus of return speed) of the first sector (3) is between 0.5 and 5, optionally between 0.8 and 4, even more optionally between 1 and 3. In a 99th aspect according to any one of the preceding two aspects, the advancement speed defined by the first sector (3) is higher than the return speed defined by the same first sector. In a 100th aspect according to any one of the three preceding aspects, the advancement speed of an ideal point of the upper surface (5) of said first sector (3) during the advancement displacement has the same trajectory and opposite direction as the return speed during the return displacement of the same ideal point of the upper surface (5) of said first sector (3). In a 101st aspect according to any one of the four preceding aspects, the resultant of the advancement speed and the return speed defines the first speed of the first sector (3). In a 102nd aspect according to any one of the five preceding aspects the first speed (optionally the modulus of the first speed) of an ideal point on the upper surface (5) of the first sector (3), optionally during the active condition of said first sector (3), is between 0.07 m/s and 0.5 m/s, still more optionally between 0.09 m/s and 0.3 m/s, still more optionally between 0.09 m/s and 0, 2 m/s. In a 103rd aspect according to any one of the preceding six aspects, the advancement speed (optionally the modulus of advancement speed) of an ideal point on the upper surface (5) of the first sector (3), optionally during the active condition of said first sector (3), is between 0.1 m/s and 0.5 m/s, still more optionally between 0.1 m/s and 0.4 m/s.

In a 104th aspect according to any one of the preceding seven aspects, the ratio between the modulus of the advancement displacement of an ideal point of the upper surface (5) of said first sector (3) and the modulus of the return displacement of the same ideal point of the upper surface (5) of said first sector (3) is between 1.5 and 5, optionally between 1.5 and 3.

In a 105th aspect according to any one of the aspects from 91st to 104th the second speed of the second sector (4) is variable. In a 106th aspect according to any one of the aspects from 91st to 105th the second sector (4) is configured to move at least a part of the upper surface (6) (optionally an ideal point of the upper surface 6) according to at least one of the following motions: continuous motion, intermittent motion, reciprocating motion. In a 107th aspect according to any one of the aspects from 91st to 106th, the second sector (4) is configured to move at least a part of the upper surface (6) (optionally an ideal point of the upper surface 6) according to a reciprocating motion, during which said second sector performs at least one reversal of motion. In a 108th aspect according to any one of the aspects from 91st to 107th the second sector (4), optionally during the active condition, is configured to:

- perform a plurality of advancement displacements of an ideal point of the upper surface (6) of said second sector (4), wherein each advancement displacement is performed at an advancement speed,
- perform a plurality of return displacements of the same ideal point of the upper surface (6) of said second sector (4), wherein each return displacement is performed at a return speed,
- optionally wherein two consecutive advancement displacements are interspersed with a return displacement (optionally the return displacement is interposed between two advancement displacements to define a reciprocating motion of the second sector 4).

In a 109th aspect according to the preceding aspect the ratio of the advancement speed (optionally the modulus of advancement speed) to the return speed (optionally the modulus of return speed) of the second sector (4) is between 0.5 and 5, optionally between 0.8 and 4, even more optionally between 1 and 3. In a 110th aspect according to any one of the preceding two aspects, the advancement speed defined by the second sector (4) is higher than the return speed defined by the same second sector. In a 111th aspect according to any one of the three preceding aspects, the advancement speed of an ideal point of the upper surface (6) of said second sector (4) during the advancement displacement has the same trajectory and opposite direction as the return speed during the return displacement of the same ideal point of the upper surface (6) of said second sector (4). In a 112th aspect according to any one of the four preceding aspects, the resultant of the advancement speed and the return speed defines the second speed of the second sector (4). In a 113th aspect according to any one of the preceding five aspects, the second speed (optionally the modulus of the second speed) of an ideal point of the upper surface (6) of the second sector (4), optionally during the active condition of said second sector (4), is between 0.5 m/s and 2 m/s, still more optionally between 0.6 m/s and 1.5 m/s, still more optionally between 0.6 m/s and 1.3 m/s. In a 114th aspect according to any one of the preceding six aspects, the ratio between the advancement displacement of an ideal point of the upper surface (6) of said second sector (4) and the return displacement of the same ideal point of the upper surface (6) of said second sector (4) is between 1.5 and 5, optionally between 1.5 and 3.

In a 115th aspect according to any one of the aspects from 41st to 114th the intermediate sector (60) is configured to move items placed on the upper surface (61) of said intermediate sector (60) at an intermediate speed. In a 116th aspect according to any one of the aspects from 41st to 115th the intermediate sector (60) is configured to move an ideal point of the upper surface (61) of said intermediate sector along the support plane at an intermediate speed. In an 117th aspect according to any one of the preceding two aspects, the intermediate speed (optionally the modulus of said speed) defined by the intermediate sector (60) is greater than the first speed (optionally the modulus of said first speed) defined by the first sector (3). In an 118th aspect according to any one of the preceding three aspects, the intermediate speed (optionally the modulus of said speed) defined by the intermediate sector (60) is higher than the advancement speed (optionally the modulus of said advancement speed) defined by the first sector (3). In a 119th aspect according to any one of the preceding four aspects, the intermediate sector (60) is configured to move at least part of the upper surface (61) according to at least one of the following motions: continuous motion, intermittent motion, reciprocating motion. In a 120th aspect according to any one of the preceding five aspects, the intermediate sector (60) is configured to move at least a part of the upper surface (61) according to a continuous motion.

In a 121st aspect according to any one of the aspects from 97th to 120th the first sector, during the advancement displacement, is configured to move an ideal point of the upper surface (5) of said first sector (3) approaching the output (3*b*) of said first sector (3). In a 122nd aspect according to any one of the aspects from 97th to 121st the first sector, during the advancement displacement, is configured to move an ideal point of the upper surface (5) of said first sector (3) approaching the second sector (4), optionally to the intermediate sector (60).

In a 123rd aspect according to any one of the aspects from 97th to 122nd the first sector (3), during the return displacement, is configured to move an ideal point of the upper surface (5) of said first sector (3) approaching the input (3*a*) of said first sector (3).

In a 124th aspect according to any one of the aspects from 97th to 123rd the second sector (4), during the advancement displacement, is configured to move an ideal point of the upper surface (6) of said second sector (4) approaching the output (4*b*). In a 125th aspect in any one of the aspects from 97th to 124th the second sector, during the advancement displacement, is configured to move an ideal point of the upper surface (6) of said second sector (4) away from the first sector (3), optionally to the intermediate sector (60).

In a 126th aspect according to any one of the preceding aspects the conveyor comprises a control unit (50) active on said at least one transport sector. In a 127th aspect according to the preceding aspect the control unit is active in command on the first sector (3), on the second sector (4), and optionally on the intermediate sector (60). In a 128th aspect according to the preceding aspect the control unit is configured to independently command said first sector (3), second sector (4), and optionally the intermediate sector (60). In a 129th aspect according to any one of the preceding two aspects, the control unit (50) is configured to independently control the activation of said first sector (3) and second sector (4) (optionally the intermediate sector) and optionally the speeds of said sectors.

In a 130th aspect according to any one of the preceding aspects the conveyor (1) comprises at least one sensor (51) associated with the first sector (3) and configured to emit a signal representative of at least one control parameter, wherein said at least one sensor is connected to the control unit, which is configured to control the first sector (3) according to the signal emitted by said sensor (51). In a 131st aspect according to the preceding aspect, the control parameter is representative of at least one of the following information: the presence of one or more items on the upper surface (5) of the first sector, the presence of one or more items at the output (3*b*) of the first sector (3), the presence of one or more items at the input (3*a*) of the first sector. In a 132nd aspect according to any one of the two preceding aspects said at least one sensor comprises at least one of: a camera, a photocell.

In a 133rd aspect according to any one of the aspects from 130th to 132nd, the control unit (50), optionally depending on the signal emitted by the sensor (51), is configured to send to the first sector (3):

- an activation signal configured to determine the active condition of the first sector (3), a deactivation signal configured to determine a stop condition of the first sector (3).

In a 134th aspect according to the preceding aspect, the control unit (50) is configured to send, optionally depending on the signal received from the sensor (51), two activation signals interspersed with at least one deactivation signal, optionally so as to determine at least one stop condition between two active conditions.

In a 135th aspect according to any one of the aspects from 126th to 134th the control unit is configured to send an activation signal to control the first speed of the first sector. In a 136th aspect according to any one of the aspects from 126th to 135th the control unit is configured to send an activation signal to control at least one of the following parameters of the first sector (3): a module (optionally a length) of the advancement displacement, the module of the advancement speed (optionally the variability of said speed), the direction of the advancement speed, a module (optionally a length) of the return displacement, the module of the return speed (optionally the variability of said speed), the direction of the return speed.

In an 137th aspect according to any one of the aspects from 126th to 136th, the conveyor (1) comprises at least one first and at least one second sensor (51, 52) associated with the first sector (3) and the second sector (4), respectively, wherein the first sensor (51) is connected to the control unit (50) and configured to emit a signal representative of the presence of one or more items at the output (3*b*) of the first sector (3) while the second sensor (52) is connected to the control unit (50) and configured to emit a signal representative of the presence of one or more items at the output (4*b*) of the second sector (4). In a 138th aspect according to the preceding aspect, the control unit is configured to receive signals from the first and second sensors (51, 52) and, depending on said signals, control the movement of the first sector (3) and the second sector (4). In a 139th aspect according to the 137th or 138th aspect the first sensor (51) comprises at least one of: a camera, a photocell. In a 140th aspect according to any one of the aspects from 137th to 139th the second sensor (52) comprises at least one of: a camera, a photocell.

In an aspect 141st according to any one of the aspects from 130th to 140th the control unit (50) is configured to send to the first sector (3) a command signal to control the active condition of said sector, depending on the signal emitted by the first sensor (51) and/or the second sensor (52), optionally and/or an active sensor at the intermediate sector (60). In an aspect 142nd according to any one of the aspects from 130th to 141th the control unit (50) is configured to send to the second sector (4) a command signal to control the active condition of said sector, optionally depending on the signal emitted by the second sensor (52), optionally the control unit is configured to send to the second sector (4):

an activation signal configured to determine the active condition of the second sector (4), a deactivation signal configured to determine a stop condition of the second sector (4).

In a 143rd aspect according to the preceding aspect, the control unit (50) is configured to send, optionally depending on the signal received from the second sensor (52), two activation signals interspersed with at least one deactivation signal, optionally so as to determine at least one stop condition between two active conditions. In a 144th aspect according to any one of the aspects from 126th to 143rd, the control unit is configured to send an activation signal to control at least one of the following parameters of the second sector: a module (optionally a length) of the advancement displacement, the module of the advancement speed (optionally the variability of said speed), the direction of the advancement speed, a module (optionally a length) of the return displacement, the module of the return speed (optionally the variability of said speed), the direction of the return speed.

In a 145th aspect according to any one of the aspects from 2nd to 144th, the first sector (3) comprises at least one of: a conveyor belt, a roller conveyor, a conveyor belt with integrated a plurality of rollers. In a 146th aspect according to any one of the aspects from 2nd to 145th the first sector (3) comprises a conveyor belt. In a 147th aspect according to the preceding aspect the conveyor belt of the first sector (3) is slidingly wound around at least two idler rollers (optionally end rollers). In a 148th aspect according to the preceding aspect the conveyor belt of the first sector (3) comprises a plurality of free rollers interposed between the idler rollers, optionally configured to support an upper tract of said conveyor belt. In a 149th aspect according to any one of the aspects from 2nd to 148th, the first sector (3) comprises at least one actuator, e.g., electric motor. In an 150th aspect according to any one of the preceding aspects, the actuator (optionally the electric motor) is configured to move the conveyor belt of said first sector (3). In a 151st aspect according to any one of the aspects from 145th to 150th the conveyor belt of said first sector (3) is at least partly, optionally entirely, made of rubber. In a 152nd aspect according to any one of the aspects from 145th to 151st at least one upper tract of the conveyor belt of the first sector (3) defines the upper surface (5) of said first sector (3).

In an 153rd aspect according to any one of the preceding five aspects the actuator of the first sector (3) is active on at least one of the rollers (optionally on at least one of the idler rollers and/or on at least one of the intermediate rollers) of said first sector (3) to define a motorized roller. In an 154th aspect according to any one of the preceding six aspects, the control unit (50) is active in control on the actuator of the first sector (3), optionally being configured to send at least one signal to the actuator of the first sector (3) to control the active and stop condition of the first sector (3).

In a 155th aspect according to any one of the aspects from 2nd to 154th the second sector (4) comprises at least one of: conveyor belt, a roller conveyor, a conveyor belt with integrated a plurality of rollers. In a 156th aspect according to any one of the aspects from 2nd to 155th the second sector (4) comprises a conveyor belt. In an 157th aspect according to the preceding aspect, the conveyor belt of the second sector (4) is slidingly wound around two idler rollers (optionally end rollers). In a 158th aspect according to the preceding aspect, the conveyor belt of the second sector (4) comprises a plurality of free rollers interposed between the idler rollers, optionally configured to support an upper tract of said conveyor belt. In a 159th aspect according to any one of the preceding aspects, the second sector (4) comprises at least one actuator, optionally an electric motor, configured to move the conveyor belt of said second sector (4). In an 160th aspect according to any one of the aspects from 155th to 159th, the conveyor belt of the second sector (4) is at least partly, optionally entirely, made of rubber. In a 161st aspect according to any one of the aspects from 155th to 160th at least one upper tract of the conveyor belt of the second sector (4) defines the upper surface (6) of said second sector (4).

In an 162nd aspect according to any one of the preceding five aspects, the actuator of the second sector (4) is active on at least one of the rollers (optionally on at least one of the idler rollers and/or on at least one of the intermediate rollers) of said second sector (4) to define a motorized roller. In an aspect 163rd according to any one of the preceding six aspects, the control unit (50) is configured to send at least one signal to the actuator of the second sector (4) to control the active and stop condition of the second sector (4).

In a 164th aspect according to any one of the aspects from 41st to 163rd the intermediate sector (60) comprises at least one of: a conveyor belt, a roller conveyor, a conveyor belt with integrated a plurality of rollers. In a 165th aspect according to any one of the aspects from 41st to 164th the intermediate sector (60) comprises a conveyor belt. In a 166th aspect according to the preceding aspect, the conveyor belt of the intermediate sector (60) is slidingly wound around two idler rollers (optionally end rollers). In a 167th aspect according to the preceding aspect the conveyor belt of the intermediate sector (60) comprises a plurality of free rollers interposed between the idler rollers, optionally configured to support an upper tract of said conveyor belt. In a 168th aspect according to any one of the preceding aspects, the intermediate sector (60) comprises at least one actuator, optionally an electric motor, configured to move the conveyor belt of said intermediate sector (60). In an 169th aspect according to any one of the aspects from 165th to 168th, the conveyor belt of said intermediate sector (60) is at least partly, optionally entirely, made of rubber. In a 170th aspect according to any one of the aspects from 165th to 169th at least one upper tract of the conveyor belt of the intermediate sector (60) defines the upper surface (61) of said intermediate sector (60).

In a 171st aspect according to any one of the preceding five aspects the actuator of the intermediate sector (60) is active on at least one of the rollers (optionally on at least one of the idler rollers and/or on at least one of the intermediate rollers) of said intermediate sector (60) to define a motorized roller. In an aspect 172nd according to any one of the preceding six aspects, the control unit (50) is configured to send at least one signal to the actuator of the intermediate sector (60) to control the active and stop condition of the intermediate sector (60).

In a 173rd aspect according to any one of the aspects from 2nd to 172nd the upper surface (5) of the first sector is at least partly plastic, optionally rubber. In a 174th aspect according to any one of the aspects from 2nd to 173rd, the upper surface (5) of the first sector is configured to generate with an item disposed on said upper surface a predetermined coefficient of friction lower than a predetermined coefficient of friction definable between the same item and the upper surface (6) of the second sector (4). In a 175th aspect according to any one of aspects from 2nd to 174th, the upper surface (6) of the second sector is at least partly plastic, optionally rubber. In a 176th aspect according to any one of the aspects 41st to 175th the upper surface (61) of the intermediate sector is at least partly plastic, optionally rubber. In a 177th aspect according to any one of the aspects from 41st to 176th the upper surface (61) of the intermediate sector is configured to generate with an item disposed on said upper surface (61) a predetermined coefficient of friction lower than a predetermined coefficient of friction definable between the same item and the upper surface (6) of the second sector (4). In a 178th aspect according to any one of the aspects from 41st to 177th, the upper surface (61) of the intermediate sector (60) is configured to generate with an item disposed on said upper surface (61) a predetermined higher coefficient of friction than a predetermined coefficient of friction definable between the same item and the upper surface (5) of the first sector (3).

In a 179th aspect according to any one of the aspects from 126th to 178th, the control unit (50) is connected to the actuators (optionally to electric motors) of the first sector (3) and the second sector (4) to independently control the movement (optionally the speed) of the respective conveyors. In an 180th aspect according to any one of the aspects from 126th to 179th, the control unit (50) is configured to define an operating condition of the conveyor (1) during which said control unit sends at least one activation signal to at least of said first sector (3) and second sector (4), and optionally to the intermediate sector (60). In a 181st aspect according to any one of the aspects from 126th to 180th, the control unit (50), during the operating condition, is configured to send at least one of the following control signals:

- at least one activation signal to the first sector,
- at least one deactivation signal to the first sector,
- at least one activation signal to the second sector,
- at least one deactivation signal to the second sector,
- optionally at least one activation signal to the intermediate sector,
- optionally at least one deactivation signal to the intermediate sector.

In an 182nd aspect according to any one of the aspects from 126th to 181st, the control unit (50), during the operating condition, is configured to send activation and deactivation signals to the first sector and the second sector, optionally to the intermediate sector, depending on the signal emitted by at least one of the sensor of the conveyor, optionally by at least one of the first sensor, the second sensor, the active sensor at the intermediate sector (60).

In an 183rd aspect according to any one of the preceding aspects the conveyor (1) comprises at least one roller (90) arranged at an output of the de-stratifying module (2), optionally at the output (**4*b*) of the second sector. In an 184th aspect according to the preceding aspect the at least one roller (90) is a friction roller. In an 185th aspect according to any one of the preceding two aspects the roller is configured to rotate about a axis transverse, optionally orthogonal, to the advancement trajectory (A) defined by the de-stratifying module, optionally from the second sector (4). In a 186th aspect according to any one of the three preceding aspects, the roller (90) has a rubberized outer surface. In an 187th aspect according to any one of the four preceding aspects, the roller (90) is arranged at substantially the same height from the output (4*b*) of the second sector. In an 188th aspect according to any one of the preceding five aspects, the roller (90) has a length equal to a width of the upper surface (6) of the second sector (4). In a 189th aspect according to any one of the preceding six aspects the roller (90) is of a motorized type. In a 190th aspect according to any one of the preceding seven aspects the roller (90) is configured to contact and support items exiting the second sector. In an 191st aspect according to any one of the preceding eight aspects the roller (90) is configured to rotate independently with respect to the movement of the second sector (4). In a 192nd aspect according to any one of the aspects from 183rd to 191st, the roller (90) is movable approaching and moving away with respect to the de-stratifying module. In an 193rd aspect according to any one of the aspects from 183rd to 192nd, the roller (90**) is movable relative to the de-stratifying module along a direction substantially parallel to the advancement trajectory defined by the de-stratifying module itself.

In a 194th aspect a conveyor (1) for handling items (P) comprising a sorter (10) is provided. In a 195th aspect according to the preceding aspect the conveyor (1) comprises a de-stratifying module (2). In a 196th aspect according to the preceding aspect the de-stratifying module (2) is in accordance with any one of the aspects from 1st to 193th. In a 197th aspect according to any one of the aspects from 194th to 196th, the de-stratifying module (2) and the sorter (10) are configured to move a plurality of items (P) along an advancement trajectory (A).

In a 198th aspect according to any one of the aspects from 194th to 197th the sorter (10) is placed immediately consecutive to the de-stratifying module (2), optionally with respect to the advancement trajectory (A). In a 199th aspect according to any one of the aspects from 194th to 198th the sorter (10) is placed downstream the de-stratifying module (2) with respect to the advancement trajectory (A) of the items. In a 200th aspect according to any one of the aspects from 194th to 199th the sorter (10) is configured to receive the items (P) exiting the de-stratifying module (2). In a 201st aspect according to any one of the aspects from 194th to 200th the sorter (10) is placed at the output (4*b*) of the second sector (4) of the de-stratifying module (2). In a 202nd aspect according to any one of the aspects from 194th to 201st the de-stratifying module (2) and the sorter (10) are configured to move items independently of each other.

In a 203rd aspect according to any one of the aspects from 194th to 202nd, the sorter (10) defines a support plane (11) configured to receive in support one or more items (P). In a 204th aspect according to the preceding aspect the support plane (11) of the sorter is horizontal. In a 205th aspect according to any one of the preceding two aspects, the support plane (11) of the sorter (10) is placed below the output (4*b*) of the second sector (4) or is aligned with said output (4*b*). In a 206th aspect in any one of the preceding three aspects, the support plane (11) of the sorter (10) is tilted with respect to the upper surface (6) of the second sector (4). In a 207th aspect according to any one of the preceding four aspects the support plane (11) of the sorter is tilted relative to the upper surface (5) of the first sector (3). In a 208th aspect according to any one of the preceding five aspects the support plane (11) of the sorter is substantially parallel to the upper surface (61) of the intermediate sector (60).

In a 209th aspect according to any one of the aspects from 194th to 208th the sorter (10) comprises an input (10*a*) and at least one output. In a 210th aspect according to the preceding aspect, the sorter (10) is configured to move items (P) along the advancement trajectory (A) between the input (10*a*) and the at least one output of the sorter (10). In a 211th aspect according to any one of the preceding two aspects, the input (10*a*) of the sorter (10) faces the output (4*b*) of the second sector (4) of the de-stratifying module (2). In a 211th aspect according to any one of the preceding three aspects the at least one output of the sorter (10) is placed substantially to the side of the input (10*a*) of the same sorter (10). In a 212th aspect according to any one of the four preceding aspects the at least one output of the sorter (10) is angularly offset from the input (10*a*) of the same sorter. In a 213th aspect according to any one of the preceding five aspects the at least output of the sorter (10) is angularly offset with respect to the input (10*a*) of the same sorter, optionally by an angle between 30° and 120°, even more optionally by an angle between 40° and 95°.

In a 214th aspect according to any one of the aspects from 194th to 213th the tract of the advancement trajectory (A) defined by the sorter (10) is (optionally for a preponderant part) transverse to the tract of the advancement trajectory (A) defined by the de-stratifying module (2). In an 215th aspect according to any one of the aspects from 194th to 214th, the de-stratifying module (2) is configured to move one or more items along at least one main advancement direction which is transverse, optionally orthogonal, to at least one respective main advancement direction imparted to the items by the sorter (10). In a 216th aspect according to the preceding aspect, the movement imparted by the de-stratifying module (2) and the sorter (10) along the respective main advancement directions defines the advancement trajectory (A) of the items.

In a 217th aspect according to any one of the aspects from 194th to 216th the at least one output of the sorter (10) comprises a first and a second output (10*b*', 10*b*") opposite to each other. In a 218th aspect according to the preceding aspect each of said first and second outputs (10*b*', 10*b*") of the sorter (10) is placed to a side of the input (10*a*) of the same sorter (10). In a 219th aspect according to any one of the preceding two aspects each of said first and second outputs (10*b*', 10*b*") of the sorter (10) is angularly offset from the input (10*a*) of the same sorter, optionally by an angle between 30° and 120°, even more optionally by an angle between 40° and 95°.

In a 220th aspect according to any one of the aspects from 194th to 219th the sorter (10) extends longitudinally between the input and output or, if present, between the first and second output (10*b*', 10*b*"), to define a length of said sorter (10). In a 221st aspect according to the preceding aspect, the length of the sorter (10) is between 700 and 2000 mm, optionally between 1000 and 1500 mm.

In a 222nd aspect according to any one of the aspects from 194th to 221st, the sorter (10) has a length equal to or greater than the width of the upper surface (6) of the second sector (4).

In a 223rd aspect according to any one of the aspects from 194th to 222nd, the sorter (10) comprises at least one first and at least one second zone (Z1, Z2) side by side one to the other. In a 224th aspect according to the preceding aspect the first and second zones (Z1, Z2) both define at least part of the input (10*a*) of the sorter. In a 225th aspect according to any one of the two preceding aspects the first and second zones (Z1, Z2) are both configured to directly receive items (P) from the de-stratifying module (2). In a 226th aspect according to any one of the three preceding aspects the first and second zones (Z1, Z2) of the sorter (10) are side by side one to the other. In a 227th aspect according to any one of the four preceding aspects:

the first zone (Z1) extends from a longitudinal centerline zone to the first output (10*b*'), said first zone (Z1) being configured to move the items (P) on the first zone itself to at least one of said first and second outputs (10*b*', 10*b*") of the sorter, the second zone (Z2) extends from the longitudinal centerline zone to the second output (10*b*"), said second zone (Z2) being configured to move the items (P) on the second zone itself to at least one of said first and second outputs (10*b*', 10*b*") of the sorter.

In a 228th aspect according to any one of the aspects from 223rd to 227th the first and second zones (Z1, Z2) define the support plane (11) of the sorter (10). In a 229th aspect according to any one of the aspects from 223rd to 228th the first and second zones are configured to move items independently of each other. In a 230th aspect according to any one of aspects 223rd to 229th, the longitudinal centerline zone of the sorter (10) is arranged at an equal distance from the first and second outputs (10*b*', 10*b*") of the sorter (10).

In a 231st aspect according to any one of the aspects from 223rd to 230th, the first zone (Z1) of the sorter is configured to move the items on the first zone itself along a direction (T1), optionally toward at least one of said first and second outputs (10*b*' 10*b*") of the sorter, whereas the second zone (Z2) is configured to move the items on the second zone itself along one direction (T2), optionally toward at least one of said first and second outputs (10*b*', 10*b*") of the sorter. In an 232nd aspect according to any one of the two preceding aspects, the movement direction (T1) of the items on said first zone (Z1) is substantially parallel to the movement direction (T2) of the items on said second zone (Z2). In a 233rd aspect according to any one of the three preceding aspects each movement direction (T1, T2) of the items placed on said first and/or second zone (Z1, Z2) is transverse to the tract of the advancement trajectory defined by the de-stratifying module (2).

In a 234th aspect according to any one of the aspects from 223rd to 233rd the first and second zones (Z1, Z2) both faces the de-stratifying module (2), optionally the output (4*b*) of the second sector (4). In a 235th aspect according to any one of the aspects from 223rd to 234th the first and second zones of the sorter (10) are symmetrical. In a 236th aspect according to any one of the aspects from 223rd to 235th the first and second zones (Z1, Z2) have substantially the same surface extension.

In a 237th aspect according to any one of the aspects from 194th to 236th, the roller (90) is interposed between the output (4*b*) of the second sector (4) and the sorter (10). In a 238th aspect according to the preceding aspect, the roller (90) is configured to guide items exiting from the second sector (4) onto the sorter. In a 239th aspect according to any one of the preceding two aspects, the roller (90) rotates about an axis substantially parallel to the support plane (11) of the sorter (10). In a 240th aspect according to any one of the three preceding aspects, the roller (90) is configured to define a support line for the items, which is set at the same height at which the support plane (11) of the sorter (10) is arranged. In a 241st aspect according to any one of the four preceding aspects, the roller has a length equal to either a length or a width of the sorter (10).

In a 242nd aspect according to any one of the aspects from 194th to 241st the conveyor (1) comprises a control unit (50) active in control on the sorter (10). In a 243rd aspect according to the preceding aspect, the control unit (50) is configured to control the movement of the items on the sorter itself. In a 244th aspect according to any one of the two preceding aspects the control unit (50) is the same as the de-stratifying module (2).

In a 245th aspect according to any one of the three preceding aspects, the control unit (50) is configured to independently control said first and second zones (Z1, Z2) of the sorter.

In an 246th aspect according to any one of the aspects from 194th to 245th, the conveyor (1) comprises at least one sensor (53) associated with the sorter (10) and configured to emit a signal representative of at least one control parameter, wherein the control unit (50) is configured to control the movement of said first and second zones (Z1, Z2), depending on the signal emitted by said sensor (53) associated with the sorter (10). In a 247th aspect according to the preceding aspect, the control parameter is representative of at least one of the following information: the presence of one or more items on the sorter, the presence of one or more items at said at least one output of the sorter (10), the presence of one or more items at the first output (10*b*') of the sorter, the presence of one or more items at the second output (10*b*") of the sorter, the presence of one or more items at the input (10*a*) of the sorter, the presence of one or more items at the output (4*b*) of the second sector (4) of the de-stratifying module (2).

In a 248th aspect according to the 246th or 247th aspect, the sensor (53) associated with the sorter (10) comprises at least one of: a camera, a photocell.

In a 249th aspect according to any one of the aspects from 194th to 248th, the sorter (10) comprises at least one roller conveyor. In a 250th aspect according to any one of the preceding aspects the roller conveyor of the sorter (10) comprises a plurality of rollers side-by-side with each other and presenting an rotation axis which is (optionally for a preponderant part of the trajectory A) tilted with respect to the advancement trajectory (A) defined by the sorter (10), optionally the rotation axis of the rollers of the roller conveyor of the sorter is (optionally for a preponderant part) orthogonal to the advancement direction of the items on said sorter (10). In a 251st aspect according to any one of the two preceding aspects, the rollers of the roller conveyor of the sorter are parallel to each other. In a 252nd aspect according to any one of the three preceding aspects the roller conveyor of the sorter comprises a number of rollers between 15 and 60, optionally between 20 and 40. In a 253rd aspect according to any one of the four preceding aspects, the rollers of the roller conveyor of the sorter (10) are identical to each other, optionally in shape and size. In a 254th aspect according to any one of the five preceding aspects each roller has a diameter between 30 and 80 mm, optionally between 40 and 70 mm. In a 255th aspect according to any one of the preceding six aspects each roller of the roller conveyor has a length, measured along its respective axis of rotation, between 700 and 2000 mm, optionally between 800 and 1500 mm.

In a 256th aspect according to any one of the aspects from 249th to 255th the sorter roller conveyor comprises a first group of rollers that defines said first zone (Z1). In a 257th aspect according to any one of the preceding aspects, the first group of rollers comprises between 7 and 30, optionally between 10 and 20. In a 258th aspect according to any one of the preceding aspects, the rotation axis of the rollers of the first group is transverse, optionally orthogonal, to the movement direction (T1) of the items on said first zone (Z1).

In a 259th aspect according to any one of the aspects from 249th to 258th, the roller conveyor of the sorter comprises a second group of rollers that defines said second zone (Z2). In a 260th aspect according to any one of the preceding aspects, the second group comprises a number of rollers between 7 and 30, optionally between 10 and 20. In a 261st aspect according to any one of the preceding aspects, the rotation axis of the rollers of the second group is transverse, optionally orthogonal, to the movement direction (T2) of the items on said second zone (Z2).

In a 262nd aspect according to any one of the preceding aspects the sorter (10) comprises at least one actuator, optionally an electric motor. In a 263rd aspect according to any one of the preceding aspects the actuator is configured to rotate at least part of the rollers of the roller conveyor. In a 264th aspect according to any one of the preceding aspects the at least one actuator comprises at least one first and at least one second actuator active on the first and second zones (Z1, Z2) of the sorter (10), respectively. In a 265th aspect according to any one of the preceding aspects the at least one actuator comprises at least one electric motor configured to allow the rotation of the rollers of the first zone (Z1) to move the items on said first zone to at least one of said first and second outputs (10*b*', 10*b*") of the sorter (10). In a 266th aspect according to any one of the preceding two aspects, the second actuator comprises at least one electric motor configured to allow the rotation of the rollers of the second zone (Z2) to move the items on said second zone to at least one of said first and second outputs (10b', 10b") of the sorter (10).

In a 267th aspect according to any one of the aspects from 126th to 266th the control unit (50) is connected to the first and second actuators (optionally to electric motors) to independently control the movement (optionally the speed) of the first and second zone rollers (Z1, Z2). In a 268th aspect according to any one of the aspects from 126th to 267th, the control unit (50) is configured to:

- control the rotation of the rollers of the first and second zone (Z1, Z2) according to one rotation direction to move the items on the support plane (11) to the first output (10b') or to the second output (10b"), or
- control the rotation of the rollers of the first zone (Z1) according to a counter-rotating direction with respect to the rotation of the rollers of the second zone (Z2) to move the items on the first zone (Z1) to the first output (10b') and the items on the second zone (Z2) to the second output (10b").

In a 269th aspect according to any one of the aspects from 194th to 268th the support plane (11) of the sorter is placed at a distance from the ground between 750 and 1600 mm, even more optionally between 900 and 1400 mm.

In a 270th aspect according to any one of the aspects 249th to 269th the at least one of said rollers of the roller conveyor of the sorter at the at least one output of said sorter is at least partially rubber coated. In a 271st aspect according to the preceding aspect the at least one roller at least partially coated with rubber is configured to define with an item on the same roller a coefficient of friction greater than the coefficient of friction definable by the same item placed on a roller of the same roller conveyor not coated with rubber. In a 272nd aspect according to any one of aspects from 249th to 271st at least the last roller (91) of the roller conveyor of the sorter placed at the at least one output of said sorter is at least partially rubber coated, optionally to define a rubberized roller. In a 273rd aspect according to any one of the aspects from 249th to 272nd at least the last roller (91) of each roller conveyor of the sorter placed at the at least one first and second output of said sorter is at least partially rubber coated, optionally to define a rubberized roller. In a 274th aspect according to any one of the aspects from 249th to 273rd at least the last roller (91) of each roller conveyor of the sorter placed at the first and second output of said sorter is a friction roller, optionally comprising a rubberized roller. In a 275th aspect according to any one of the aspects from 249th to 274th the rubberized roller of the sorter is motorized.

In a 276th aspect according to any one of the preceding aspects the conveyor (1) comprises at least one converging module (20). In a 277th aspect according to the preceding aspect the sorter (10) and the converging module (20) are configured to move a plurality of items (P) along an advancement trajectory (A).

In a 278th aspect according to any one of the preceding two aspects, the converging module (20) is placed immediately consecutive to the sorter (10) with respect to the advancement trajectory (A). In a 279th aspect according to any one of the 276th to 278th aspects, the converging module (20) is configured to receive the items (P) exiting the sorter (10). In a 280th aspect according to any one of the aspects from 276th to 279th, the converging module (20) is placed at the at least one output of the sorter (10).

In a 281st aspect according to any one of the aspects from 276th to 280th the sorter (10) and the converging module (20) are configured to move items independently of each other.

In a 282nd aspect according to any one of the aspects from 276th to 281st, the converging module (20) defines a support plane configured to receive in support one or more items (P). In a 283rd aspect according to the preceding aspect the support plane of the converging module (20) is horizontal. In a 284th aspect according to any one of the two preceding aspects the support plane of the converging module (20) is placed below the support plane (11) of the sorter (10). In a 285th aspect according to any one of the three preceding aspects the support plane of the converging module (20) is placed below the at least one output of the sorter. In a 286th aspect according to any one of the four preceding aspects the support plane (11) of the sorter (10) is substantially parallel to the support plane of the converging module (20).

In a 287th aspect according to any one of the aspects from 276th to 286th the converging module (20) comprises at least one input (20a) and at least one output (20b), wherein the converging module (20) is configured to move items (P) along the advancement trajectory (A) between said input (20a) and output (20b). In a 288th aspect according to the preceding aspect, the input (20a) of the converging module (20) is placed at the at least one output of the sorter (10). In a 289th aspect according to any one of the preceding aspects the input (20a) of the converging module (20) faces the at least one output of the sorter (10). In a 290th aspect according to any one of the three preceding aspects the output of the converging module (20) is side by side with respect to the input (20a) of the same converging module (20). In a 291st aspect according to any one of the four preceding aspects the output of the converging module (20) is placed to the side of the input (20a) of the same converging module (20). In a 292nd aspect according to any one of the five preceding aspects the output of the converging module (20) is angularly offset with respect to the input (20a) of the same converging module (20). In a 293rd aspect according to any one of the six preceding aspects the output of the converging module (20) is tilted with respect to the input (20a) of the same converging module (20), optionally by an angle between 40° and 120°, even more optionally by an angle between 45° and 95°.

In a 294th aspect according to any one of the aspects from 276th to 293rd, the advancement trajectory tract (A) defined by converging module (20) is (optionally for a preponderant part) transverse, optionally orthogonal, to the advancement trajectory tract (A) defined by the sorter (10). In a 295th aspect according to any one of the aspects from 276th to 294th, the converging module (20) is configured to move one or more items along a main advancement direction transverse, optionally orthogonal, to the respective main advancement direction imparted to the items by the sorter (10). In a 296th aspect according to the preceding aspect, the movement imparted by the converging module and the sorter (10) along their respective main advancement directions defines the advancement trajectory (A) of the items (P).

In a 297th aspect according to any one of the aspects from 276th to 296th the converging module (20) extends longitudinally between a first and second longitudinal end portions (26', 26"), optionally to define a length of said converging module. In a 298th aspect according to the preceding aspect, the support plane of the converging module extends between said first and second longitudinal end portions (26', 26"). In a 299th aspect according to any one of the two preceding aspects, the converging module has a length defined by the distance present between said first and second longitudinal end portions (26', 26"). In a 300th aspect according to the preceding aspect, the length of the converging module is between 1000 and 3000 mm, optionally between 1500 and 2500 mm.

In a 301st aspect according to any one of the aspects from 276th to 300th, the converging module has a length equal to or greater than the length of the sorter (10). In a 302nd aspect according to any one of the aspects from 276th to 301st the ratio between the length of the converging module and the length of the sorter (10) is between 1 and 2.5, optionally between 1.2 and 2. In a 303rd aspect according to any one of the aspects from 287th to 302nd the output (20*b*) of the converging module is defined at the second longitudinal end portion (26").

In a 304th aspect according to any one of the aspects from 276th to 303rd, the converging module (20) has a first and second transverse end portions (24, 25), optionally opposite to each other. In a 305th aspect according to the preceding aspect, the first and second transverse end portions connect the first and second longitudinal end portions (26', 26") of the same converging module. In a 306th aspect according to any one of the two preceding aspects, the first and second transverse end portions are placed at a predetermined distance to substantially define a width of the converging module (20). In a 307th aspect according to the preceding aspect, the width of the converging module (20) is between 700 and 2000 mm, optionally between 800 and 1700 mm.

In a 308th aspect according to any one of the aspects from 287th to 307th the input (20*a*) of the converging module is defined at at least one of said first and second transverse end portions (24, 25). In a 309th aspect according to any one of the aspects from 287th to 308th the input (20*a*) of the converging module (20) is defined between the first and second longitudinal end portions (26', 26") of the same converging module (20). In a 310th aspect according to any one of the aspects from 287th to 309th, the converging module has a length (optionally defined by the distance present between the first and second longitudinal end portions 26', 26") equal to or greater than the width of the sorter (10). In a 311th aspect according to any one of the aspects from 287th to 310th, the ratio between the length of the converging module (20) and the width of the sorter (10) is between 1 and 2.5, optionally between 1.2 and 2.

In a 312th aspect according to any one of the aspects from 287th to 311th the converging module (20) has only one input (20*a*). In a 313th aspect according to any one of the aspects from 287th to 312th the converging module (20) has only one output (20*b*).

In a 314th aspect according to any one of the aspects from 287th to 313th, the converging module (20) is configured to receive items at the input (20*a*) and move them to the output (20*b*) of the same converging module, optionally along the advancement trajectory defined by said converging module (20).

In a 315th aspect according to any one of the aspects from 276th to 314th the converging module (20) has at least one first and at least one second zone (21, 22) side by side. In a 316th aspect according to the preceding aspect only one of the first and second zones (21, 22) of the converging module (20) defines the input (20*a*) of the converging module itself. In a 317th aspect according to any one of the two preceding aspects only one of the first and second zones (21, 22) of the converging module is configured to directly receive items (P) from the sorter (10). In a 318th aspect according to any one of the three preceding aspects the first and second zones (21, 22) of the converging module (20) are side-by-side with respect to the main advancement direction defined by the converging module itself. In a 319th aspect according to any one of the four preceding aspects:

- the first zone (21) of the converging module extends from the first transverse end portion (24) to a transverse centerline zone of the converging module, said first zone (21) of the converging module being configured to move to the items (P) on said first zone (21) toward the output (20*b*) of the converging module,
- the second zone (22) of the converging module extends from the second transverse end portion (25) to the transverse centerline zone of the converging module, said second zone (22) of the converging module being configured to move to the items (P) on said second zone (22) toward the output (20*b*) of the converging module.

In a 320th aspect according to any one of the aspects from 315th to 319th the first and second zones (21, 22) of the converging module (20) define the support plane of said converging module (20). In an aspect 321st according to any one of the aspects from 315th to 320th the transverse centerline zone of the converging module is interposed between the first and second transverse end portions (24, 25) of said converging module. In a 322nd aspect according to any one of the aspects from 315th to 321st the first zone (21) of the converging module (20) is configured to impart to the items (P) on the same zone:

- an advancement motion along the main advancement direction defined by the converging module, or
- an advancement motion along the main advancement direction defined by the converging module and a lateral motion in the direction of the second zone (22).

In a 323rd aspect according to any one of the aspects from 315th to 322nd, the second zone (22) of the converging module (20) is configured to impart to the items (P) on it:

- an advancement motion along the main advancement direction defined by the converging module, or
- an advancement motion along the main advancement direction defined by the converging module and a lateral motion in the direction of the second zone (22).

In a 324th aspect according to any one of the aspects from 315th to 323rd is the control unit is configured to control the movement of the items on the converging module itself. In a 325th aspect according to the preceding aspect, the control unit (50) is the same as the de-stratifying module (2) and/or the sorter.

In a 326th aspect according to any one of the two preceding aspects, the control unit (50) is configured to independently control said first and second zones (21, 22).

In a 327th aspect according to any one of the aspects 276th to 326th the conveyor (1) comprises at least one sensor (54) arranged at the output (20*b*) of the converging module or downstream of the converging module and configured to emit a signal representative of at least one control parameter. In a 328th aspect according to the preceding aspect said at least one sensor (54) is connected to the control unit (50) which is configured to control the movement of said converging module, optionally of the first and second zones (21, 22), according to the signal emitted by said sensor (54). In a 329th aspect according to any one of the two preceding aspects, the control parameter is representative of at least one of the following information: the presence of one or more items on the converging module, the presence of one or more items at the output of the converging module, the presence of one or more items at the input (20*a*) of the converging module, the presence of one or more items at the at least one output of the sorter. In an aspect 330 according to any one of the preceding three aspects said at least one sensor (54) located at the output (20*b*) of the converging module or downstream of the converging module comprises at least one of: a camera, a photocell.

In a 331st aspect according to any one of the aspects from 276th to 330th, the converging module (20) comprises at least one roller conveyor. In a 332nd aspect according to any one of the preceding aspects the roller conveyor of the converging module (20) comprises a plurality of rollers side-by-side with each other and having a rotation axis of tilted with respect to (optionally to a preponderant part of) the advancement trajectory (A) defined by the converging module (20), optionally the rotation axis of the rollers is (optionally for a preponderant part of the trajectory A) orthogonal to the advancement trajectory of the items on said converging module (20). In a 333rd aspect according to any one of the two preceding aspects, the rotation axis of each roller of the roller conveyor of the converging module is tilted with respect to the main advancement direction defined by the converging module itself, optionally by an angle between 40° and 85°, optionally between 50° and 85°. In a 334th aspect according to any one of the three preceding aspects, at least a portion of the rollers of the roller conveyor of the converging module are parallel to each other. In an aspect 335th according to any one of the four preceding aspects, the rollers of the roller conveyor of the converging module are side by side with each other to define the support plane (P) for the items. In a 336th aspect according to any one of the five preceding aspects the roller conveyor of the converging module comprises a number of rollers between 30 and 150 rollers, optionally between 50 and 100.

In a 337th aspect according to any one of the aspects from 331st to 336th, the roller conveyor of the converging module (20) comprises a first group of rollers defining said first zone (21) of the converging module (20). In a 338th aspect according to the preceding aspect the first group of rollers of the roller conveyor of the converging module (20) comprises a number of rollers between 15 and 80, optionally between 20 and 50.

In a 339th aspect according to any one of the aspects from 331st to 338th, the roller conveyor of the converging module (20) comprises a second group of rollers defining said second zone (22) of the converging module (20). In a 340th aspect according to the preceding aspect, the second group of rollers of the roller conveyor of the converging module (20) comprises a number of rollers between 15 and 80, optionally between 20 and 50. In a 341st aspect according to any one of the two preceding aspects, the rotation axis of each roller of the conveyor roller of the second zone of the converging module is tilted with respect to the main advancement direction defined by the converging module itself by an angle between 40° and 85°, optionally between 50° and 85°.

In a 342nd aspect according to any one of the aspects from 331st to 341st the rollers of the roller conveyor of the first zone (21) of the converging module are configured to impart to the items (P) on the same module an advancement motion along the main advancement direction defined by the converging module toward the output (20*b*) of the converging module (20) and a lateral motion in the direction of the second zone (22) of the same converging module. In a 343rd aspect according to any one of the aspects from 331st to 342nd, the rollers of the roller conveyor of the second zone (22) of the converging module are configured to impart to the items (P) resting on the same module an advancement motion along the main advancement direction defined by the converging module toward the output (20*b*) of the converging module (20) and a lateral movement in the direction of the first zone (21) of the same converging module.

In a 344th aspect according to any one of the aspects from 315th to 342nd the converging module comprises a third zone (23) positioned between the first and second zones (21, 22) of the same converging module (20). In a 345th aspect according to the preceding aspect, the third zone (23) extends between the first and second longitudinal end portions (26', 26") of the same converging module. In a 346th aspect according to any one of the two preceding aspects, the third zone is arranged at a longitudinal end portion of the converging module (20). In a 347th aspect according to any one of the three preceding aspects, the third zone comprises a conveyor belt. In an 348th aspect according to any one of the four preceding aspects, the third zone is configured to impart to the items arranged on said third zone a movement along the main advancement direction toward the output (20*b*) of the converging module, optionally only along the main advancement direction.

In a 349th aspect according to any one of the aspects from 276th to 348th the converging module (20) comprises at least one actuator, optionally an electric motor. In a 350th aspect according to any one of the preceding aspects, the actuator of the converging module (20) is configured to move the roller conveyor and optionally the conveyor belt defining the third zone, to allow the movement of items from the input (20*a*) to the at least one output (20*b*) of the same converging module (20). In a 351st aspect according to any one of the aspects from 276th to 350th the support plane of the converging module (20) is placed at a distance from the ground between 500 and 2000 mm, optionally between 600 and 1500 mm.

In an aspect 352nd according to any one of the aspects 276th to 351st the conveyor (1) comprises at least one descent (95) connecting the sorter (10) with the converging module. In an aspect 352bis the descent connects the at least one output of the sorter with the input (20) of the converging module. In an aspect 353rd according to any one of the two preceding aspects the at least one descent (95) comprises a tilted plane. In a 354th aspect according to any one of the three preceding aspects the at least one descent is tilted relative to an ideal horizontal plane by an angle between 30° and 70°, optionally between 35° and 60°. In a 355th aspect according to any one of the four preceding aspects the at least one descent comprises at least one plate.

In a 356th aspect according to any one of the aspects from 352nd to 355th the descent (95) is configured to move the items along the advancement trajectory (A), wherein the advancement trajectory tract defined by the descent (95) is substantially parallel to the advancement trajectory tract defined by the sorter (10), optionally transverse (even more optionally orthogonal) to the advancement trajectory tract defined by the converging module. In a 357th aspect according to any one of the aspects from 352nd to 356th, the descent (95) comprises at least one roller (96) presenting an axis of rotation orthogonal to the advancement trajectory tract defined by the sorter (10). In an aspect 358th according to any one of the aspects from 352nd to 357th the descent (95), and optionally the at least one roller (96), extends across a width of the sorter (10). In a 359th aspect according to any one of the two preceding aspects, the roller (96) of the descent (95) is placed at the at least one output of the sorter (10), optionally side by side with the roller (91) of the sorter (10).

In a 360th aspect according to any one of the three preceding aspects the roller (96) of the descent is at least partially rubber coated. In a 361st aspect according to any one of the four preceding aspects the roller (96) of the descent is configured to define with an item resting on said roller (96) a coefficient of friction greater than the coefficient of friction definable by the same item placed on the metal sheet of the same descent (95). In a 362nd aspect according to any one of the five preceding aspects the roller (96) of the descent is a rubberized roller, optionally a friction roller. In an aspect 363rd according to any one of the six preceding aspects the at least one roller of the descent (95) comprises a plurality of parallel and side-by-side rollers. In a 364th according to any one of the seven preceding aspects the at least one roller (96) of the descent (95) is placed in proximity to the sorter, spaced from the converging module (20). In a 365th aspect according to any one of the eight preceding aspects the at least one roller (96) of the descent is motorized. In an 366th aspect according to any one of the nine preceding aspects the at least one roller of the descent (95) is connected in motion with the at least one roller of the roller conveyor of the sorter (10).

In a 367th aspect according to any one of the aspects from 276th to 366th the at least one converging module (20) comprises a first and a second converging module according to the converging module according to any one of the preceding aspects from 276th to 366th. In a 368th aspect according to the preceding aspect, the first converging module is configured to receive items from the first output (10*b*') of the sorter (10) while the second converging module is configured to receive items from the second output (10*b*") of the sorter (10). In a 369th aspect in any one of the two preceding aspects the first and second converging modules are configured to move items along respective main advancement directions parallel to each other. In a 370th aspect according to any one of the three preceding aspects the at least one descent of the conveyor comprises a first and a second descent (95', 95'). In a 371st aspect according to the preceding aspect:

- the first descent (95') is configured to connect the first output (10*b*') of the sorter (10) with the input (20*a*) of the first converging module,
- the second drop (95") is configured to connect the second output (10*b*") of the sorter (10) with the input (20*a*) of the second converging module.

In a 372nd aspect according to any one of the preceding aspects, the conveyor (1) comprises at least one diverging module (30). In a 373rd aspect according to any one of the preceding aspects, the diverging module (30) comprises at least one input (30*a*) and at least one output (30*b*), wherein the diverging module (30) is configured to move the items (P) along the advancement trajectory (A) between said input (30*a*) and output (30*b*). In a 374th aspect according to any one of the two preceding aspects, the diverging module (30) is configured to move the items from the input (30*a*) to the output (30*b*) along at least one main advancement direction.

In a 375th aspect according to any one of the preceding aspects at least one part of said diverging module (30) defines a support plane configured to receive items. In a 376th aspect according to the preceding aspect the support plane of the diverging module (30) is horizontal. In a 377th aspect according to any one of the preceding aspects the support plane of the diverging module (30) is substantially parallel to the support plane of the converging module (20).

In an aspect 378th according to any one of the aspects from 372nd to 377th the diverging module (30) extends longitudinally between a first and second longitudinal end portions (36', 36"), optionally to define a length of said diverging module (30).

In a 379th aspect according to any one of the aspects from 372nd to 378th, the output (30*b*) of the diverging module (30) is defined at the second longitudinal end portion (36") of the diverging module (30) while the input (30*a*) is defined at the first longitudinal end portion (36').

In a 380th aspect according to any one of the aspects from 372nd to 379th, the diverging module (30) has a first and second transverse end portions (34, 35), which are opposite to each other, and which connect the first and second longitudinal end portions (36', 36') of the same diverging module (30). In a 381st aspect according to any one of the three preceding aspects, the first and second transverse end portions (34, 35) are placed at a predetermined distance to substantially define a width of the diverging module (30), optionally between 700 and 2000 mm, optionally between 800 and 1700 mm.

In a 382nd aspect according to any one of the aspects from 372nd to 381st, the diverging module (30) has only one input (30*a*) and one output (30*b*).

In an aspect 383rd according to any one of the aspects 372nd to 382nd the diverging module (30) is configured to receive items at the input (30*a*) and move them to the output (30*b*), optionally along the advancement trajectory (A) defined on said diverging module (30).

In a 384th aspect according to any one of the aspects from 372nd to 383rd, the diverging module (30) has at least one first and at least one second zone (31, 32) side by side, optionally with respect to the main direction of item advancement defined by the diverging module itself.

In a 385th aspect according to any one of the preceding aspects the first zone (31) is configured to move items (P) from the input (30*a*) to the output (30*b*). In a 386th aspect according to any one of the 372nd to 385th aspects, the first zone (31) extends the entire length of the diverging module.

In a 387th aspect according to any one of the aspects 372nd to 386th at least said first zone (31) is configured to define the support plane of the diverging module (30).

In a 388th aspect according to any one of the preceding aspects, the first zone (31) of the diverging module (30) is configured to impart to the items (P) that are in support on the same:

- an advancement motion along the main advancement direction defined by the diverging module (30), or
- an advancement motion having a main component parallel to the main advancement direction and a lateral component, transverse to the main component, to move said items away from the second zone (32).

In a 389th aspect according to any one of the aspects from 384th to 388th the first zone (31) is configured to move items along the main advancement direction and away from the second zone (32).

In a 390th aspect according to any one of the aspects from 372nd to 389th, the first zone of the diverging module (30) comprises at least one roller conveyor. In a 391st aspect according to any one of the preceding aspects the roller conveyor of the diverging module (30) comprises a plurality of rollers side-by-side with each other and having an rotation axis tilted with respect to (optionally to a preponderant part of) the advancement trajectory (A) defined by the diverging module (30), optionally the rotation axis of the rollers is (optionally for a preponderant part of the trajectory A) orthogonal to the advancement trajectory of the items on said diverging module (30). In a 392nd aspect according to any one of the two preceding aspects, the rotation axis of each roller of the roller conveyor of the diverging module (30) is tilted with respect to the main direction of advancement defined by the diverging module (30) itself by an angle between 40° and 85°, optionally between 50° and 85°. In a 393rd aspect according to any one of the three preceding aspects, at least a portion of the rollers of the roller conveyor of the diverging module (30) are parallel to each other. In a 394th aspect according to any one of the four preceding aspects, the rollers of the roller conveyor of the diverging module (30) are side by side with each other to define the support plane. In a 395th aspect according to any one of the five preceding aspects the roller conveyor of the diverging module (30) comprises a number of rollers between 30 and 150, optionally between 50 and 100.

In a 396th aspect according to any one of the aspects from 372nd to 395th the second zone (32) is configured to move items (P) from the input (30*a*) to the output (30*b*) of the diverging module. In a 397th aspect according to any one of the aspects 372nd to 396th, the second zone (32) extends for at least one tract of a total longitudinal extension of the diverging module. In a 398th aspect according to any one of the aspects from 372nd to 397th the second zone (32) defines at least a part of the input (30*a*) of the diverging module. In a 399th aspect according to any one of aspects 372nd to 398th the second zone (32) extends from the input (30*a*) to the output (30*b*) of the diverging module. In a 400th aspect according to any one of the aspects from 372nd to 399th, the second zone (32) of the diverging module (30) is configured to impart to the items (P) resting on the same:

- an advancement motion along the main advancement direction defined by the diverging module (30), and/or
- an advancement motion having a main component parallel to the main advancement direction and a lateral component, transverse to the main component.

In a 401st aspect according to the preceding aspect, the lateral component imparted by the second zone (32) is configured to move items closer to or further away from the first zone (31).

In a 402nd aspect according to any one of aspects 372nd to 401st, the second zone (32) of the diverging module has a support surface suitable for receiving items.

In a 403rd aspect according to the preceding aspect the second zone (32) of the diverging module comprises at least one tilted tract (37). In a 404th aspect according to the preceding aspect, the support surface of the second zone (32), at the tilted tract (37) and in a cross-section according to a plane orthogonal to the main direction of advancement, is tilted with respect to the support plane defined by the first zone (31) of the same diverging module (30).

In a 405th aspect according to the aspect 403rd or 404th the tilted tract (37) has a longitudinal extension lower than an total longitudinal extension of the second zone (32). In a 406th aspect according to any one of the aspects from 403rd to 405th the tilted tract (37) has a length lower than an total length of the diverging module. In a 407th aspect according to any one of the aspects from 403rd to 406th, the ratio of the longitudinal extension of the tilted tract (37) to the total longitudinal extension of the second zone (32) is lower than 0.8, optionally between 0.7 and 0.2; optionally said longitudinal extension and said total longitudinal extension are measured along the main advancement direction imparted by the diverging module. In a 408th aspect according to any one of aspects 403rd to 407th the tilted tract (37) extends for a part of a total longitudinal extension of the first zone (31). In a 409th aspect according to any one of the aspects from 403rd to 408th the tilted tract (37) extends for a tract lower than 50% of a total extension of the second zone (32), optionally lower than 30% of a total extension of the second zone (32).

In a 410th aspect according to any one of the aspects from 403rd to 409th the tilted tract (37) has, with respect to the support plane of the first zone (31), a maximum inclination between 150 and 35°, even more optionally between 15° and 30°. In a 411th aspect according to any one of the aspects from 403rd to 410th the tilted tract (37) has, according to the main direction of advancement, a variable inclination along its extension. In a 412th aspect according to any one of the aspects from 403rd to 411th the tilted tract (37) has a twisted shape. In a 413th aspect according to any one of the aspects from 403rd to 412th the tilted tract (37) exhibits a first and a second twists one consecutive to the other along the main advancement direction defined by the diverging module. In a 414th aspect according to the preceding aspect, the first and second twists are symmetrical to each other with respect to a centerline plane of the tilted tract, orthogonal to the main advancement direction of the diverging module (30).

In a 415th aspect according to any one of aspects 403rd to 414th, the first twist of the tilted tract is configured to move items away from the first zone (31) while the second twist is configured to move items approaching said first zone (31).

In a 416th aspect according to any one of the aspects from 403rd to 415th, the second zone (32) comprises a conveyor belt (38). In a 417th aspect according to the preceding aspect the conveyor belt of the second zone (32) defines the support surface of said second zone. In a 418th aspect according to any one of the two preceding aspects, the conveyor belt (38) is slidingly wrapped around at least one of a first and a second idler roller, optionally arranged respectively at the input (30*a*) and the output (30*b*) of the diverging module. In an aspect 419th according to any one of the aspects from 416th to 418th, the conveyor belt (38) of the second zone (32) is at least partly made of rubber.

In a 420th aspect according to any one of the aspects from 416th to 419th the second zone (32) of the diverging module (30) comprises:

- at least one support track (39), optionally extending from the input (30*a*) to the output (30*b*) of the diverging module,
- the conveyor belt (38) engaged to the support track (39), wherein said conveyor belt (38) is movable by sliding with respect to the support track (39) to move the items resting on said conveyor belt.

In a 421st aspect according to the preceding aspect, the conveyor belt (38) comprises at least one groove and/or projection engaged to a respective projection and/or groove of the support track.

In a 422nd aspect according to any one of the preceding aspects the second zone (32) comprises at least one inclinator (60) engaged between said support track (39) and said conveyor belt (38), wherein the inclinator (60) is configured to tilt at least in tract of the conveyor belt (38) to define said tilted tract (37) of the second zone (32). In a 423rd aspect according to the preceding aspect, the incliner (60) comprises at least one plate, optionally fixed to the support track (39), tilted relative to the support plane defined by the first zone (31) of the diverging module. In a 424th aspect according to the 422nd or 423rd aspect the conveyor belt (38) of the diverging module (30) is slidingly movable above the incliner (60).

In a 425th aspect according to any one of the aspects from 403rd to 424th the at least one tilted tract (37) comprises at least one first tilted tract (37') and at least one second tilted tract (37"). In a 426th aspect according to the preceding aspect the first and second tilted tracts define respective support surfaces of the second zone (32) which are, in cross-section according to a plane orthogonal to the main direction of advancement, tilted with respect to the support plane of the first zone (31). In a 427th aspect according to any one of the three preceding aspects, the first tilted tract (37') defines a support surface of the second zone (32) which results, in cross-section according to a plane orthogonal to the main advancement direction, tilted with respect to a support surface defined by the second tilted tract (37"). In a 428th aspect according to any one of the aspects from 425th to 427th each of said first and second tilted tracts (37', 37") defines a respective twist of the second zone (32). In a 429th aspect according to any one of the preceding aspects the second zone (32) has:

- a first tract extending from the input (30*a*) of the diverging module to a longitudinal centerline portion,
- a second tract extending from the longitudinal centerline portion to the output (30*b*) of the diverging module (30).

In a 430th aspect according to the preceding aspect, the first tilted tract is defined within the first tract of the second zone (32) while the second tilted tract is defined within the second tract of the second zone (32).

In a 431st aspect according to any one of the aspects from 384th to 430th the first and second zones (31, 32) of the diverging module (30) are both configured to move items independently of each other. In a 432nd aspect according to any one of the aspects from 384th to 431st the first and second zones (31, 32) of the diverging module (30) are both configured to directly receive items (P) from the converging module (20).

In a 433rd aspect according to any one of the aspects from 384th to 432nd, the diverging module (30) comprises a third zone (33) side by side with the second zone (32). In a 434th aspect according to the preceding aspect, the third and second zones are side by side each other with respect to the main advancement direction of item defined by the diverging module itself. In a 435th aspect according to the preceding aspect, the third zone (33) is opposite to the first zone (31) with respect to the second zone (32).

In a 436th aspect according to any one of the aspects from 433rd to 435th the third zone (33) is configured to move the items (P) on said third zone (33) from the input (30*a*) to the output (30*b*). In an aspect 437th according to any one of the aspects from 433rd to 436th the third zone (33) extends from the input to the output of the diverging module, optionally the third zone (33) extends for the entire length of the diverging module.

In a 438th aspect according to any one of the aspects from 433rd to 437th the third zone (33) is configured to define, in cooperation with the first zone (31), the support plane of the diverging module (30). In a 439th aspect according to any one of the aspects from 433rd to 438th, the third zone (33) is configured to move the items (P) that are in support of said third zone (33), optionally from the input (30*a*) to the output (30*b*), along:

- a main component parallel to the main advancement direction, and
- a lateral component, transverse to the main component.

In a 440th aspect according to the preceding aspect the lateral component imparted by the third zone (33) is configured to move the items away from the second zone (32). In a 441st aspect according to any one of the aspects from 433rd to 440th the third zone (33) is configured to move the items along the main advancement direction and away from the second zone (32). In a 442nd aspect according to the preceding aspect, the lateral component imparted by the third zone (33) is configured to move items away from the first zone (31).

In a 443rd aspect according to any one of the aspects from the 433rd to the 442nd, the third zone (33) of the diverging module (30) comprises a roller conveyor. In a 444th aspect according to any one of aspects 433rd to 443rd the first and third zones are symmetrical to each other with respect to the second zone (32). In a 445th aspect according to any one of the aspects from 433rd to 444th:

- the first zone (31) of the diverging module (30) extends from the first transverse end portion (34) to a transverse centerline zone of the diverging module (30),
- the third zone (33) of the diverging module (30) extends from the second transverse end portion (35) to the transverse centerline zone of the diverging module (30).

In a 446th aspect according to any one of the aspects from 433rd to 445th the first and third zones (31, 33) of the diverging module (30) define the support plane of said diverging module (30).

In a 447th aspect according to any one of the aspects from 433rd to 446th the second zone (32) separates the first zone from the second zone of the diverging module. In a 448th aspect according to any one of the aspects from 443rd to 447th the second zone is arranged at the transverse centerline zone of the diverging module.

In a 449th aspect according to any one of the preceding aspects from 372nd to 448th, the conveyor comprises at least one diverging module (30) in accordance with the preceding aspects placed immediately consecutive to the converging module (20), optionally with respect to the advancement trajectory (A). In a 450th aspect according to any one of aspects 372nd to 449th the diverging module (30) is placed downstream of the converging module (20) with respect to the advancement trajectory (A). In a 451st aspect according to any one of aspects 372nd to 450th, the diverging module (30) and the converging module (20) are configured to move items independently of each other.

In a 452nd aspect according to any one of the aspects from 372nd to 451st, the conveyor (1) comprises at least one diverging module, optionally in accordance with the preceding aspects, arranged upstream of the de-stratifying module (2), optionally with respect to an advancement trajectory of items.

In a 453rd aspect in any one of the aspects from 276th to 452nd the conveyor (1) comprises at least the sorter (10) and the converging module (20), optionally also the de-stratifying module (2). In a 454th aspect according to any one of the aspects from 372nd to 5433rd the diverging module (30) is configured to directly receive incoming items (P) from the output (20*b*) of the converging module (20).

In a 455th aspect according to any one of the aspects from 372nd to 454th the control unit (50) is active in control on the diverging module (30). In a 456th aspect according to the preceding aspect the control unit (50) is configured to control the movement of items on the diverging module (30) itself. In a 457th aspect according to any one of the two preceding aspects the control unit (50) is the same as the de-stratifying module (2).

In a 458th aspect according to any one of the preceding aspects, the control unit (50) is active in control on the first and second zones (31, 32) of the diverging module (30) and is configured to independently control said first and second zones (31, 32).

In a 459th aspect according to any one of the aspects from 330th to 458th, the sensor (54) of the conveyor is placed at the output (30*b*) of the diverging module (30) and is connected to the control unit (50), which is configured to control the movement of said first and second zones (31, 32) of the diverging module (30), optionally depending on the signal emitted by said sensor (54). In an 460th aspect according to any one of the aspects from 330th to 459th, the control parameter is representative of at least one of the following information: the presence of one or more items on the diverging module (30), the presence of one or more items at the output of the diverging module (30), the presence of one or more items at the input (30*a*) of the diverging module (30), the presence of one or more items at the at least one output from the converging module, the presence of one or more items at the input to the converging module. In an aspect according to any one of the preceding aspects said at least one sensor (54) comprises at least one of: a camera, a photocell.

In a 461st aspect a process for handling items (P) is provided. In a 462nd aspect according to any one of the preceding aspects, the process uses the conveyor (1) in accordance with any one of the preceding aspects. In a 463rd aspect according to any one of the preceding aspects the process comprises the step of arranging a plurality of bulk items on the de-stratifying form. In a 464th aspect according to the preceding aspect the step of arranging a plurality of bulk items on the de-stratifying form comprises the step of arranging a plurality of bulk items (P) directly on the first sector (3).

In a 465th aspect according to any one of the aspects from 461st to 464th, the process also comprises the steps of:

move at least part of said items along the first sector (3) in the direction of the second sector (4), move at least part of said items along the second sector (4) to the output (4*b*) of said second sector (4), unload at least part of said items from the de-stratifying module (2), exiting the second sector (4).

In a 466th aspect according to the preceding aspect the step of moving the items on the first sector (3) involves moving the upper surface (5) of said first sector (3). In a 467th aspect according to any one of the two preceding aspects the upper surface of the first sector moves by reciprocating motion. In a 468th aspect according to any one of the three preceding aspects the moving items on the first sector and the second sector move along the advancement trajectory (A). In a 469th aspect according to any one of the four preceding aspects, the step of moving the items on the second sector (4) involves moving the upper surface (6) of said second sector (4). In a 470th aspect according to any one of the five preceding aspects the upper surface (6) of said second sector (4) moves by reciprocating motion.

In a 471st aspect according to any one of the six preceding aspects the movement of items along the first sector (3) occurs along a descent tract. In a 472nd aspect according to any one of the seven preceding aspects the movement of items along the second sector (4) occurs along an ascent tract.

In a 473rd aspect according to any one of the eight preceding aspects, the first sector (3) moves one or more items directly resting on said sector at a first speed lower than a second speed of movement of the items directly on the second sector (4). In a 474th aspect according to the preceding aspect, the ratio between the second and first speed of movement of the items on said second sector and first sector is between 1.5 and 15, optionally between 1.5 and 10.

In a 475th aspect according to any one of the aspects from 461st to 474th the upper surface (5) of the first sector (3), during an active condition, moves according to a reciprocating motion. In a 476th aspect according to any one of the aspects from the 461st to the 475th the upper surface (6) of the second sector (4), during an active condition, moves according to a reciprocating motion.

In a 477th aspect according to any one of the aspects 461st to 476th, the process comprises the descent movement of items on the first sector and the arrangement of one or more of those items directly on the upper surface (61) of the intermediate sector (60), wherein the process then involves the movement of one or more items from the intermediate sector (60) directly to the second sector (4).

In a 478th aspect according to any one of the aspects from 461st to 477th, the process comprises the steps of:

move at least part of said items (P) along said de-stratifying module (2) in the direction of the sorter (10), unload at least part of said items from the de-stratifying module (2) onto the sorter (10), move at least part of said items (P) along said sorter along the advancement trajectory (A) in the direction of the at least one output of said sorter (10).

In a 479th aspect according to the preceding aspect, the items (P) moving on the sorter move along the main advancement direction defined by said sorter, which is transverse, optionally orthogonal, to the main advancement direction of the items (P) placed on the de-stratifying module (2).

In a 480th aspect according to any one of the two preceding aspects, the items resting on the sorter are moved away from the de-stratifying module (2).

In a 481st aspect according to any one of the three preceding aspects, the process comprises the steps of:

move at least part of said items (P) along the sorter (10) in the direction of the converging module (20), unload at least part of said items to the sorter (10) on the converging module, move at least part of said items (P) along said converging module along the advancement trajectory (A) in the direction of the output (20*b*) of said converging module (20).

In a 482nd aspect according to the preceding aspect, the items (P) moving on the converging module move along the main advancement direction defined by said converging module, which is transverse, optionally orthogonal, to the main advancement direction of the items (P) placed on the sorter (10).

In a 483rd aspect according to any one of the two preceding aspects, the items resting on the converging module are moved away from the sorter (10). In a 484th aspect any one of the three preceding aspects the step of moving the items from the sorter in the direction of the converging module comprises the steps of:

move the items placed on the sorter on the descent, move one or more items down the descent so that they may fall on the converging module.

In a 485th aspect according to any one of the aspects from 461st to 484th, the process also comprises moving a plurality of items, optionally arriving from the converging module via the diverging module.

In a 486th aspect according to any one of the aspects from 461st to 485th, items (P) comprise at least one of the following types of items: package, parcel, envelope.

BRIEF DESCRIPTION OF THE DRAWINGS

Some embodiments and aspects of the invention will be described below with reference to the attached drawings, provided for illustrative purposes only and therefore not limiting wherein.

DEFINITIONS AND CONVENTIONS

Figure 1:
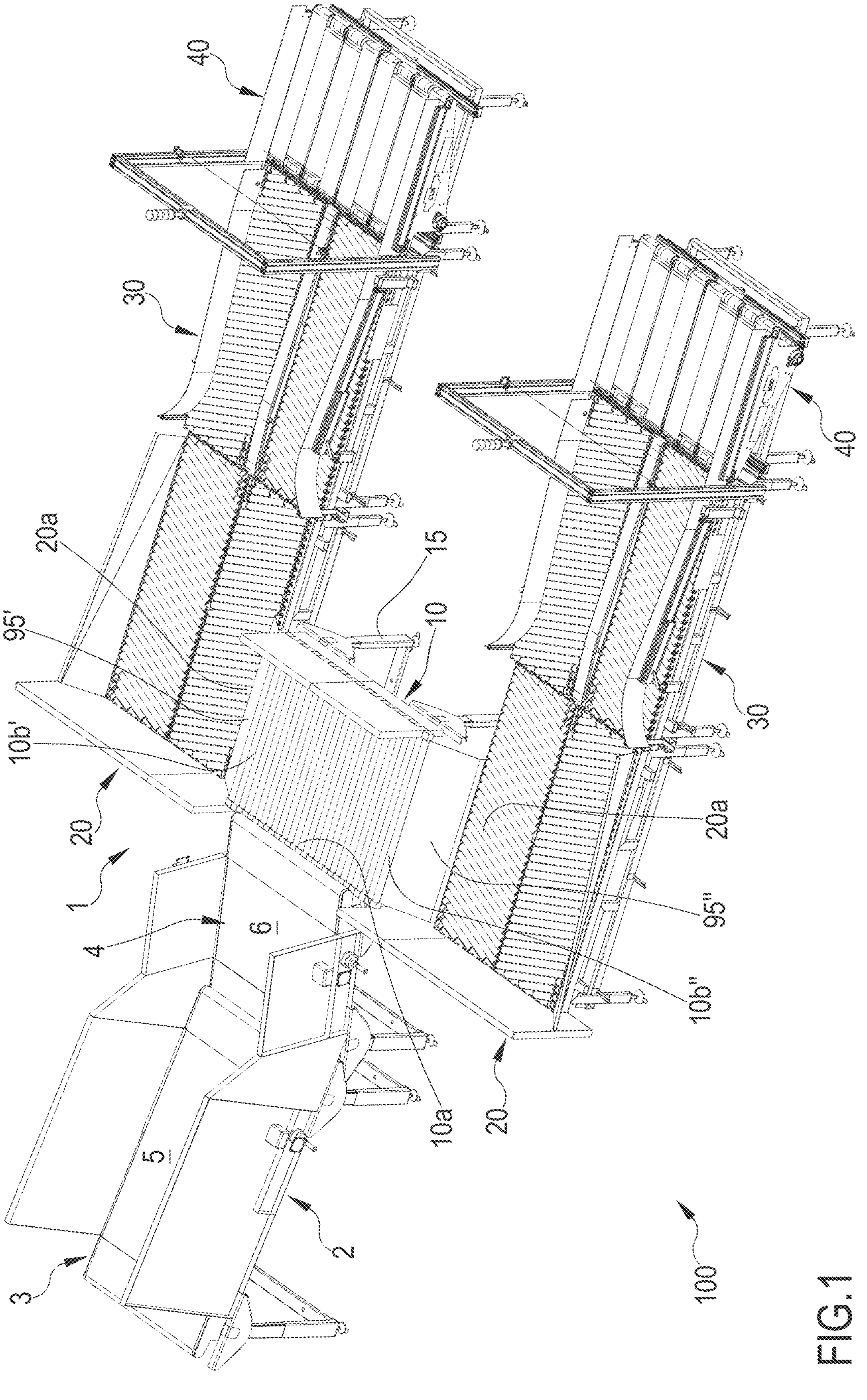
FIGS. 1 and 2 show an item handling system comprises at least one conveyor.

In this description, corresponding parts illustrated in the various figures are indicated by the same numerical references. The figures may illustrate the subject matter of the invention by means of representations that are not to scale; therefore, parts and components illustrated in the figures, relating to the subject matter of the invention, may relate only to schematic representations.

The terms “vertical,” “horizontal,” “under,” “under,” “over,” “above,” “descent,” and “ascent” refer to a condition of conveyor use during which the conveyor performs, or is usable for, the movement of items, such as from a collection station to one or more sorting areas along an advancement direction.

The term “singularized” refers to the arrangement of a plurality of items consecutively along one or more predetermined lines that are substantially parallel to the direction of advancement of the items.

The conveyor and/or handling system described and claimed below may comprises at least one control unit (50) that is responsible for controlling operating conditions put in place by the conveyor and/or handling system itself, as well as for controlling steps in the process of handling items. The control unit may be a single unit or consist of a plurality of distinct control units depending on design choices and operational requirements. By control unit is meant an electronic type component, which may comprises at least one of: a digital processor (CPU), an analog type circuit, or a combination of one or more digital processors with one or more analog type circuits. The control unit may be “configured” or “programmed” to perform certain steps: this may be accomplished in practice by any means that allows the control unit to be configured or programmed. For example, in the case of a control unit comprises one or more CPUs and one or more memories, one or more programs may be stored in appropriate memory banks attached to the CPU(s); the program(s) contain instructions that, when executed by the CPU(s), program or configure the control unit to perform the operations described in relation to the control unit. Alternatively, if the control unit is or comprises analog type circuitry, then the control unit circuitry may be designed to include circuitry configured, in use, to process electrical signals in such a way as to perform the steps related to the control unit.

Parts of the method described here may be implemented by means of a data processing unit, or control unit, which is technically substitutable for one or more electronic processors designed to execute a portion of a software program or firmware loaded onto a memory medium. Such a software program may be written in any programming language of a known type. The electronic processors, if two or more in number, may be interconnected by means of a data connection such that their computing powers are in any way shared; the same electronic processors may thus be installed in even geographically different locations, realizing through the aforementioned data connection a distributed computing environment.

The data processing unit, or control unit, may be a general purpose processor configured to perform one or more parts of the process identified in this disclosure through the software program or firmware, or be an ASIC or dedicated processor or FPGA specifically programmed to perform at least part of the operations of the process described here.

The memory medium may be non-transitory and may be internal or external to the processor, or control unit, or data processing unit, and may—specifically—be a memory geographically located remote from the processor. The memory medium may likewise be physically divided into multiple portions, or in cloud form, and the software program or firmware may be physically provide for portions stored on geographically divided portions of memory.

The term “item” means an object or compound of objects of any nature. The item may be of the type designed to contain one or more products of various kinds; for example, the item may comprise a package, a parcel, or a box. The item may be of any shape and size, a function of the type and size of the product housed in the item.

“Actuator” means any device capable of causing movement on a body, for example, upon command from the control unit (receipt by the actuator of a command sent by the control unit). The actuator may be electric (e.g., an electric motor), pneumatic, mechanical (e.g., a spring), or hydraulic (e.g., a hydraulic cylinder).

The term “active condition” means a condition during which at least part of the transport sector (e.g., at least one among the first sector, the second sector, and optionally the intermediate sector) is in motion to allow the movement of at least one item along an advancement trajectory.

The term “disabled condition” means a condition during which the transport sector (e.g., at least one of the first sector, the second sector, and optionally the intermediate sector) is stopped.

The term “operational condition” means a condition of the conveyor during which at least one of said transport sectors (e.g., at least one among the first sector, the second sector and optionally the intermediate sector) is in the active condition; in fact, the operational condition represents the combination of the active and inactive conditions of said transport sectors during which the movement of items along the advancement trajectory is expected.

DETAILED DESCRIPTION

Conveyor

The reference number 1 generally indicates a conveyor that may be used in the sector of handling facilities for various kinds of items, such as the mail sorting and distribution sector, the feeding and parcel distribution sector. Conveyor 1 may be employed to receive a plurality of bulk items and provide a singularized flow of items.

Figure 3:
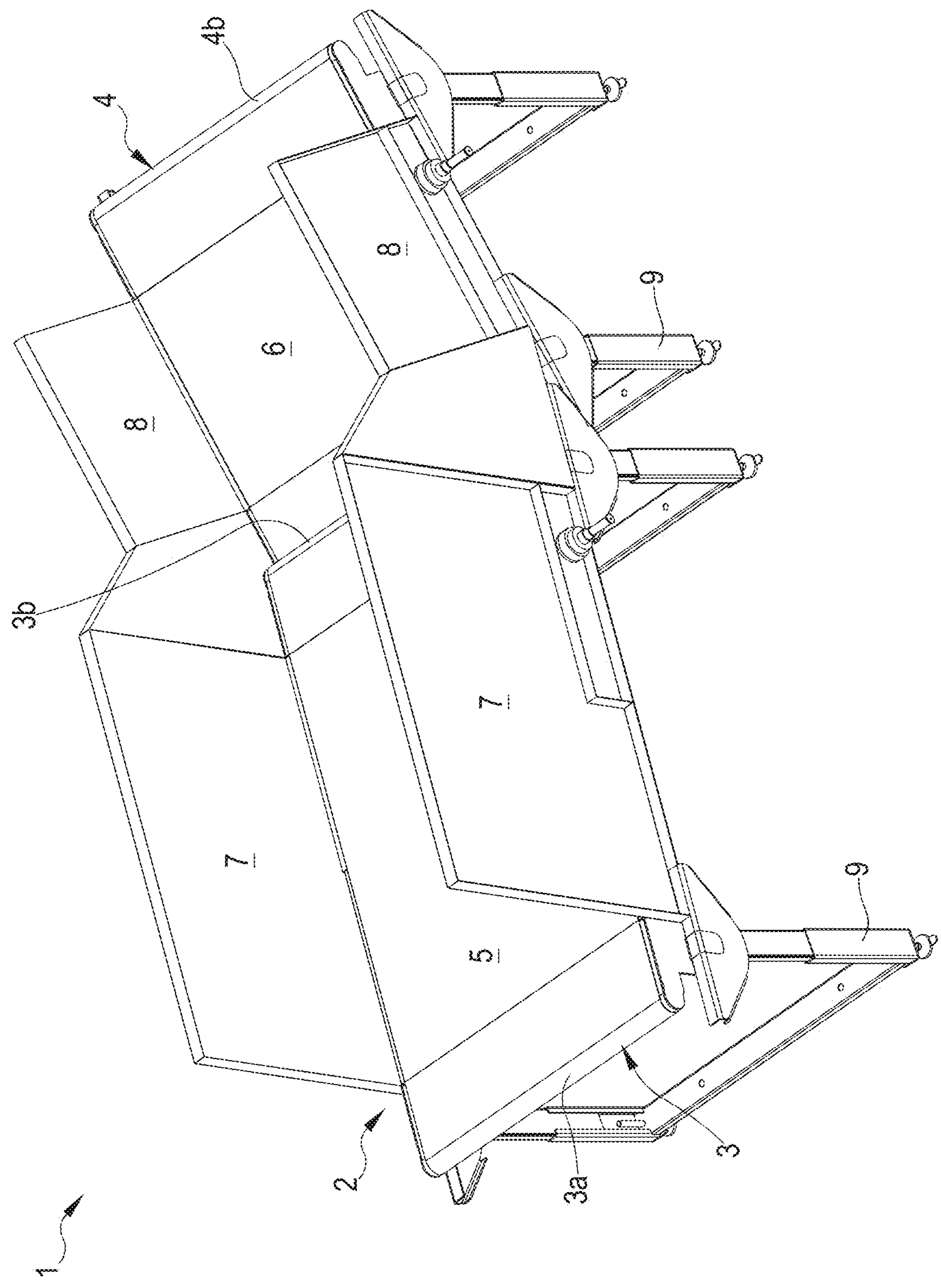
FIG. 3 is a perspective view of a de-stratifying module of a conveyor in accordance with a first realization form.
Figure 4:
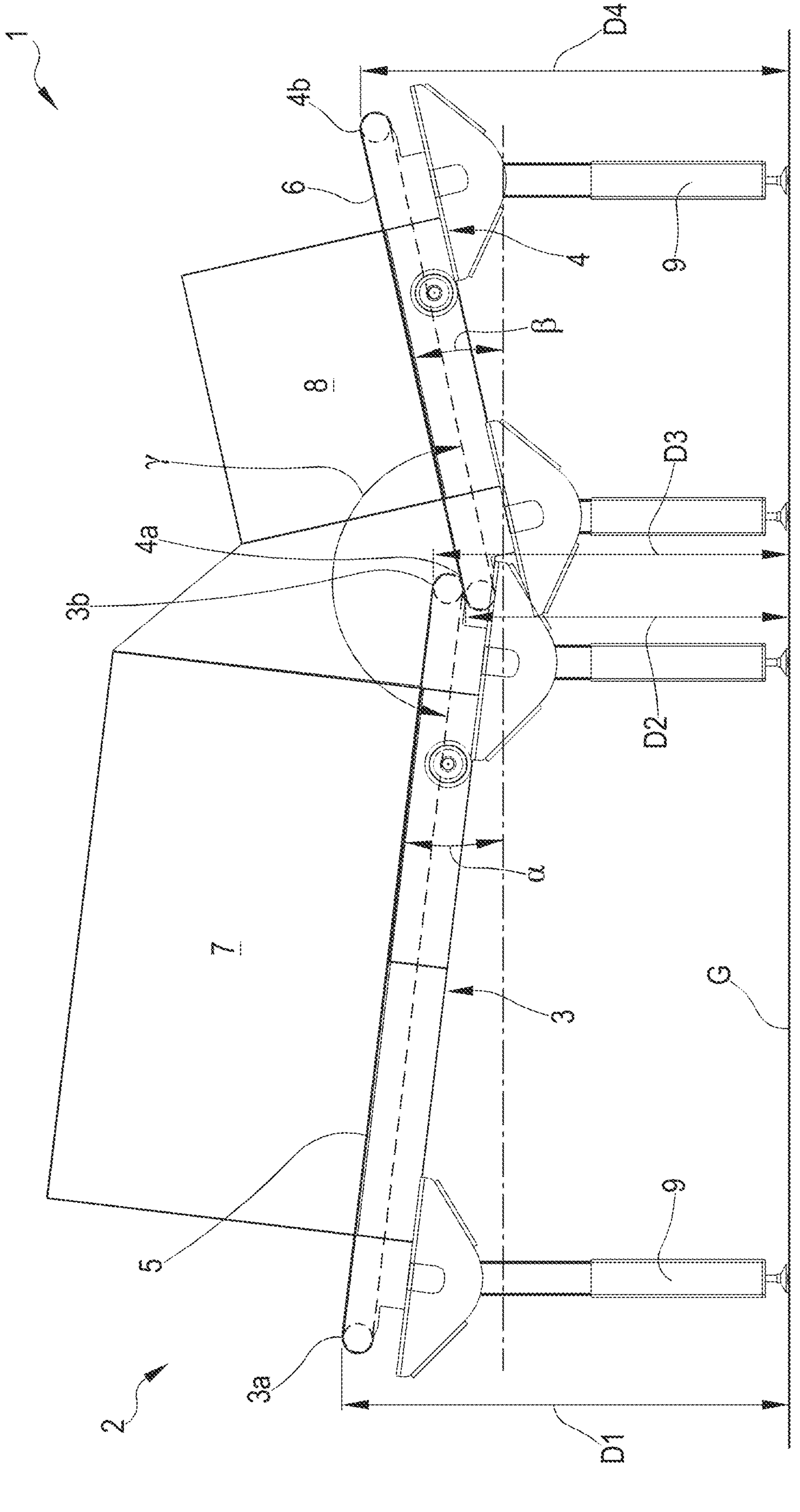
FIG. 4 is a side view of the de-stratifying module in FIG. 2.
Figure 5:
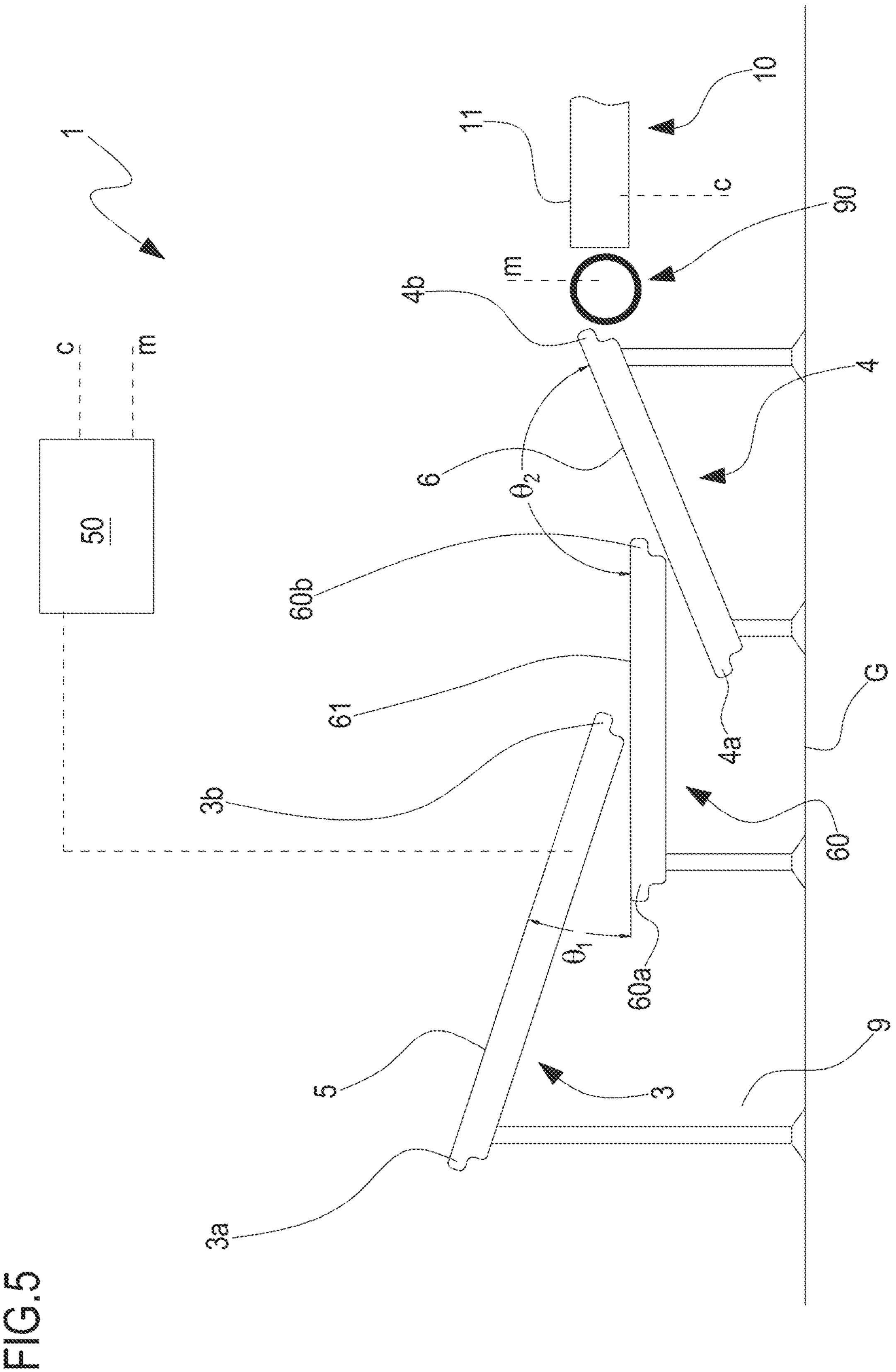
FIG. 5 is a side view of an additional de-stratifying module.

Conveyor 1 may comprise a de-stratifying module 2 (see FIGS. 3 to 5) configured to receive a plurality of bulk P items and move them along an advancement A trajectory. The detail, FIGS. 3 and 4 show a de-stratifying module 2 comprises only a first sector 3 immediately followed by a second sector 4 while FIG. 5 shows a de-stratifying module 2 comprises an intermediate sector 60, interposed between said first and second sectors 3, 4.

The sectors of the de-stratifying module are placed consecutively to each other with respect to the advancement trajectory A; in detail, the first sector 3 is configured to receive a plurality of bulk P items and move them to the second sector 4 which is configured to either receive P items directly from the first sector 3 or directly from the intermediate sector 60 and move them out of the de-stratifying module 2.

The first sector 3 comprises an upper surface 5 suitable for receiving one or more P items directly in support; the upper surface 5 defines a support plane tilted with respect to an ideal horizontal plane. The support plane of the first sector 3 may be tilted with respect to an ideal horizontal plane by a predetermined angle α (FIG. 4) to define a tilted path of the items, e.g., lower than 20°, optionally between 5° and 18°, even more optionally between 12° and 16°. In detail, the upper surface 5 of the first sector 3 is configured to define a downward path of the items.

The first sector 3 extends longitudinally between an input 3*a* and an output 3*b*, optionally to define a length of said first sector 3. In fact, the first sector 3 is configured to move items P along the advancement trajectory A from input 3*a* in the direction of output 3*b*: the upper surface 5 of the first sector 3 extends between said input 3*a* and output 3*b*. In detail, the upper surface 5 of the first sector 3 has a length defined by the distance present between input 3*a* and output 3*b* which may be between 1200 and 5000 mm, optionally between 1500 and 2500 mm. The length of the upper surface 5 defines the length of the first sector 3.

On the other hand, the width of the first sector 3 is measured orthogonally to the advancement trajectory A of the items on the first sector 3 and along the support plane defined by said upper surface 5, which may be lower than the length of the first sector 3. Specifically, the ratio of the length to the width of the upper surface 5 of the first sector 3 is more than 1.2, optionally between 1.5 and 2.5.

The second sector 4 has a respective upper surface 6 suitable for receiving one or more items P directly in support; the upper surface 6 of the second sector 4 defines a respective support plane which may be tilted with respect to an ideal horizontal plane on which said conveyor rests, for example, by a predetermined angle β (FIG. 4) greater than 5°, optionally between 10° and 30°, even more optionally between 20° and 30°. In detail, the upper surface 6 of the second sector 4 is configured to define an upward path of items. In fact, the actuation of the second sector 4 allows at least part of the plurality of items P to be moved either arriving from the first sector 3, or directly from the intermediate sector 60, ascent along the advancement trajectory A, toward the output from the de-stratifying module 2.

The support plane of the second sector 4 is tilted with respect to the support plane of the first sector 3, e.g., to define an angle of inclination γ greater than 120°, optionally between 130° and 160°: said angle γ being measured between the upper surfaces 5, 6 of the first and second sectors 3, 4 toward the support side of the P items (FIG. 4). The second sector 4 extends longitudinally between an input 4*a* and an output 4*b*, optionally to define a length of said second sector 4. The second sector 4 is configured to move the P items along the advancement trajectory A toward the output 4*b*, optionally between input 4*a* and output 4*b*.

As may be seen from FIG. 4, the upper surface 6 of the second sector 4 may extend between said input 4*a* and output 4*b* or as shown in FIG. 5, if either the first sector or the intermediate sector 60 are overlapping with the second sector 4, extend only for a tract of the total length of said sector ascent 4. For example, the ratio of the total length of the second sector 4 to the on upper surface 6 of the same sector may be more than 1.2, optionally between 1.5 and 3.

In more detail still, the total length of the second sector 4, defined by the present distance between input 4*a* and output 4*b*, may be more than 600 mm, optionally between 700 mm and 2000 mm, even more optionally between 700 mm and 1200 mm; the length of the upper surface 6 of the second sector 4, on the other hand, may be between 200 mm and 2000 mm, optionally between 400 mm and 1200 mm.

The total length of the second sector 4 may be equal to or lower than the length of the first sector 3; in detail, the ratio of the length of the first sector 3 to the length of the second sector 4 may be greater than 1.1, optionally be between 1.3 and 2. In contrast, the ratio between the length of the upper surface 5 of the first sector 3 and the length of the upper surface 6 of the second sector 4 may be between 0.2 and 1, optionally be between 0.2 and 0.7. In fact, this ratio varies depending on how much the ascent tract overlaps the descent tract or the intermediate tract 60.

On the other hand, the width of the second sector 4 is measured orthogonally to the advancement trajectory A of items P and along the support plane defined by the same surface 6, which may be lower than the length of said second sector 4. In detail, the ratio of the length to the width of the upper surface 6 of the second sector 4 is more than 1.2, optionally between 1.5 and 2.5. In detail, the width of the upper surface 6 of the second sector 4 may be between 700 and 2000 mm, optionally between 1000 and 1500 mm. As mentioned above, the second sector 4 may be placed immediately consecutive to the first sector 3 (optionally descent): in such a configuration, the upper surface 6 of the second sector receives the items P unloaded from the upper surface 5 of the first sector 3. The widths of the upper surfaces 5, 6 of the first and second sectors 3, 4 are equal; for example, the ratio between the widths of the upper surfaces 5, 6 of the first and second sectors 3, 4 is between 0.9 and 1.1.

As mentioned above, the de-stratifying module 2 may additionally comprise an intermediate sector 60 interposed between the first sector 3 and the second sector 4. If present, the intermediate sector 60 is configured to directly receive one or more items from the first sector 3 and move one or more items onto the second sector 4, again along the advancement trajectory A. As shown in FIG. 5, intermediate sector 60 is immediately consecutive to the first sector 3 and immediately upstream of the second sector 4 with respect to advancement trajectory A.

The intermediate sector 60 has a respective upper surface 61 also suitable for receiving in support one or more items P. The upper surface 61 of the intermediate sector 60 defines a respective support plane, which may be horizontal. In fact, the support plane defined by the upper surface 61 of the intermediate sector 60 may be tilted with respect to the support plane of the first sector 3 by an angle $\theta_1$, for example, between 150° and 175°, optionally between 160° and 170°, and tilted by an angle $\theta_2$ with respect to the support plane defined by the second sector 4, for example, between 140° and 170°, optionally between 150° and 160°. The upper surface 61 of intermediate sector 60 is configured to define a flat path. The presence of intermediate sector 60 may make it possible to avoid, under some special conditions, excessive accumulation of items between the first sector and the second sector.

The intermediate sector 60 extends longitudinally between an input 60*a* and an output 60*b*, optionally defining a length of said intermediate sector. Intermediate sector 60 may also be at least partially overlapping at least one between the first sector and the second sector; in fact, depending on the level of overlap, an extension of the upper surface 61 is determined.

In fact, the total length of the intermediate sector 60, defined by the maximum distance between input 60*a* and output 60*b*, may be more than 600 mm, optionally between 700 mm and 2000 mm, even more optionally between 700 mm and 1200 mm; conversely, depending on the level of overlap of said sector with the first sector, the length of the upper surface 61 is determined, which extends for at least a part of the tract between input 60*a* and output 60*b* of intermediate sector 60. As visible in FIG. 5, the upper surface 61 may in fact extend in length from output 60*b* to an intermediate zone of said intermediate sector 60. Quantitatively, the length of the upper surface 61 of intermediate sector 60 may thus be between 200 and 2000 mm, optionally between 400 and 1200 mm. In fact, the ratio of the total length of intermediate sector 60 to the on upper surface 61 of the same sector may be more than 1.2, optionally between 1.5 and 3.

The width of the intermediate sector is also measured orthogonally to the advancement trajectory A and along the support plane defined by the intermediate sector, which may be lower than the length of the same sector. For example, the ratio of the length to the width of the upper surface 61 of the intermediate sector 60 may be between 0.3 and 2. Quantitatively, the width of the upper surface 61 of intermediate sector 60 may be between 500 and 2000 mm, optionally between 700 and 1500 mm.

On the other hand, the ratio of the length of the first sector 3 to the length of the intermediate sector 60 may be more than 1.1, optionally it is between 1.3 and 2, while the ratio of the length of the second sector 4 to the length of the intermediate sector 60 may be between 0.7 and 2, optionally between 0.8 and 1.5.

As mentioned above, depending on the level of sector overlap, the length of the support surfaces may vary, independent of the total length of the transport sector. For example, the ratio of the length of the upper surface 5 of the first sector 3 to the length of the upper surface 61 of the intermediate sector 60 may be between 0.2 and 1, optionally between 0.2 and 0.7; the ratio of the length of the upper surface 6 of the second sector 4 to the length of the upper surface 61 of the intermediate sector 60, on the other hand, may be between 0.7 and 2, optionally between 0.8 and 1.5.

The de-stratifying module 2 may comprise a frame 9 that supports said first and second sectors 3, 4 and, if present, the intermediate sector 60 and allows them to be spaced from the ground.

Input 3*a* and output 3*b* of the first sector 3 are placed at different distances from the ground G. For example, input 3*a* of the first sector 3 may be placed at a distance D1 from the ground G while output 3*b* of the first sector 3 may be placed at a distance D2 from the ground lower than the distance D1 (FIG. 4). Quantitatively, the distance D1 may be between 800 and 1700 mm, optionally between 1000 and 1500; however, the distance D2 may be between 600 and 1500, optionally between 700 and 1200 mm.

Similarly, input 4*a* and output 4*b* of the second sector 4 are placed at different distances from the ground G. For example, input 4*a* of the second sector 4 may be placed at a distance D3 from the ground while output 4*b* of the second sector 4 may be placed at a distance D4 from the ground, which is greater than distance D3 (FIG. 4). Quantitatively, the distance D3 may be between 600 and 1500 mm, optionally between 700 and 1200, while the distance D4 may be between 800 and 1700, optionally between 1000 and 1500 mm.

As shown in FIG. 4, in the absence of the intermediate sector, the output 3*b* of the first sector 3 may be placed at the input 4*a* of the second sector 4. In detail, the output 3*b* of the first sector 3 may be placed above the input 4*a* of the second sector 4: thus, the first sector 3 may unload one or more items at the input 4*a* of the second sector 4. The distance D1 present between input 3*a* of the first sector 3 and the ground may be greater than the distance D4 present between output 4*b* of the second sector 4 and ground G (FIG. 3).

If the intermediate sector 60 is present, this may be placed at least partially below the output 3*b* of the first sector 3 so that the latter may directly unload items onto the upper surface 61. Under this condition, input 60*a* of intermediate sector 60 is placed below the entire first sector.

Additionally, the intermediate sector 60 may be at least partially placed above the second sector 4 so that said intermediate sector 60 may arrange the items directly on the upper surface 6. Under this condition, the output 60*b* of the intermediate sector is placed above the input 4*a* of the second sector 4 while the output 4*b* of the latter is instead placed at a greater height than the height at which the output 60*b* of the intermediate sector 60 is placed (FIG. 5).

Functionally, the first sector 3 is configured to move the plurality of items P placed on the upper surface 5: the movement of items is imparted by the movement of the upper surface 5 of the first sector 3, which generates a movement of one or more items resting on that surface.

In detail, the first sector 3 is configured to move an ideal point on the upper surface 5 of said first sector 3 at a first speed. The first speed may be constant or variable during the active condition. For example, the first sector 3 may be configured to move at least a part of the upper surface 5 (optionally an ideal point of the upper surface 5) according to continuous motion and/or intermittent motion and/or reciprocating motion. In case of continuous motion, the first speed imparted by the first sector 3 may be constant or variable. In case of intermittent or reciprocating motion, the speed imparted by the first sector 3 is variable during the active condition. The first speed may be between 0.07 m/s and 0.5 m/s, even more optionally between 0.09 m/s and 0.3 m/s, even more optionally between 0.09 m/s and 0, 2 m/s.

In a preferred but not limiting embodiment, the first sector 3, during the active condition, is configured to move at least a part of the upper surface (optionally at least an ideal point of the upper surface 5) according to a reciprocating motion, during which said first sector 3 performs at least one reversal of motion. In detail, during the reciprocating motion the first sector 3 is configured to:

perform a plurality of advancement displacements of an ideal point of the upper surface 5 of said first sector 3, wherein each advancement displacement is performed at an advancement rate, perform a plurality of return displacements of the same ideal point of the upper surface 5 of said first sector 3, wherein each return displacement is performed at a return speed.

During the reciprocating motion, two consecutive advancement displacements are interspersed with a return displacement (optionally the return displacement is interposed between two advancement displacements to define a reciprocating motion of the first sector 3). In greater detail, the first sector 3, during the advancement displacement, is configured to move an ideal point of the upper surface 5 approaching the output 3*b* of the same first sector 3. In greater detail still, the first sector 3, during the return displacement, is configured to move an ideal point of the upper surface 5 of said first sector 3 approaching the input 3*a* of the same first sector 3. Similarly, during the intermittent motion two consecutive advancement displacements are interspersed with a stop of the first sector.

The advancement speed of an ideal point on the upper surface 5, during the advancement displacement, has the same trajectory and opposite direction as the return speed during the return displacement of the same ideal point on the upper surface 5. For the displacement of items along the advancement trajectory A and toward the second sector 4, a advancement displacement greater than the return displacement may be expected; to make this advancement displacement greater than the return displacement, it is possible to work on the time duration of the displacements (e.g., the duration of the advancement displacement is greater than the duration of the return displacement) and/or it is possible to work on the speed modules. For example, the ratio of the advancement speed (optionally the advancement speed module) to the return speed (optionally the return speed module) of the first sector 3 may be between 0.5 and 5, optionally between 0.8 and 4, even more optionally between 1 and 3. In a nonlimiting form of realization, the modulus of the advancement speed defined by the first sector 3 is greater than the modulus of the return speed defined by the same first sector 3. The resultant of the advancement speed and the return speed defines the first speed of the first sector 3. The advancement speed (optionally the modulus of the advancement speed) of an ideal point on the upper surface 5 of the first sector 3 is between 0.1 m/s and 0.5 m/s, even more optionally between 0.1 m/s and 0.4 m/s. As may be seen, for reciprocating motion, the modulus of the advancement speed is greater than the first speed because it is compensated by the speed of the return modulus.

As mentioned above, in order to determine an advancement displacement greater than the return displacement, the modulus (length) of the advancement and return displacements may also be operated as a alternative or in addition to a speed adjustment. For example, the ratio between the modulus of the advancement displacement of an ideal point of the upper surface 5 of said first sector 3 and the modulus of the return displacement of the same ideal point of the upper surface 5 of said first sector 3 may be between 1.5 and 5, optionally between 1.5 and 3. In fact, the same function of advancing the upper surface may be obtained by keeping the advancing velocities and the return speed with the same modulus and opposite direction, operating, however, with run times. Maintaining a modulus of the advancement speed equal to the modulus of the return speed for the same run time actually results in a cycle where the net advance is zero. On the other hand, maintaining an advancement time twice as long as the return time results in objects advancing at least the difference between the advancement space.

Of course, a combined movement of the first sector 3 may be provided. In fact, depending on the requirements, it is possible to selectively activate a movement according to a reciprocating, continuous and intermittent motion.

The second sector 4 is also configured to move the plurality of items P placed on the upper surface 6. In detail, the movement of the items is imparted by the movement of the upper surface 6 of second sector 4 which generates a movement of one or more items resting on that surface.

In detail, the second sector 4 is configured to move an ideal point on the upper surface 6 of said second sector 4 at a second speed. The second speed may be constant or variable during the active condition. For example, the second sector 4 may be configured to move at least a part of the upper surface 6 (optionally an ideal point of the upper surface 6) according to continuous motion and/or intermittent motion and/or reciprocating motion. In case of continuous motion, the first speed imparted by the second sector 4 may be constant or variable. In case of intermittent motion or reciprocating motion, the speed imparted by the second sector 4 is variable during the active condition. The second speed may be between 0.5 m/s and 2 m/s, even more optionally between 0.6 m/s and 1.5 m/s, even more optionally between 0.6 m/s and 1.3 m/s.

In a preferred but not limiting embodiment of the invention, the second sector 4, during the active condition, is configured to move at least a part of the upper surface (optionally at least an ideal point of the upper surface 6) according to a reciprocating motion, during which said second sector 4 performs at least one reversal of motion. In detail, during the reciprocating motion the second sector 4 is configured to:

perform a plurality of advancement displacements of an ideal point of the upper surface 6 of said second sector 4, wherein each advancement displacement is performed at an advancement rate, perform a plurality of return displacements of the same ideal point of the upper surface 6 of said second sector 4, wherein each return displacement is performed at a return speed.

During the reciprocating motion, two consecutive advancement displacements are interspersed with a return displacement (optionally the return displacement is interposed between two advancement displacements to define an reciprocating motion of the second sector 4). In greater detail, the second sector 4, during the advancement displacement, is configured to move an ideal point of the upper surface 6 approaching the output 4*b* of the same second sector 4. In greater detail still, the second sector 4, during the return displacement, is configured to move an ideal point of the upper surface 6 of said second sector 4 approaching the input 4*a* of the same second sector 4. Similarly, during the intermittent motion two consecutive advancement displacements are interspersed with a stop phase of the second sector.

In the case of reciprocating motion, the advancement speed of an ideal point of the upper surface 6 of said second sector 4, during the advancement displacement, has the same trajectory and opposite direction as the return speed during the return displacement of the same ideal point of the upper surface 6 of said second sector 4. For the displacement of the items along the advancing trajectory A and exiting the de-stratifying module 2, it is possible to predict an advancing displacement greater than the returning displacement; to make this advancing displacement be greater than the returning displacement, it is possible to work on the time durations of the displacements (e.g., the duration of the advancing displacement is greater than the duration of the returning displacement) and/or it is possible to work on the speed modules. For example, the ratio of the advancement speed (optionally the advancement speed module) to the return speed (optionally the return speed module) in the first sector 3 may be between 0.5 and 5, optionally between 0.8 and 4, even more optionally between 1 and 3. In a non-limiting form of realization, the modulus of the advancement speed defined by second sector 4 is greater than the modulus of the return speed defined by the same second sector 4.

The resultant of the advancement speed and the return speed defines the second speed of the second sector 4. The advancement speed (optionally the modulus of the advancement speed) of an ideal point on the upper surface 6 of the second sector 4, during the active condition, is between 0.5 m/s and 2.5 m/s, still more optionally between 0.7 m/s and 2 m/s, still more optionally between 0.8 m/s and 2 m/s. As may be seen, for reciprocating motion, the modulus of the advancement speed is greater than the second speed because it is compensated by the speed of the return modulus.

As mentioned above, in order to determine an advancement displacement greater than the return displacement, the modulus (length) of the advancement and return displacements may also be operated as an alternative or in addition to a speed adjustment. For example, the ratio between the modulus of the advancement displacement of an ideal point of the upper surface 6 of said second sector 4 and the modulus of the return displacement of the same ideal point of the upper surface 6 of said second sector 4 may be between 1.5 and 5, optionally between 1.5 and 3.

As mentioned above for the first sector, it is also possible for the second sector to maintain the same modulus between advancement speed and return and work on different run times. In fact, maintaining a modulus of the advancement speed equal to the modulus of the return speed for the same run time results in a cycle where the net advancement speed is zero. On the other hand, maintaining an advancement time twice as long as the return time results in objects advancing at least the difference between the advancement space.

Additionally, a combined movement of the second sector 4 may be provided. In fact, depending on the requirements, it is possible to selectively activate a movement according to a reciprocating, continuous and intermittent motion.

Figure 7A:
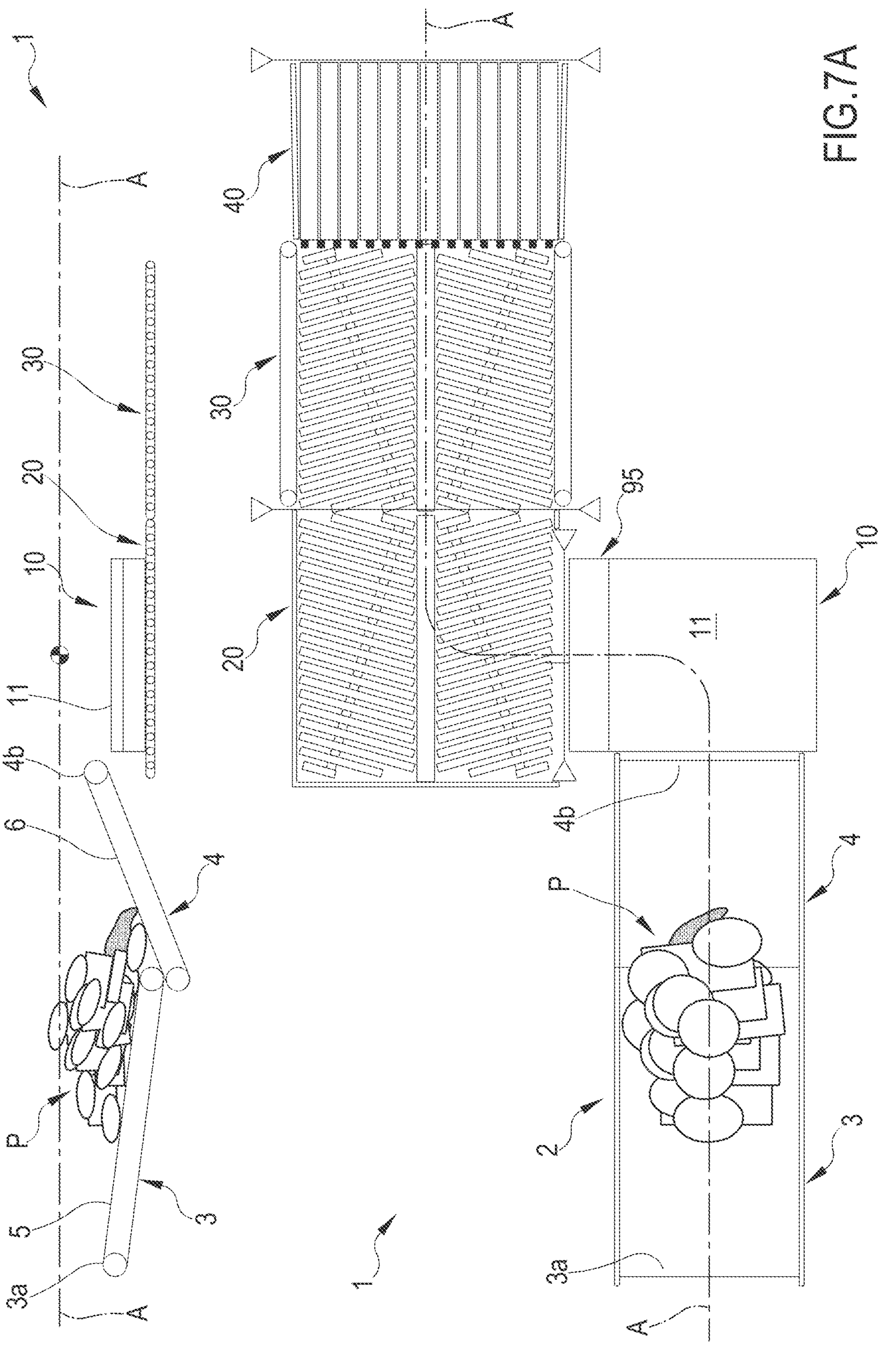
FIGS. 7A through 7C are schematic views showing the movement of a plurality of items by a conveyor.
Figure 7B:
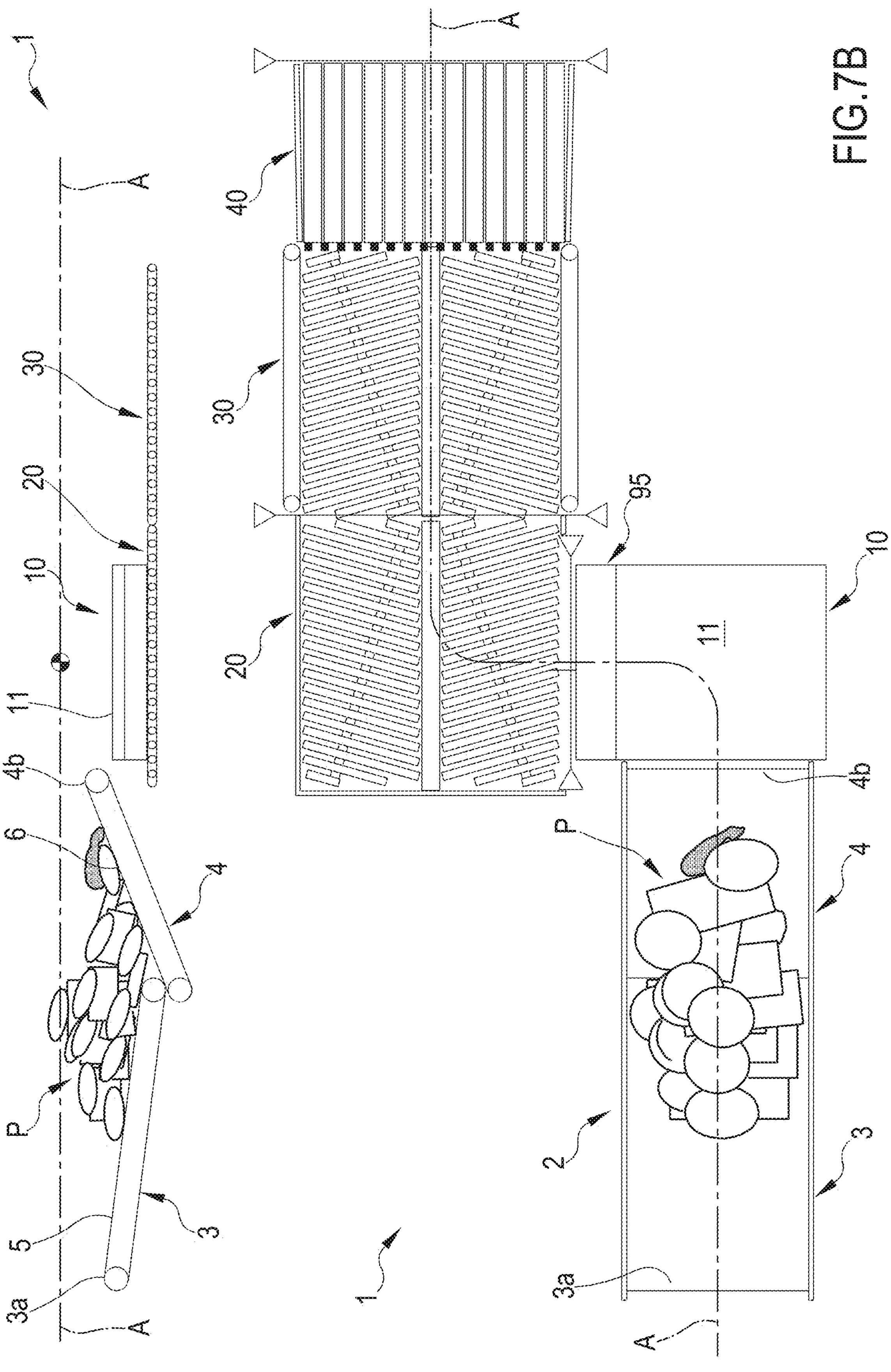
Figure 7C:
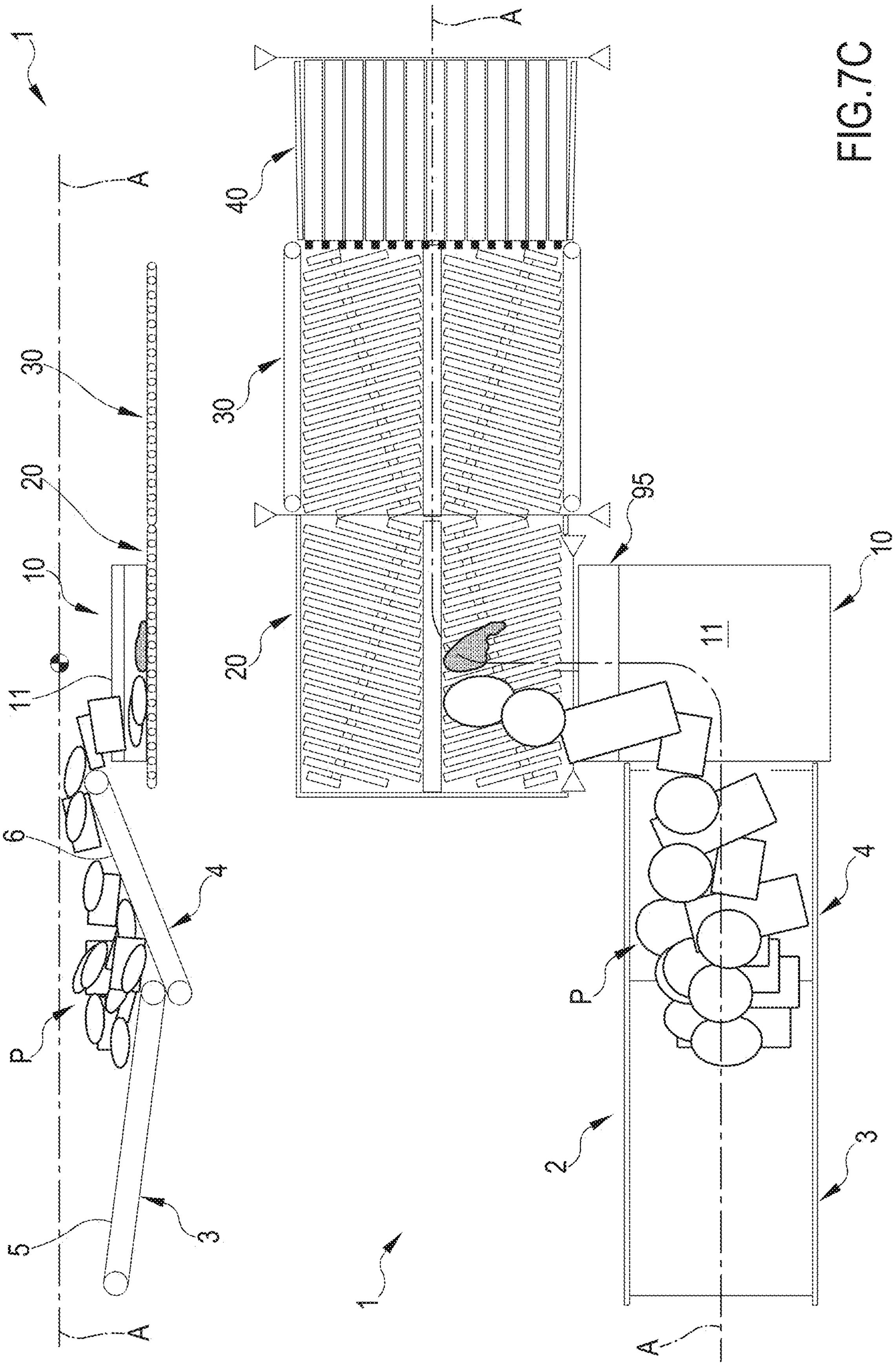

The first speed of the first sector 3 (in the case of reciprocating motion, the modulus of the first speed i.e., the resultant between the advancement and return speeds) may be lower than the second speed of the second sector 4; in particular, the ratio of the second speed to the first speed may be between 1.5 and 15, optionally between 1.5 and 10, even more optionally between 2 and 7. The two different speed profiles allow the second sector 4 to quickly carry away incoming items from the first sector 3 and resting on the second surface: thus, the speed variations between the two sectors (3 and 4) helps the de-stratifying module 2 to arrange P items (e.g., parcels) possibly overlapping on a single plane. This condition is schematically illustrated in FIGS. 7A to 7C; as may be seen, the second sector 4, as soon as the items reach the upper surface 6, they are taken away from said second sector 6: the stack of P items placed on the first sector 3 is somehow flattened so as to arrange the largest number of items on a single plane. The upward slope of the second sector, and optionally also the downward slope defined by the first sector 3, help to drop any P items placed above others in such a way as to de-stratify one or more overlapping items.

As mentioned above, in addition to or as an alternative to varying velocities it is possible to work with run times. Again, to effectively move items away from the first sector 3 in the desired manner, it is possible to keep the same module for the first and second velocities and work on different run times. In this way, instead of working on different speed modules it is possible to work with different displacements, i.e., to generate a advancement displacement of the upper surface (or resultant of the advancement displacement in the case of reciprocating motion) of the second sector 4 (or if present from the intermediate sector 60) that is greater from the advancement displacement (or resultant of the advancement displacement in the case of reciprocating motion) of the upper surface of the former first sector 3.

in case of a drop of a large amount of items on the de-stratifying module 2, it is also possible to initiate a reciprocating or intermittent motion of at least one between the first sector 3 and the second sector 4. The reciprocating or intermittent motion allows inducing a kind of oscillatory motion of the stack of items that facilitates the dropping of overlapping items in order to generate as linearized a flow of items as possible.

Additionally, the movement of first sector 3 may be independent of the movement of second sector 4. In fact, conveyor 1 provides an operating condition during which at least one of said first sector 3 and second sector 4 is in the active condition. For example, first sector 3 and second sector 4 may have a simultaneous active condition; in such a situation, first sector 3 guides one or more items to second sector 4 while the latter moves, if any, one or more items out of de-stratifying module 2. Alternatively, at least one between the first sector 3 and ascent 4 may be in the active condition while the other may be in an inactive condition (in the inactive condition the upper surface of the sector in question is stationary). In this way, conveyor 1 may selectively activate the transport sector of interest to create as smooth and linearized a flow of items out of the de-stratifying module as possible.

As mentioned above, if present, the intermediate sector 60 prevents unwanted accumulation of items entering the second sector 4 thus allowing the latter to effectively de-stratify any overlapping items. If intermediate sector 60 is present, it too is mobile independent of sectors 3 and 4 so that each sector may serve the correct number of items to the immediately consecutive sector or exiting from de-stratifying module 2. For example, intermediate sector 60 is also configured to move, during an active intermediate sector condition, the plurality of items P placed on the upper surface 61. In detail, the movement of the items is imparted by the movement of the upper surface 61 of the intermediate sector 60, which generates a movement of one or more items resting on said surface 61.

In detail, intermediate sector 60 is configured to move an ideal point of the upper surface 61 of said intermediate sector 60 at a third speed, either constant or variable. For example, intermediate sector 60 may be configured to move at least a part of upper surface 61 (optionally an ideal point of upper surface 61) according to continuous motion and/or intermittent motion and/or reciprocating motion. In case of continuous motion, the first speed imparted by the intermediate sector 60 may be constant or variable. In case of intermittent or reciprocating motion, the speed imparted by intermediate sector 60 is variable during the active condition. The third speed may be between 0.1 m/s and 1.2 m/s, even more optionally between 0.3 m/s and 1 m/s.

In a preferred but not limiting embodiment of the invention, the intermediate sector 60 is configured to move at least part of the upper surface according to a continuous motion. Of course, the possibility of providing an reciprocating or intermittent motion of the intermediate sector 60 is not excluded. Additionally, a combined motion of intermediate sector 60 may be provided. In fact, depending on the requirements, it is possible to selectively activate a movement according to a reciprocating, continuous and intermittent motion.

The third speed is higher than the movement speed of the preceding first sector 3 and lower than the consecutive second sector 4. The higher speed of the downstream sector allows items to be taken away quickly from the preceding sector, allowing them to be de-stratified.

The movement of the intermediate sector 60 may also be independent of that of the first sector 3 and the second sector. In fact, conveyor 1 provides an operating condition during which at least one of these sectors is in the active condition. For example, the first sector 3, intermediate sector 60 and second sector 4 may have a simultaneous active condition or, alternatively, at least one among the first sector 3, intermediate sector 60 and second sector 4 may be in the active condition while the other may be in an inactive condition (in the inactive condition, the upper surface of the sector in question is stationary). In this way, conveyor 1 may selectively activate the sector of interest to create as smooth and linearized a flow of items out of the de-stratifying module as possible.

Conveyor 1 may comprise a control unit 50 active in command over the sectors of the de-stratifying module and configured to independently command the activation said sectors (e.g., the active and inactive condition of each sector) as well as independently control the motion type and movement speeds of each sector.

The conveyor 1 may comprise at least one active sensor at the de-stratifying module 2 and connected with the control unit 50; the sensor may comprise at least one of a camera, a photocell, and be configured to emit a signal representative of at least one control parameter, for example, representative of at least one of the following information: the presence of one or more items on the upper surface 5 of the first sector 3, the presence of one or more items at the output 3*b* of the first sector 3, the presence of one or more items at the input 3*a* of the first sector. The control unit 50 may be configured to control at least the activation of said first sector 3 according to the signal emitted by said sensor.

Identically, control unit 50 may also be active in command over the second sector 4 and, if present, intermediate sector 60 to independently control the activation/deactivation of these sectors as well as the motion parameters of each sector during the active condition.

Figure 2:
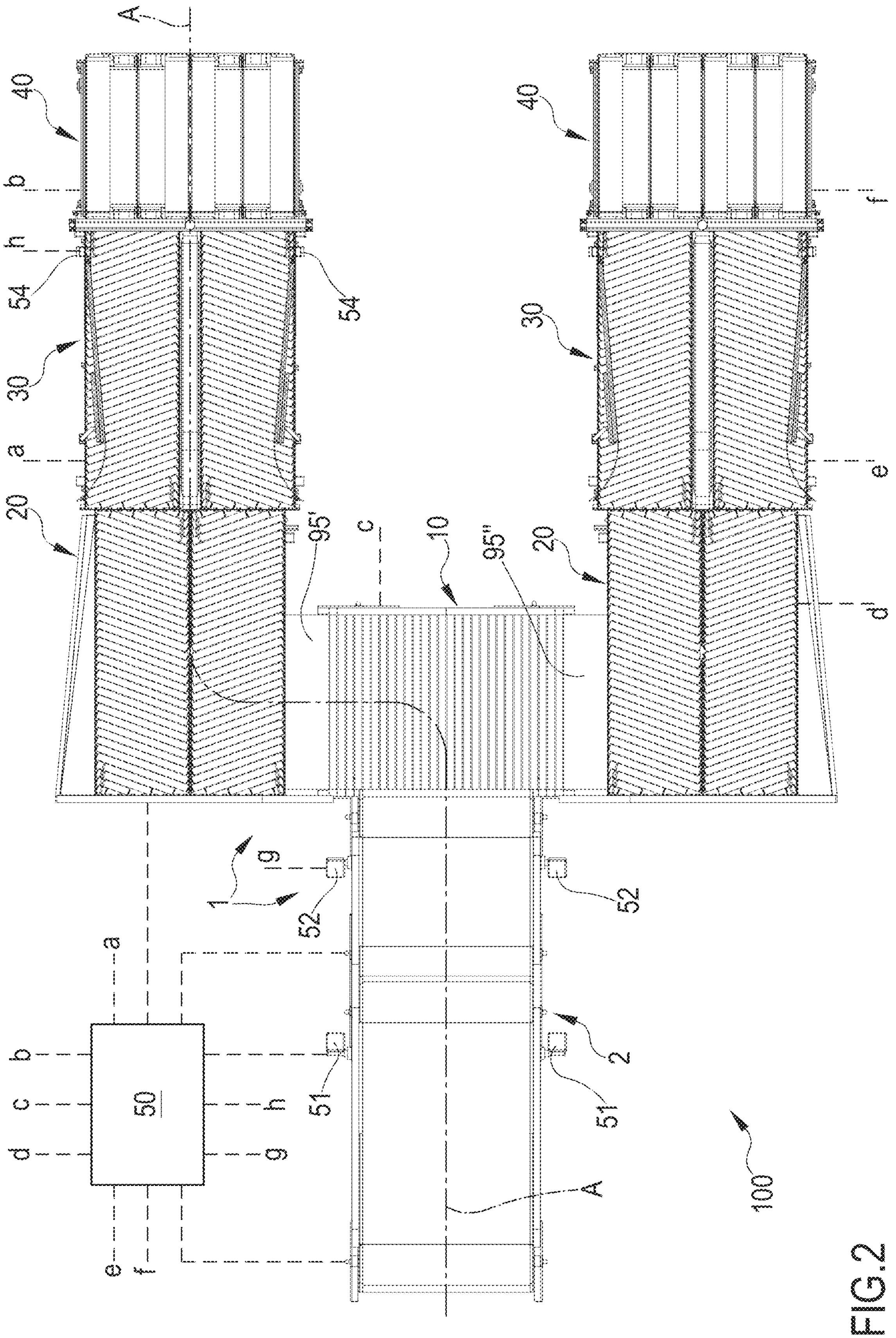

The at least one active sensor at the de-stratifying module 2 may comprises at least one first and at least one second sensor 51, 52 associated with the first sector 3 and ascent 4, respectively (FIG. 2). The first sensor 51 is connected to the control unit 50 and configured to emit a signal representative of the presence of one or more items at output 3*b* of the first sector 3 while the second sensor 52 is connected to the control unit 50 and configured to emit a signal representative of the presence of one or more items at output 4*b* of the second sector 4. The control unit is configured to receive the signals from the first and second sensors 51, 52 and control, according to said signals, the movement of said first sector 3 and second sector 4 (and if the intermediate sector is present) to control the movement of items P placed on said sectors.

In detail, the control unit 50 may be configured to selectively control, independently, the activation/deactivation of each transport sector, for example according to at least one signal emitted by an active sensor at the de-stratifying module 2. Further, the control unit is configured to independently control each sector to control its motion parameters during the active condition. In this way the control unit, depending on the signals emitted by the at least one sensor is configured to manage as effectively as possible the movement of the items placed on the de-stratifying module this to generate, already at this module 2 a homogeneous and as linearized as possible flow of items.

Structurally, the first sector 3 may comprises at least one of: a conveyor belt, a roller conveyor, a conveyor belt with a plurality of rollers integrated. A first sector 3 comprising a conveyor belt slidingly wrapped around two idler rollers (optionally end rollers) and further presenting one or more free rollers interposed between the idler rollers, configured to support an upper tract of said conveyor belt (i.e., the upper surface 5), has been illustrated in a non-limiting way in the attached figures. The first sector 3 comprises at least one actuator, such as an electric motor, configured to move the conveyor belt. The actuator in the first sector 3 may be active on at least one of the rollers in the first sector 3 to define a motorized roller. The control unit 50 may then be active in command on the actuator of the first sector 3 to control the active and stop condition of the first sector 3.

The conveyor belt in the first sector 3 may be at least partly, optionally entirely, made of rubber so that the belt itself may define, in cooperation with the items resting on it, a coefficient of friction suitable for ensuring the movement, e.g., descent, of items along the advancement trajectory A of the de-stratifying module.

Similarly, the second sector 4 may comprises at least one of: a conveyor belt, a roller conveyor, a conveyor belt with integrated a plurality of rollers. Illustrated in a non-limiting way in the attached figures is a second sector 4 comprising a conveyor belt slidingly wound around two idler rollers and further presenting one or more free rollers interposed between the idler rollers, optionally configured to support an upper tract of said conveyor belt (i.e., upper surface 6). The second sector 4 comprises at least one actuator, such as an electric motor, configured to move the conveyor belt. The actuator of the second sector 4 may be active on at least one of the rollers of the roller conveyor to define a motorized roller. The control unit 50 may then be active in control on the actuator of the second sector 4 and configured to control the active and stop condition of the second sector 4.

For example, the conveyor belt in the second sector 4 is at least partly, optionally entirely, made of rubber so that the belt itself may define, in cooperation with the items resting on it, a coefficient of friction suitable for ensuring the movement, e.g., ascent, of the items along the advancement trajectory A.

The intermediate sector 60 may comprises the same structure as the first and second sectors as shown in FIG. 5 and thus present a conveyor belt wound between two idlers.

The conveyor belt in intermediate sector 60 may also at least partly, optionally entirely, be made of rubber so that the belt itself may define, in cooperation with the items resting on it, a coefficient of friction suitable for ensuring the movement of the items along the advancement trajectory A.

A de-stratifying module 2 wherein the first sector, the second sector and, if present, the intermediate sector, comprises respective conveyor belts, optionally made of rubber, has been illustrated in a non-limiting way in the attached figures.

Conveyor belts in such sectors of the de-stratifying module 2 may be made from the same material so that the same sectors may define with one item, essentially the same coefficient of friction. Alternatively, the conveyor belts may be made from different materials so that the same may define, with the same item, different coefficients of friction. For example, if present first sector 3, intermediate 60 and ascent 4, these may have belts made of different materials such that:

- the coefficient of friction defined between an item and the conveyor belt in the first sector 3 is lower between the coefficient of friction defined between the same item and the intermediate sector 60,
- the coefficient of friction defined between an item and the conveyor belt of intermediate sector 60 is lower between the coefficient of friction defined between the same item and the second sector 4.

If the de-stratifying module 2 comprises only the first and second sectors 3, 4, the coefficient of friction defined between an item and the conveyor belt in the first sector 3 is lower than the coefficient of friction defined between the same item and the second sector 4.

In fact, the increasing coefficient of friction between consecutive stations along the advancement trajectory increases the ability to carry away an item from the preceding sector and thus de-stratify items placed on the de-stratifying module 2.

Conveyor 1 may comprises only the de-stratifying module 2 (FIGS. 3 and 4) described above and thus may be used to receive P items in bulk to arrange at least part of the overlapping items on a single floor; in fact, de-stratifying module 2 is configured to arrange, at output 4*b* of the second sector 4, more items on a single floor, avoiding, as far as possible, the provision of overlapping items.

Figure 8:
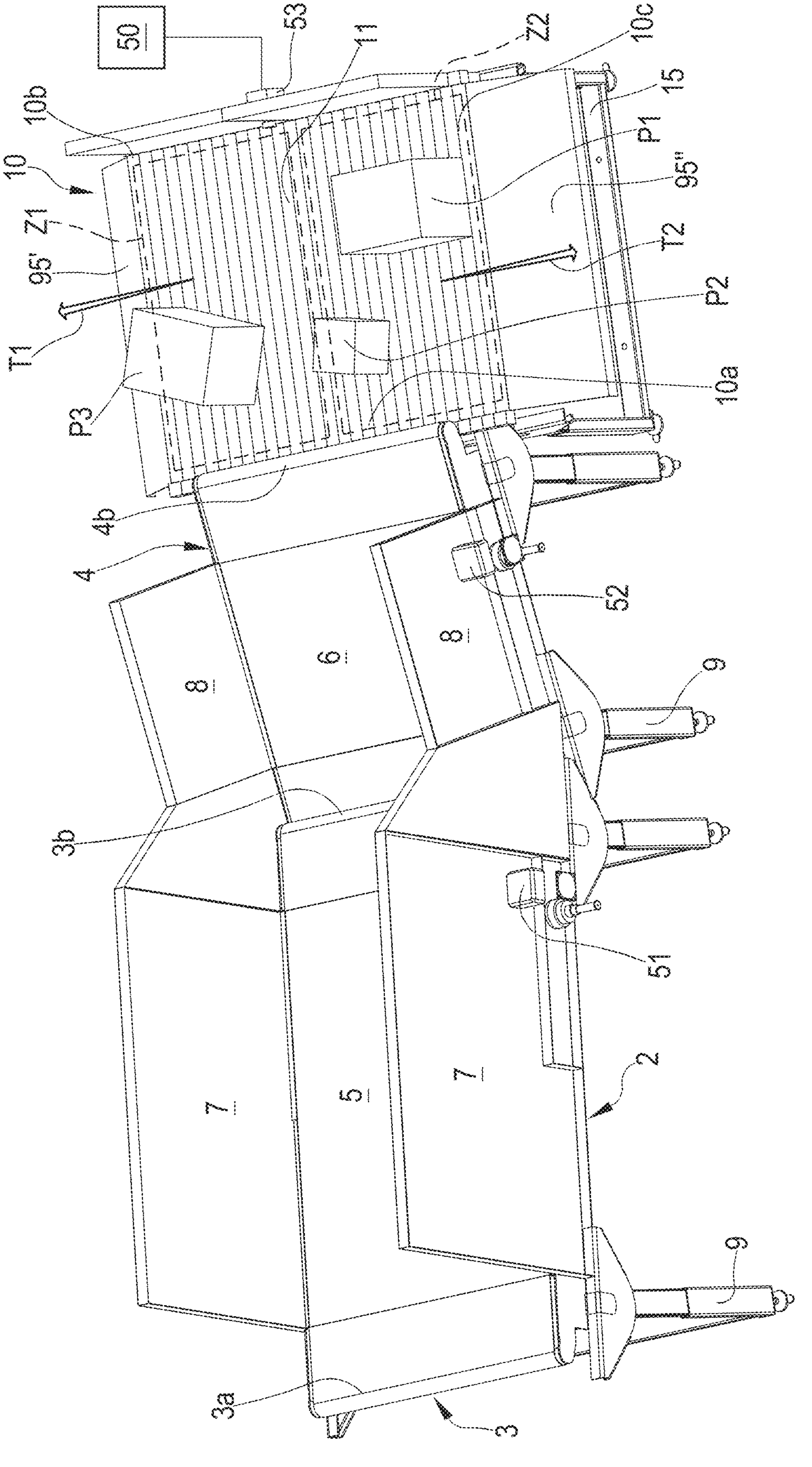
FIG. 8 is a perspective view of a conveyor in accordance with a second realization form.

A second embodiment of the conveyor 1 is shown in FIG. 8, which comprises, in addition to de-stratifying module 2, at least one sorter 10. De-stratifying module 2 and sorter 10 are configured to move a plurality of P items along an advancement trajectory A; sorter 10 is placed immediately consecutive (downstream) to de-stratifying module 2, relative to advancement trajectory A, and configured to receive items exiting from de-stratifying module 2.

Sorter 10 defines a support plane 11 that is horizontal, i.e., tilted with respect to the upper surface 6, ascent, of the second sector 4 of the de-stratifying module 2. This support plane 11 may instead be substantially parallel to the upper surface 61 of the intermediate sector 60.

The sorter 10 comprises an input 10*a* and at least one output: the sorter 10 is configured to move items P along the advancement trajectory A between the input 10*a* and the at least one output of the sorter 10 itself. Input 10*a* is placed at output 4*b* of the second sector 4: specifically, input 10*a* faces output 4*b* of the second sector 4. The support plane 11 defined by sorter 10 may be placed at a lower height than the height of output 4*b* of the second sector 4: support plane 11 (thus input 10*a* of sorter 10) is placed below output 4*b* of the second sector 4 so that items exiting from de-stratifying module 2 may fall on support plane 11. As shown in FIG. 5, the possibility of providing a support plane 11 placed at the same height as the output 4*b* of the second sector is not ruled out.

Sorter 10 may also be immediately consecutive to de-stratifying module 2 (FIG. 8). Alternatively, conveyor 1 may comprise at least one roller a roller 90 arranged at output 4*b* of the second sector 4: roller 90 is arranged at an equal height to output 4*b* of the second sector.

Such a roller 90 is then interposed between the output 4*b* of the second sector 4 and the sorter 10. The roller 90 is configured to rotate about a transverse axis, optionally orthogonal to the advancement trajectory A imparted by the second sector 4. The roller 90 may have an outer surface that is at least partially rubberized to essentially define a friction roller. Alternatively, the roller 90 may be made of metal. The roller 90 may be fixed at the output 4*b* so as to guide the items onto the sorter 10; in such a configuration, the roller may only rotate about its own axis. Alternatively, the roller 90 may be movable approaching and receding from the de-stratifying module 2, such as along a direction substantially parallel to the advancement trajectory imparted by the de-stratifying module. In greater detail, the roller 90 may be movable along a direction substantially parallel to the support plane 11 of the sorter 10. In one embodiment, the roller 90 may normally be maintained in a position close to the de-stratifying module, such as by means of elastic elements, such as one or more springs. Roller 90 may be moved away from the de-stratifying module 2, for example, by an actuator also controlled by control unit 50. For example, control unit 50 may be configured to control the actuator upon signaling from a proximity sensor located at the roller, configured to emit a signal representative of any items wedged between de-stratifying module 2 and roller 90. The roller 90 may have a length equal to a width of the upper surface 6 of the second sector 4. Additionally, the roller 90 may be of a motorized type and configured to contact and support items exiting the second sector 4.

Structurally, the sorter 10 also comprises a frame that allows the sorter 10 itself to rest on the ground and arrange the support plane 11 at a distance from the ground G. For example, the support plane 11 of the sorter may be placed at a distance from the ground between 750 and 1600 mm, even more optionally between 900 and 1400 mm.

The at least one output of sorter 10 may be placed to the side of input 10*a* of the same sorter 10. In other words, the at least output of sorter 10 may be angularly offset from input 10*a*, for example, by an angle between 30° and 120°, even more optionally by an angle between 40° and 95°, from input 10*a* of the same sorter.

In fact, the tract of advancement trajectory A defined by sorter 10 (optionally for a preponderant part) may be transverse, optionally orthogonal, to the tract of advancement trajectory A defined by de-stratifying module 2. In other words, the de-stratifying module 2 is configured to move one or more items along at least one main advancement direction (a rectilinear direction as illustrated in FIGS. 7A-7C) transverse, optionally orthogonal, to at least one respective main advancement direction (said direction is also rectilinear) imparted to the items by sorter 10: the movement imparted by the de-stratifying module 2 and sorter 10 along the respective main advancement directions defines the advancement trajectory A of items P.

FIGS. 7A-7C show an advancement trajectory defined by a predominantly straight tract at de-stratifying module 2 and a predominantly straight tract at sorter 10; the two tracts are joined by a curvilinear connecting tract, inserted to schematize a possible course of the P items, which, as they output de-stratifying module 2, undergo a transverse movement with respect to the movement imparted by de-stratifying module 2.

Figure 15:
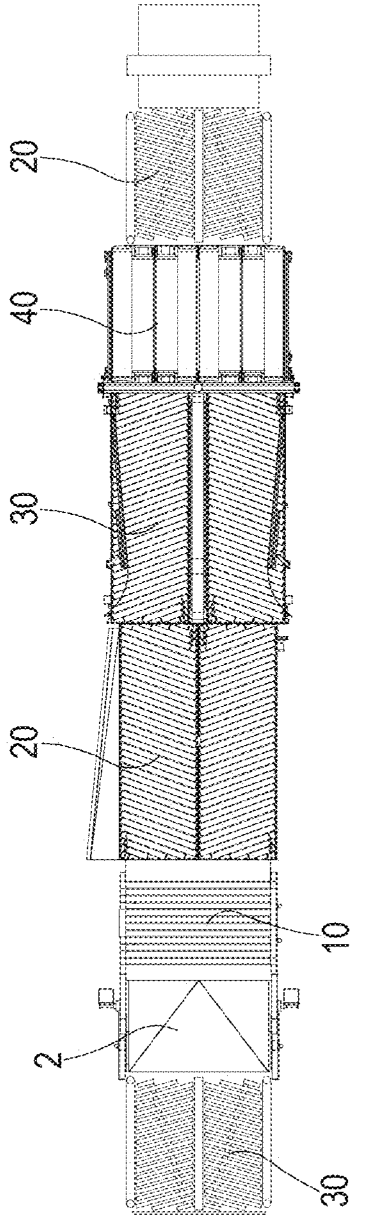

As shown schematically in FIG. 15, sorter 10 may comprises a single input facing output 4*b* of the second sector 4 of the de-stratifying module and a single output 10*b* facing input 10*a*. In such a configuration, sorter 10 is configured to move the items along an advancement trajectory A that follows the advancement of the items on the de-stratifying module without performing transverse or orthogonal movements relative to the main advancement direction of the items on the de-stratifying module. In such a configuration, the sorter extends longitudinally in length between input 10*a* and output 10*b*.

The at least one output of sorter 10 may comprise a first and a second output 10*b*', 10*b*" opposed to each other (FIG. 8): each of said first and second outputs 10*b*', 10*b*" is side-by-side (placed to the side) with input 10*a*. In such a configuration, sorter 10 extends longitudinally between the first and second outputs 10*b*', 10*b*", to define a length of said sorter 10. The length of the sorter may be between 700 and 2000 mm, optionally between 1000 and 1500 mm.

As described above, sorter 10 may be placed transversely to de-stratifying module 2 (see, for example, FIGS. 8 and 14) and receive items from said de-stratifying module 2. The length of sorter 10 may be equal to or greater than the width of the upper surface 6 of the second sector 4 of de-stratifying module 2; in detail, the ratio of the length of sorter 10 to the width of the upper surface 6 of the second sector 4 may be between 1 and 2, optionally between 1 and 1.5.

Figure 9:
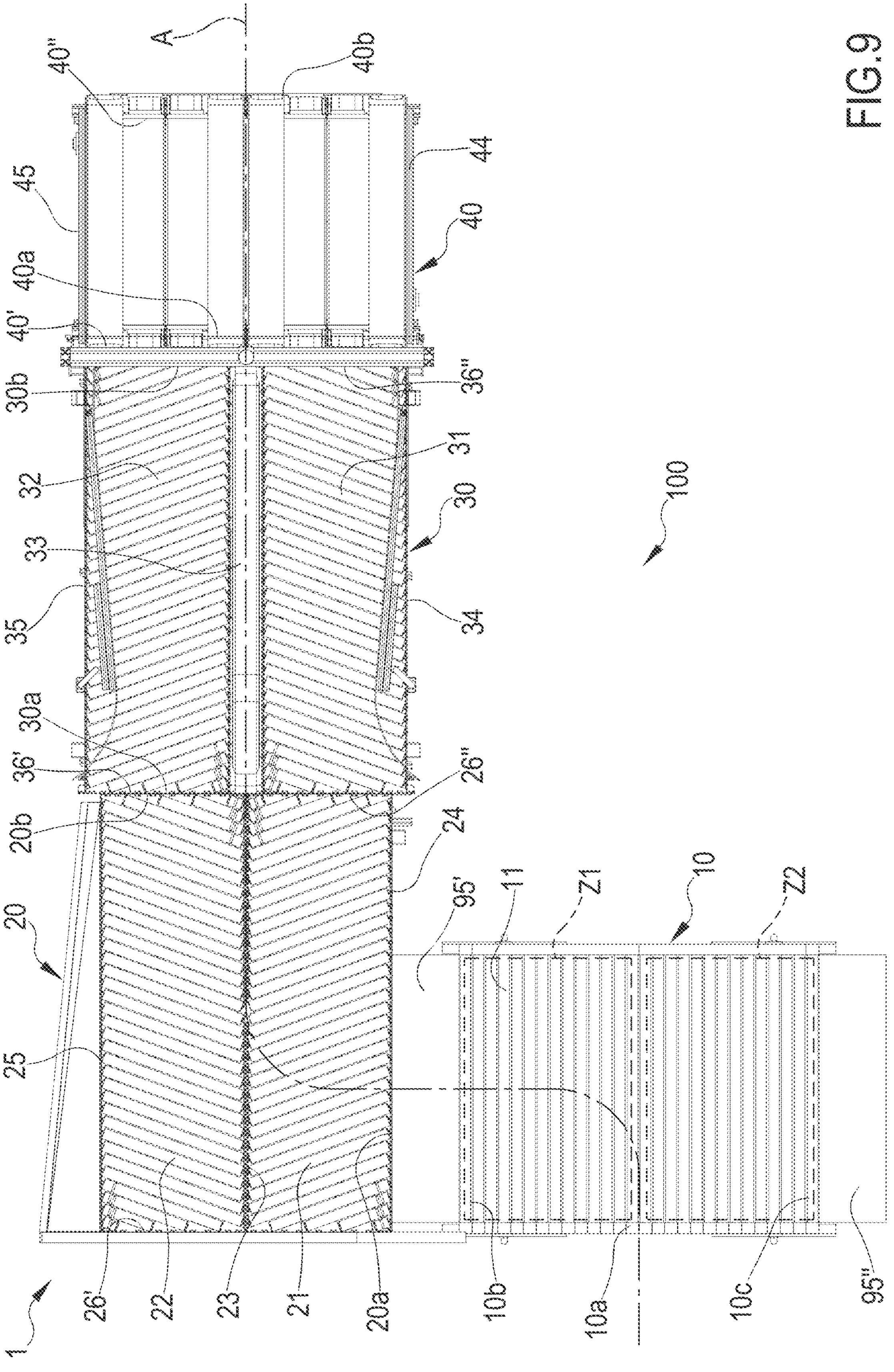
FIG. 9 is another view showing a items handling system comprising at least one conveyor in accordance with a third embodiment.

As schematized for example in FIGS. 8 and 9, sorter 10 may comprise at least one first and at least one second zone Z1, Z2 side by side with respect to the main advancement direction defined by sorter 10; the first and second zones Z1, Z2 both define at least part of input 10*a*. In detail, the first zone Z1 extends from a longitudinal centerline zone of the sorter itself to the first output 10*b*': the first zone Z1 is configured to move to the items P that are resting on the first zone itself to at least one of said first and second outputs 10*b*', 10*b*", along a T1 direction. The second zone Z2, on the other hand, extends from the longitudinal centerline zone of the sorter itself to the second output 10*b*": the second zone Z2 is configured to move to P items that are resting on the second zone itself toward at least one of said first and second outputs 10*b*', 10*b*", along a T2 direction.

As may be seen, the direction T1 of movement of the item on said first zone Z1 is basically parallel to the direction T2 of movement of the item on said second zone Z2: each movement direction T1, T2 of item placed on said first and/or second zone Z1, Z2 is transverse to the tract of advancement trajectory defined on the de-stratifying module 2.

In fact, if present the first and second output 10*b*', 10*b*" of the sorter, the sorter may comprise the first and second zones Z1, Z2 so that the items may be moved: all to the first output 10*b*', all to the second output 10*b*" or partly to the first output 10*b*' and partly to the second output 10*b*".

The first and second zones are basically symmetrical; in particular, they have the same surface extension. In detail, the first and second zones have a surface extension between 0.5 and 3 $m^2$, optionally between 0.5 and 2 $m^2$, each.

As mentioned above, conveyor 1 may comprise a control unit 50. This unit may be connected and active in command on sorter 10 to control the movement of items on sorter 10. In detail, control unit 50 is active in command on the first and second zones Z1, Z2 of sorter 10 and is configured to independently control said first and second zones Z1, Z2.

As seen in FIG. 8, conveyor 1 may comprises at least one sensor 53, such as a camera and/or photocell, associated with sorter 10 and configured to emit a signal representative of at least one control parameter comprising representative of at least one of the following information: the presence of one or more items on the sorter, the presence of one or more items at said at least one output of the sorter 10, the presence of one or more items at the first output 10*b*' of the sorter, the presence of one or more items at the second output 10*b*" of the sorter, the presence of one or more items at the input 10*a* of the sorter, the presence of one or more items at the output 4*b* of the second sector 4 of the de-stratifying module 2.

The associated sensor 53 is connected to control unit 50 which is configured to control the movement independently of said first and second zones Z1, Z2, according to the signal emitted by said sensor 53.

Structurally, the sorter 10 may comprises at least one of: a conveyor belt, a roller conveyor. In the attached figures, a sorter 10 comprising a roller conveyor 10 comprising a plurality of rollers side-by-side with each other and presenting an axis of rotation which is (optionally for a preponderant part of the trajectory A) tilted with respect to the advancement trajectory A defined on the sorter 10 has been illustrated in a non-limiting way: optionally, the axis of rotation of the rollers of the sorter's roller conveyor 10 is orthogonal to the main direction of advancement A of the items on said sorter 10. The rollers of the sorter roller table 10 are parallel to each other, and side by side to define the support plane 11. In detail, the roller table of sorter 10 comprises between 15 and 60 rollers, optionally between 20 and 40. The rollers of the sorter 10 roller table are optionally identical to each other in both shape and size; in particular, each roller comprises a diameter between 30 and 80 mm, optionally between 40 and 70 mm, and has a length, measured along its respective axis of rotation, between 700 and 2000 mm, optionally between 800 and 1500 mm.

The sorter 10 comprises at least one respective actuator, such as an electric motor, configured to move the sorter to allow the movement of the items on the support plane 11 from the input 10*a* to the at least one output. In greater detail, the at least one actuator is configured to allow rotation of at least some of the rollers of the roller conveyor which, in turn, move the items resting on the support plane 11 toward the output of the sorter 10. In greater detail still, the at least one actuator may comprise at least one first and at least one second actuator respectively active on the first and second zones Z1, Z2.

Control unit 50 is connected to the first and second actuators (optionally to electric motors) to independently control the movement (optionally the speed) of the rollers of the first and second zones Z1, Z2. In detail, control unit 50 is configured to:

- control the rotation of the rollers of the first and second zones Z1, Z2 according to one direction of rotation to move the items on the support plane 11 to either the first output 10*b*' or the second output 10*b*",
- control the rotation of the rollers of the first zone Z1 according to a counter-rotating direction with respect to the rotation of the rollers of the second zone Z2 to move the items on the first zone Z1 to the first output 10*b*' and the items on the second zone Z2 to the second output 10*b*".

In fact, depending on the configuration of incoming items from de-stratifying module 2, control unit 50 is configured to control electric motors to distribute said items to the two outputs 10*b*', 10*b*". The control unit may be configured to control only the direction of rotation of the rollers so that said control unit may only adjust the direction of movement; alternatively, control unit 50 may be further configured to adjust the speed of rotation of the rollers of the first and second groups of the roller conveyor.

Figure 6:
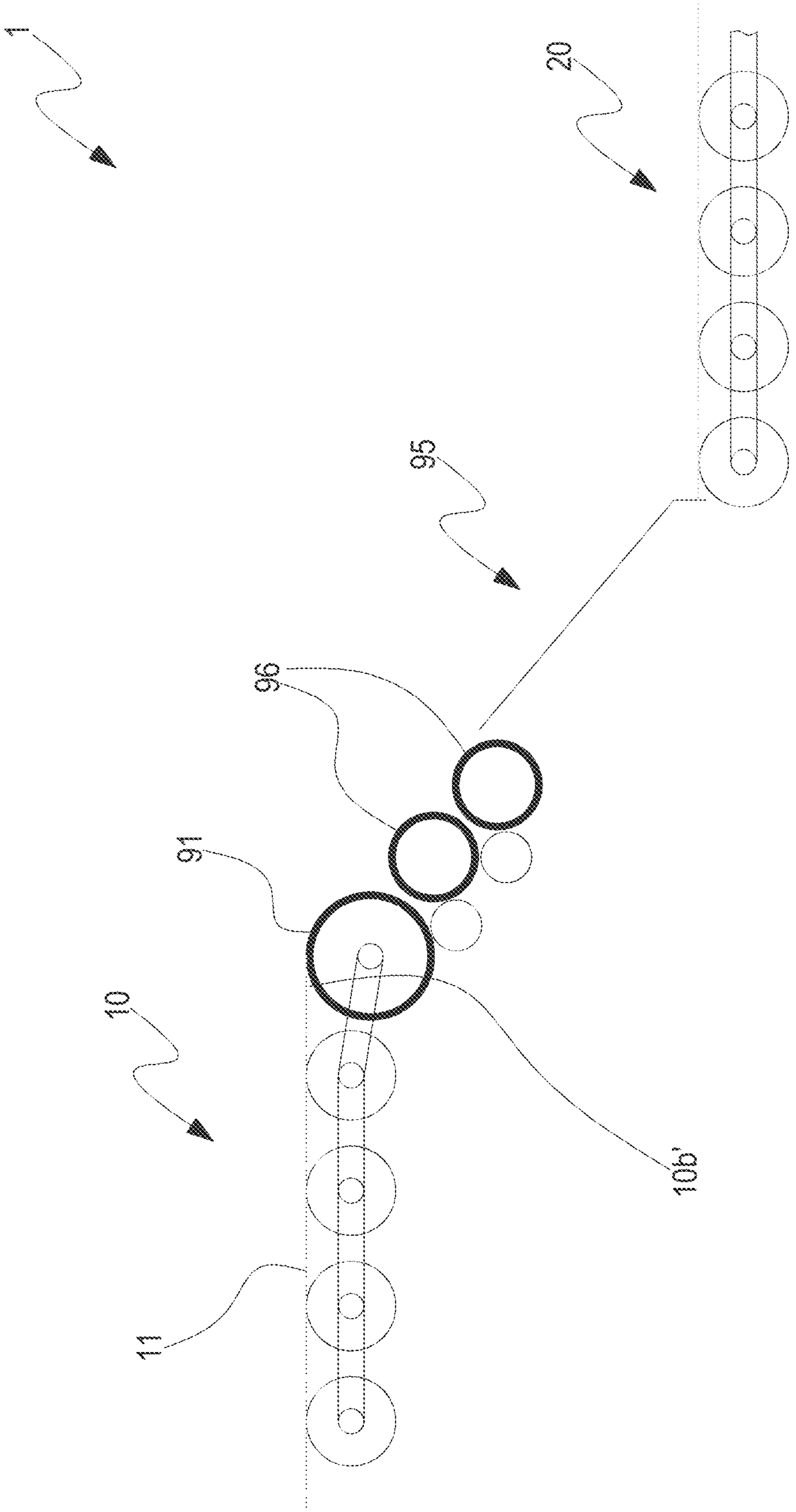
FIG. 6 is a schematic side view of a descent connecting an output of a sorter with an input of a converging module.

As shown in FIG. 6, at least the last roller 91 of the roller conveyor of sorter 10 placed at the at least one output of said sorter may at least partially rubber-coated, optionally to define a rubberized roller. In detail, the at least the last roller 91 of each roller conveyor of the sorter 10 placed at the at least the first and second output of said sorter is at least partially rubber coated, optionally to define a rubberized roller, optionally of a motorized type.

Conveyor 1, in a third embodiment, may comprise sorter 10 and a converging module 20, or it may comprise, in sequence, de-stratifying module 2, sorter 10, and converging module 20.

The sorter 10 and the converging module 20 are configured to move a plurality of items P along an advancement trajectory A. The converging module 20 is placed immediately consecutive to the sorter 10, with respect to the advancement trajectory A, i.e., downstream of said sorter: the converging module 20 is placed at the at least one output of the sorter.

The converging module 20 defines a respective support plane configured to receive in support one or more items P arriving from the sorter 10. The support plane of the converging module 20 is horizontal, optionally parallel to the support plane 11 of the sorter 10. In fact, the converging module 20 comprises a respective frame configured to allow the ground support of said converging module 20 itself and distance from the ground said converging module whose support plane may be placed at a distance from the ground between 500 and 2000 mm, even more optionally between 600 and 1500 mm.

Figure 14:
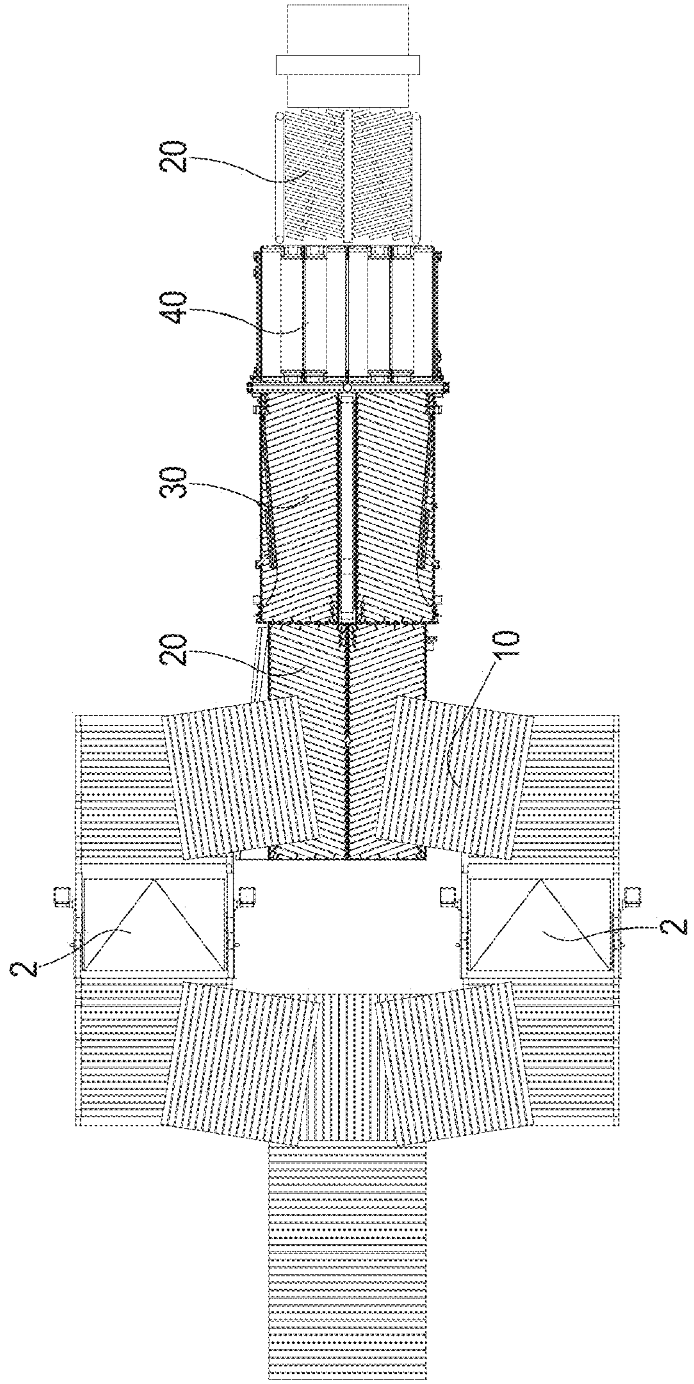
FIGS. 14 and 15 are embodiments variants of a handling system for a plurality of items comprising at least one conveyor.

In detail, converging module 20 comprises at least one input 20*a* and at least one output 20*b*: converging module 20 is configured to move items P along the advancement trajectory A between input 20*a* and output 20*b*. As may be seen from the merged figures, input 20*a* of the converging module 20 may be angularly offset from input 20*a*, i.e., tilted from input 20*a* by an angle between 30° and 120°, even more optionally by an angle between 40° and 95° (FIG. 14). Input 20*a* also be placed to the side of the output as, for example shown in FIG. 1.

In both configurations, the tract of advancement trajectory A defined by the converging module 20 is (optionally for a preponderant part) transverse, optionally orthogonal, to the tract of advancement trajectory A defined by sorter 10. In detail, converging module 20 is configured to move one or more items along a main advancement direction (a straight tract) transverse, optionally orthogonal, to the respective main advancement direction imparted to the items by sorter 10.

In FIGS. 7A-7C, a advancement trajectory A defined by a predominantly straight tract at sorter 10 and a predominantly straight tract at converging module 20 was illustrated; in the joined figures, a curvilinear connecting tract between the two straight sections of the advancement trajectory Aper was illustrated in a non-limiting way to schematize a possible course of items P which, on leaving sorter 10 undergo a transverse (optionally orthogonal) movement with respect to the movement imparted by converging module 20.

The converging module 20 extends longitudinally between a first and second longitudinal end portions 26', 26" opposed to each other: the support plane of the converging module 20 extends between said first and second longitudinal end portions 26', 26". Dimensionally, the converging module 20 has a length defined by the distance present between said first and second longitudinal end portions 26', 26" which is between 1000 and 3000 mm, optionally between 1500 and 2500 mm. The length of the converging module may be equal to or greater than the length of sorter 10; for example, the ratio of the length of converging module 20 to the length of sorter 10 is between 1 and 2.5, optionally between 1.2 and 2.

The converging module 20 further has a first and second transverse end portions 24, 25 (FIG. 6) that are also opposed to each other and suitable for connecting the first and second longitudinal end portions 26', 26". The first and second transverse end portions are placed at a predetermined distance to essentially define a width of the converging module 20, e.g., between 700 and 2000 mm, optionally between 800 and 1700 mm.

Input 20*a* of converging module 20 may be defined at at least one of said first and second transverse end portions 24, 25, optionally only at the first transverse end portion (FIG. 1): input 20*a* may be defined at interposition between the first and second longitudinal end portions 26', 26". The converging module 20 has in only input 20*a* placed and one output 20*b*: the output is defined at the second longitudinal end portion 26".

Input 20*a* of converging module 20 faces the output of sorter 10; the lateral position of input 20*a* relative to output 20*b* causes items to enter the converging module from the side and for them to undergo an immediate change of trajectory; in such a configuration, the length of the converging module 20 (optionally defined by the distance present between the first and second longitudinal end portions 26', 26') is equal to or greater than the width of the sorter 10; specifically, the ratio of the length of the converging module 20 to the width of the sorter 10 is between 1 and 2.5, optionally between 1.2 and 2. The transverse position of the converging module 20 relative to the sorter 10 allows the converging module to quickly take away incoming items from sorter 10 to optimize linearization of item flow and optionally arrange any overlapping items in the sorter 10 area on a single plane.

Again from a structural point of view and going into more detail, the converging module 20 may comprises at least one first and at least one second zone 21, 22 side by side with respect to the main advancement direction defined by the converging module itself. In the configuration shown in FIG. 1, only one between the first and second zones 21, 22 of the converging module 20 defines input 20*a* of the converging module 20 itself.

The first zone 21 of the converging module extends from the first transverse end portion 24 to a transverse centerline zone of the converging module 20 while the second zone 22 of the converging module 20 extends from the second transverse end portion 25 to the transverse centerline zone of the converging module.

The first and second zones 21, 22 of the converging module may be symmetrical and have, in a non-limiting way, the same surface extension, for example, between 0.5 and 3 $m^2$, optionally between 0.5 and 2 $m^2$.

Although the main motion of the converging module is predominantly rectilinear along the main advancement direction, that module 20 is configured to also impart a lateral movement to guide the items not only along said main advancement direction but also toward a central zone of the converging module. In detail, the first zone 21 of the converging module 20 is configured to impart to the items P resting on it an advancement motion along the main advancement direction defined by the converging module and a lateral movement in the direction of the adjacent second zone 22. The second zone 22 of the converging module 20 is configured to impart to items P that are resting on it a advancement motion along the main advancement direction defined by the converging module and a lateral movement in the direction of the second adjacent zone 22.

Figure 10A:
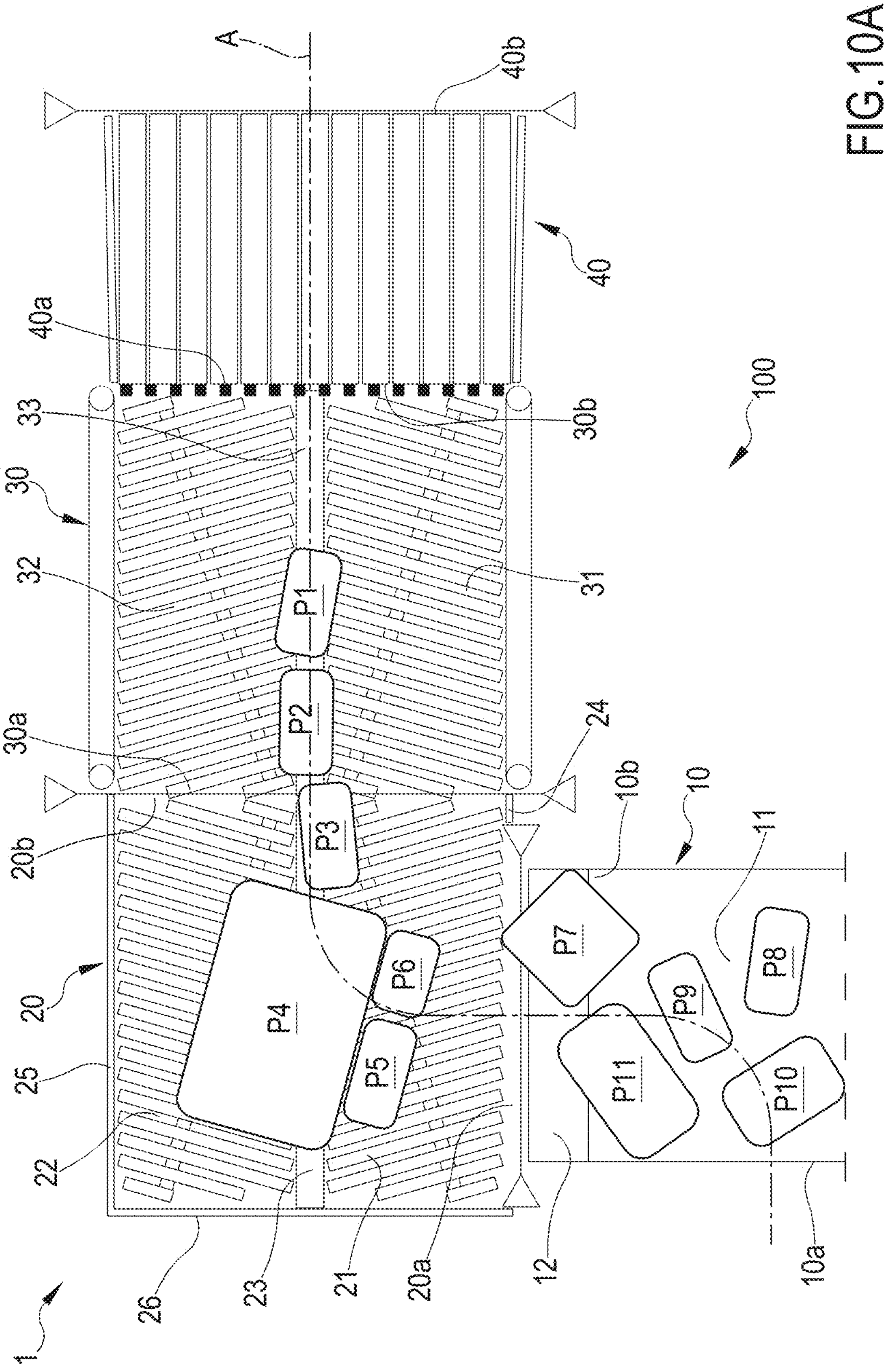
FIGS. 10A and 10B are schematic views showing the movement of a plurality of items by a handling system.
Figure 10B:
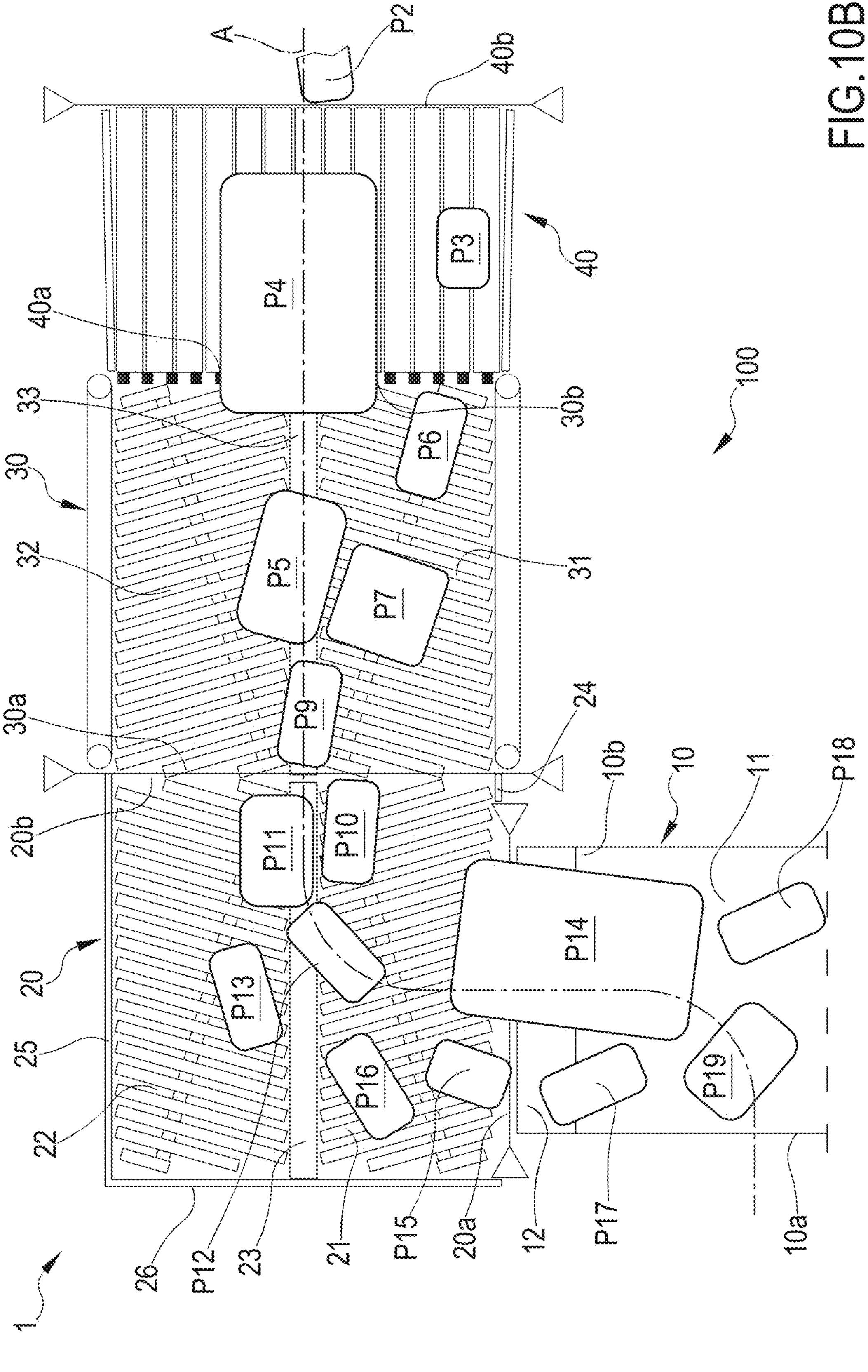

The movement of items along sorter 10 and along converging module 20 is initially schematized in FIGS. 7A through 7C; in these figures we see how the incoming flow of items from de-stratifying module 2 is distributed. In FIGS. 10A through 10B, on the other hand, the function of the converging module 20 is better illustrated; indeed, these figures show how the incoming fluid flow from sorter 10 is somehow at least partially linearized and singularized.

As described above, input 20*a* may be placed to the side of output 20*b*; we also do not rule out the possibility of providing an input 20*a* facing output 20*b* as shown in FIG. 15.

As mentioned, conveyor 1 may comprise a control unit 50 which may be connected and active in command on converging module 20 to control the movement of items from input 20*a* to output 20*b*. Specifically, control unit 50 may be active in command on the first and second zones 21, 22 of the converging module to control said zones independently of each other.

Conveyor 1 may comprise at least one sensor 54, for example comprising a camera and/or photocell, located at output 20*b* of converging module 20 or downstream of converging module 20 and configured to emit a signal representative of at least one control parameter representative of at least one of the following information: the presence of one or more items on the converging module, the presence of one or more items at the output of the converging module, the presence of one or more items at the input 20*a* of the converging module, the presence of one or more items at the at least one output of the sorter.

Sensor 54 is connected to control unit 50 which is configured to control the movement of said first and second zones 21, 22 of the converging module according to the signal emitted by said sensor 54.

Structurally, the converging module 20 comprises at least one roller bed comprising a plurality of rollers side-by-side with each other and presenting an axis of rotation tilted with respect to (optionally to a preponderant part of) the advancement trajectory A defined by the converging module 20: in particular, the axis of rotation of the rollers is tilted with respect to the main advancement direction defined by the converging module itself, for example, by an angle of between 40° and 85°, optionally between 50° and 85°. At least some of the rollers of the converging module 20 roller table are parallel to each other and side by side to define the support plane for items P. In detail, the converging module 20 roller table comprises between 30 and 150 rollers, optionally between 50 and 100. The rollers of the roller table of the converging module 20 are optionally identical to each other in both shape and size; for example, each roller table of the converging module has a diameter of between 30 and 80 mm, optionally between 40 and 70 mm, and a length, measured along the respective axis of rotation, of between 350 and 1500 mm, optionally between 400 and 1000 mm.

As described above, the converging module may comprise the first and second zones 21, 22. In such a configuration, the roller conveyor of the converging module 20 may comprise a first group and a second group of rollers respectively suitable for defining said first and second zones 21, 22. The first group of rollers of the roller conveyor of the converging module 20 comprises a number of rollers between 15 and 80, optionally between 20 and 50; the axis of rotation of the rollers of the first group of the roller conveyor of the converging module 20 is tilted with respect to the main direction of advancement defined by the converging module 20 itself, for example, by an angle between 40° and 85°, optionally between 50° and 85°. Similarly, the second group of rollers of the roller conveyor of the converging module 20 comprises between 15 and 80, optionally between 20 and 50; the axis of rotation of the rollers of the second group of the roller conveyor of the converging module 20 is also tilted with respect to the main advancement direction defined by the converging module 20 itself, for example, by an angle between 40° and 85°, optionally between 50° and 85°.

The inclination of the rollers of the roller conveyor of the first zone 21 of the converging module 20 allows said first zone 21 to impart to the items P an advancement motion along the main advancement direction defined by the converging module toward the output 20*b* and a lateral movement in the direction of the second zone 22 of the same converging module. In the same way, the tilting of the rollers of the roller conveyor of the second zone 22 allows the items P to impart to the items P an advancement motion along the main advancement direction defined by the converging module toward the output 20*b* and a lateral movement in the direction of the first zone 21 of the same converging module.

Converging module 20 may comprise only said first and second zones 21, 22. Alternatively, the converging module 20 may comprise a third zone 23 interposed between the first and second zones 21, 22 of the same converging module 20, i.e., placed at the transverse end portion of said module. The third zone 23 of the converging module 20 extends between the first and second longitudinal end portions 26', 26" i.e., along the entire length of the same converging module. The third zone 23 may comprise a conveyor belt configured to impart to the items arranged on said third zone 23 solely a movement along the main advancement direction toward the output 20*b* of the converging module.

The movement of the rollers of the roller conveyor and optionally the conveyor belt may be imparted by at least one actuator of the converging module 20 comprising, for example, an electric motor. In detail, the at least one actuator may comprise a single electric motor active on the roller conveyor or may comprise at least one first and second electric motors respectively active on the rollers of the first and second roller conveyor assemblies. The converging module 20 may further comprises an electric motor independently active on the conveyor belt of the converging module 20, defining the third zone 23.

Control unit 50 may be connected to said at least one actuator of the converging module to independently control the movement of said converging module with respect to sorter 10 and, if present, with respect to de-stratifying module 2. The control unit may be connected to each of the actuators (optionally electric motors) of the converging module to independently control the activation of the first and second roller conveyor assemblies and optionally the third zone conveyor belt.

Control unit 50 may be configured to control only the activation/deactivation of the electric motors to allow the rotation of the rollers in the roller conveyor; alternatively, Control Unit 50 may be further configured to adjust the rotation speed of the electric motors to control the speed of movement of the items placed on the converging module.

Conveyor 1 may comprise a single converging module 20. Alternatively, as shown in the merged figures, conveyor 1 may comprise two opposing converging modules 20 with respect to sorter 10. In detail, in the configuration wherein sorter 10 comprises the first and second outputs 10*b'*, 10*b"*, conveyor 1 may comprise two opposing converging modules. In detail, the at least one converging module 20 may comprise a first and a second converging module in accordance with the converging module described above; the first converging module 20 is configured to receive incoming items from the first output 10*b*' of the sorter 10 while the second converging module is configured to receive incoming items from the second output 10*b*" of the sorter 10: the first and second converging modules are configured to move items along respective main advancement directions parallel to each other.

Conveyor 1 may comprise at least one descent 95 that connects the at least one output of sorter 10 with the input 20*a* of the converging module; the at least one descent 95 may include a plane tilted with respect to an ideal horizontal plane, for example, by an angle between 30° and 70°, optionally between 35° and 60°. The at least one descent 95 may comprise a metal sheet configured to essentially define a ramp configured to allow items to slide from the support plane 11 of the sorter to the support plane of the converging module 20. The metal sheet may extend between a first end portion located near the sorter 10 and a second end portion located at the converging module 20 (FIG. 6). The metal sheet may extend entirely along a plane, or it may have, at the second end portion a vertical tract facing the converging module 20 configured to generate between said descent 95 and the converging module 20 a height difference (jump) suitable for introducing an additional destabilizing element for any overlapping items.

As shown in FIG. 6, the descent 95 may comprise at least one roller 96 presenting a rotation axis orthogonal to the defined advancement trajectory tract of sorter 10; this roller 96 extends across a width of sorter 10 and is placed at the at least one output of sorter 10, optionally side by side with respect to the roller 91 of sorter 10.

Roller 96 of descent 95 may also be at least partially rubber-coated to define a rubberized roller configured to define with an item resting on said roller 96 a coefficient of friction greater than the coefficient of friction definable by the same item placed on the metal sheet of the same descent 95.

As shown in FIG. 6, the at least one roller of descent 95 may comprise a plurality of parallel and side-by-side rollers placed in the vicinity of the sorter, spaced from the converging module 20. Each roller 96 may be of a motorized type, e.g., as shown in FIG. 6, it may be connected in motion with at least one roller of the sorter roller conveyor 10, such as by one or more friction rollers.

In detail, the at least one descent 95 of conveyor 1 may comprise a first descent 95' and a second descent 95'; the first descent 95' is configured to connect the first output 10*b*' of sorter 10 with input 20*a* of the first converging module, while the second descent 95' is configured to connect the second output 10*b*" of sorter 10 with input 20*a* of the second converging module. The descent further favors the arrangement of items along a single bedding plane possibly arriving from the sorter in an overlapping configuration. In fact, descent 95 may favor dropping an item placed on top of another so that said dropped item may be properly linearized in the converging module 20.

As seen for example in FIG. 2, control unit 50 may be connected to the de-stratifying module, sorter 10 (see connection line "c"), converging module 20 (see connection line "d"), sensor 51 active at the first sector 3, sensor 52 active at the second sector (see connection line "g"). In this way, control unit 50 may be configured to independently control each part/module of conveyor 1 according to the arrangement of items in each of said parts/modules. In fact, the items are placed in bulk on the de-stratifying module; in this condition, it is not possible to know in advance the progress of the items on the conveyor: thanks to the control unit 50, it is possible to control the activation of each part/module (e.g., the speeds of the descent and ascent sectors 3, 4, the direction and/or speeds of rotation of the sorter rollers, the rotation of the rollers of the converging module roller conveyor) in order to optimize the movement of the advancing items on the conveyor for the purpose of singularizing them.

In a fourth embodiment, conveyor 1 may comprise only a diverging module 30 configured to move P items along a advancement trajectory A, specifically along a main advancement direction.

At least one part of the diverging module 30 defines a support plane configured to receive in support one or more items P, for example, arriving from the converging module 20. The support plane of the diverging module 30 is essentially horizontal, optionally parallel to the support plane 11 of the sorter 10 and the converging module 20. The support plane of the diverging module 30 may be placed at the same height as the support plane of the converging module 20 so that the moving items on the converging module may be served to the diverging module 30 placed at essentially the same height as the converging module 20. In detail, the support plane of the diverging module 30 may be placed at a distance from the ground between 500 and 2000 mm, even more optionally between 600 and 1500 mm.

The diverging module 30 comprises at least one input 30*a* and at least one output 30*b*: the diverging module 30 is configured to move items P along the advancement trajectory A between input 30*a* and output 30*b*. As visible from the merged figures, input 30*a* of the diverging module 30 may be facing output 20*b* of the converging module 20: output 30*b* of the converging module 30 is opposite and facing output 30*b* of the same diverging module 30.

The tract of advancement trajectory A defined by the diverging module 30 is (optionally for a preponderant part) parallel to the tract of advancement trajectory A defined by the converging module 20. In detail, the diverging module 30 is configured to move one or more items along a main advancement direction (a straight tract) parallel to the respective main advancement direction imparted to the items by the converging module.

Figure 11:
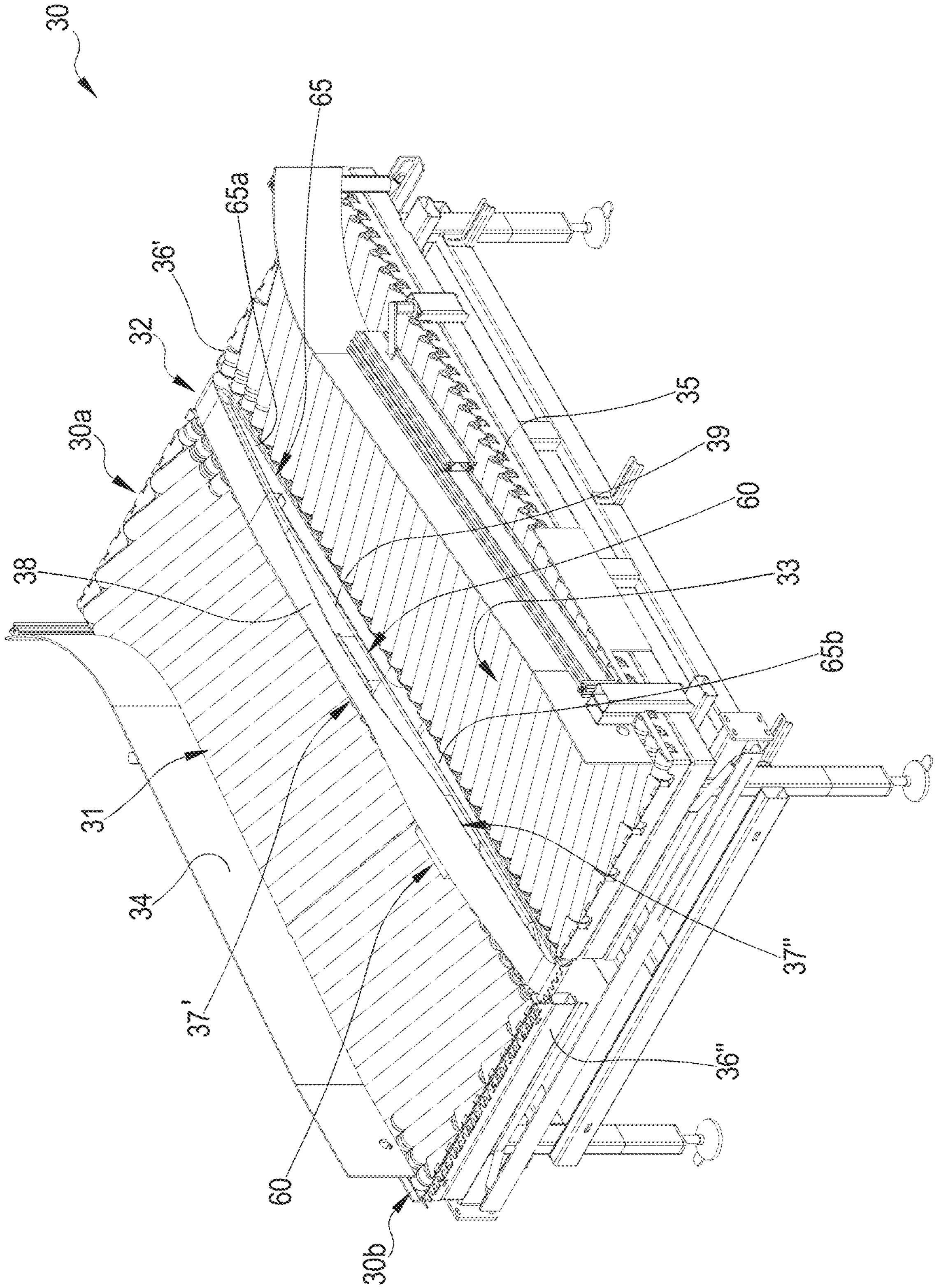
FIG. 11 is a perspective view of a diverging module.

The diverging module 30 extends longitudinally between an opposing first and second longitudinal end portions 36', 36" (FIG. 11). Dimensionally, the diverging module 30 has a length defined by the distance present between said first and second longitudinal end portions 36', 36" which is between 1000 and 3000 mm, optionally between 1500 and 2500 mm. The length of the converging module 20 may be equal to the length of the diverging module 30.

The diverging module 30 further has a first and second transverse end portions 34, 35 (FIG. 11) that are also opposed to each other and suitable for connecting the first and second longitudinal end portions 36', 36" of the same diverging module 30. The first and second transverse end portions are placed at a predetermined distance to essentially define a width of the diverging module 30, e.g., between 700 and 2000 mm, optionally between 800 and 1700 mm.

The input 30*a* is defined at the first 36' longitudinal end portion while the output is defined opposite and said input 30*a*, that is, at the second 36" longitudinal end portion of the diverging module 30. The position of the input 30*a* of the converging module 30 may be facing the output of the converging module 20 such that the items enter the diverging module 30 head-on; in such a configuration, it may be useful for the width of the converging module 20 to be equal to the width of the diverging module 30.

Again from a structural point of view and going into more detail, the diverging module 30 may comprise at least one first and at least one second zone 31, 32 side by side, optionally with respect to the main direction of advancement (prevailing straight tract of movement imparted by the diverging module 30) defined by the diverging module 30 itself.

In detail, the first zone 31 extends for at least one tract of a total longitudinal extension of the diverging module 30, that is, for at least part of the total length of the diverging module 30. The first zone 31 may extend from the input 30*a* of the diverging module 30 in the direction of the output, to define at least part of said input 30*a* of the diverging module. The first zone 31 may extend from the output 30*b* of the diverging module in the direction of the input to define at least part of the output 30*b* of the diverging module 30. In fact, the first zone 31 may extend for a tract greater than 50%, optionally greater than 80%, of the total longitudinal extension (or length) of the diverging module, optionally measured along the main direction of advancement of items on said diverging module 30.

In the joined figures, the first zone 31 extends, in a non-limiting way, along the entire length of the diverging module 30, between the first and second longitudinal end portions 36', 36". For example, the first zone 31 may have a surface extension between 0.5 and 3 $m^2$, optionally between 0.5 and 2 $m^2$.

The first zone 31 defines at least part of said support plane and is configured to impart to the items P resting on it an advancement motion having a main component substantially parallel to the main advancement direction and a lateral component, transverse to the main component.

The lateral component imparted by the first zone 31 is configured to move items away from the second zone 32. In fact, the first zone 31 allows items to be moved partly along the main advancement direction and partly away from the second zone 32.

Structurally, the first zone 31 may comprise a roller conveyor having a plurality of rollers side by side and presenting an axis of rotation tilted with respect to (optionally to a preponderant part of) the advancement trajectory A defined by the diverging module 30: in particular, the axis of rotation of the rollers is tilted with respect to the main direction of advancement defined by the diverging module 30 itself, for example, by an angle of 40° to 85°, optionally 50° to 85°. At least some of the rollers in the roller conveyor of the diverging module 30 are parallel to each other and side by side to define the support plane. In detail, the roller bed of the first zone 31 of the diverging module 30 may comprises between 18 and 80 rollers, optionally between 20 and 50. The rollers of the first zone roller conveyor 31 are optionally identical to each other in both shape and size; for example, each roller conveyor of the first zone roller conveyor 31 of the diverging module 30 may comprise a diameter of between 30 and 80 mm, optionally between 40 and 70 mm, and a length, measured along the respective axis of rotation, of between 350 and 1500 mm, optionally between 400 and 1000 mm.

The inclination of the rollers of the roller conveyor of the first zone 31 of the diverging module 30 allows said first zone 31 to impart to the P items an advancement motion along the main advancement direction toward the output 30*b* and a lateral motion away from the second zone 32 of the same diverging module 30.

The second zone 32 is also configured to move items P resting on said second zone 32 from input 30*a* to output 30*b*. The second zone 32 extends for at least one tract of a total longitudinal extension of the diverging module 30, that is, for at least part of the total length of the diverging module 30. The second zone 32 may extend from the input 30*a* of the diverging module 30 in the direction of the output, to define at least part of said input 30*a* of the diverging module. The second zone 32 may extend from the output 30*b* of the diverging module in the direction of the input to define at least part of the output 30*b* of the diverging module 30. In fact, the second zone 32 may extend for a tract greater than 50%, optionally greater than 80%, of the total longitudinal extension (or length) of the diverging module, optionally measured along the main direction of advancement of items on said diverging module 30.

In the joined figures, the second zone 32 extends, in a non-limiting way, along the entire length of the diverging module 30 i.e., between the first and second longitudinal end portions 36', 36". For example, the first zone 31 may have a surface extension between 0.1 and 2 $m^2$, optionally between 0.1 and 1 $m^2$.

The second zone 32 of the diverging module 30 is configured to impart to the P items resting on it an advancement motion having a main component essentially parallel to the main advancement direction and a lateral component, transverse to the main component.

The lateral component imparted by the second zone 32 is configured to move items either approaching or receding from the first zone 31.

In particular, as visible from the united figures, the second zone 32 has a support surface suitable for receiving items and moving them to the output 30*b*.

As visible in FIG. 11, the second zone 32 of the diverging module comprises at least one tilted tract 37: The support surface of the second zone 32, at the tilted tract 37 and in section according to a plane orthogonal to the main advancement direction, is tilted with respect to the defined support plane of the first zone 31 of the same diverging module 30.

The tilted tract 37 may have a longitudinal extension lower than a total longitudinal extension of the second zone 32 itself; in other words, the tilted tract 37 may have a shorter length than the total length of the diverging module 30. For example, the ratio of the longitudinal extension of tilted tract 37 to the total longitudinal extension of the second zone 32 may be lower than 0.8, optionally between 0.7 and 0.2 (longitudinal extension and total longitudinal extension are measured along the main advancement direction).

The tilted tract 37 has, with respect to the support plane of the first zone 31, a maximum inclination between 15° and 35°, even more optionally between 15° and 30°. In particular, this inclination de defined by the support surface of the second tract. The tilted tract 37 has, according to the main direction of advance, a variable inclination along its extension. As may be seen, tilted tract 37 in fact exhibits a twisted shape. For example, the tilted tract 37 may exhibit a first and a second twist one immediately consecutive to the other along the main advancement direction defined by the diverging module 30: the first and second twists are symmetrical to each other with respect to a centerline plane of the tilted tract, orthogonal to the main direction of advancement of the diverging module 30.

Figure 13A:
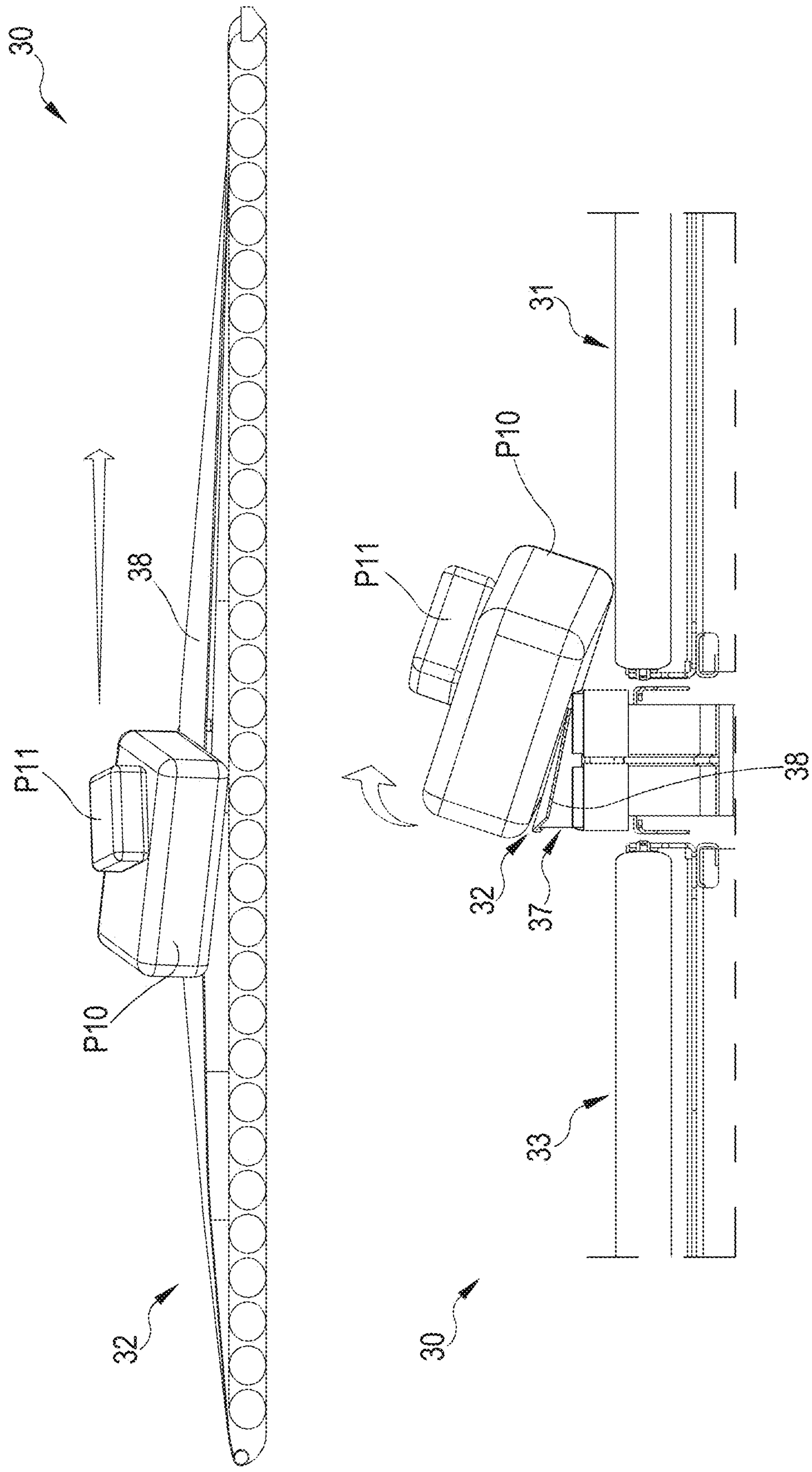
FIGS. 13A and 13B schematically show a movement of items by a diverging module.
Figure 13B:
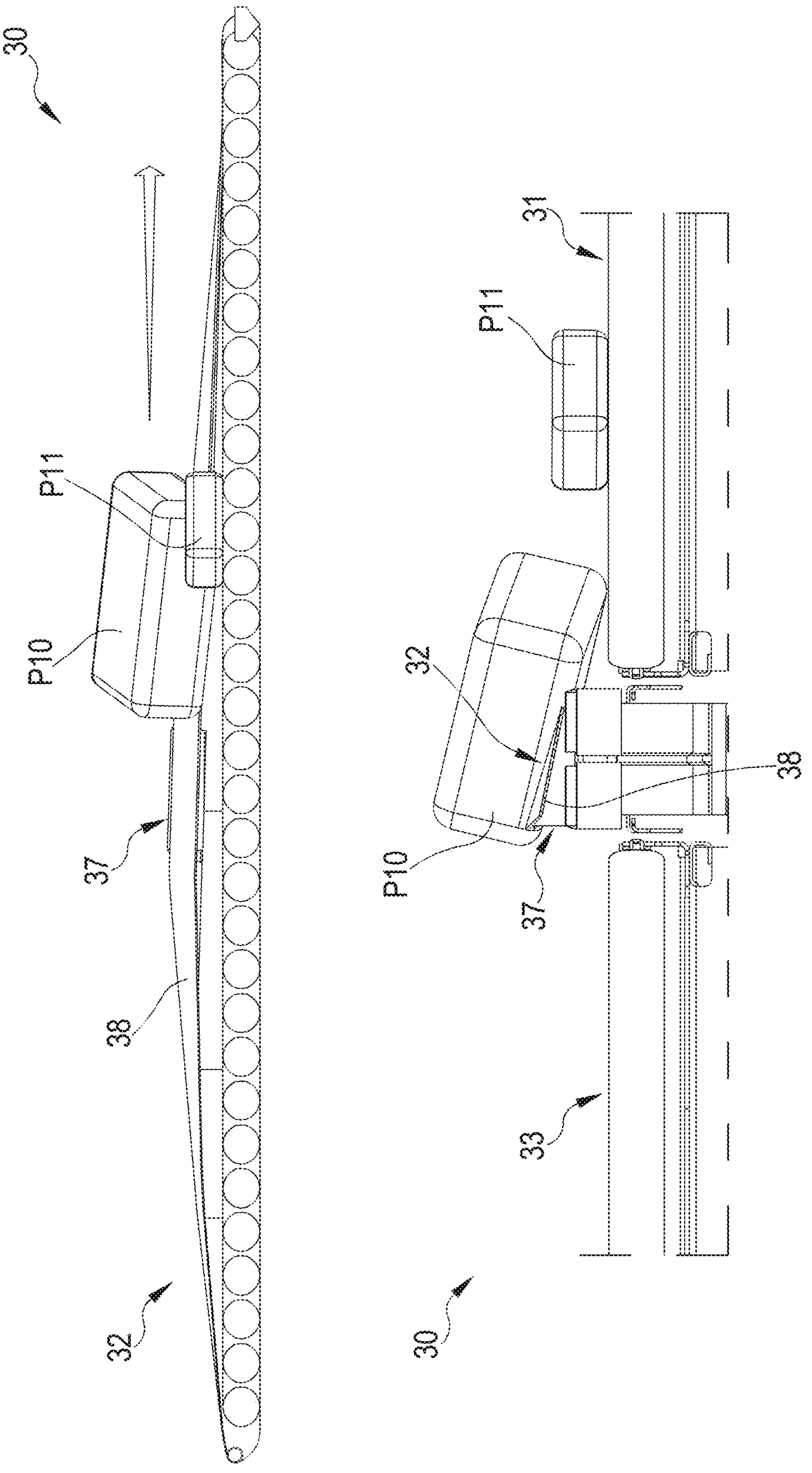

It is precisely the tilted tract 37 that allows the second zone to move items approaching or receding from the first zone (FIGS. 13A and 13B illustrate a configuration wherein the second zone moves items approaching the first zone). In fact, the tilted tract 37 allows items advancing on the diverging module 30 to be tilted in such a way as to generate the fall on an adjacent zone (e.g., the first zone 31) of any item placed on top of another item.

As shown in FIGS. 13A and 13B, the second zone 32 may comprise only one tract tilted 37 and placed at a longitudinal centerline zone of the diverging module; the possibility of arranging the tilted tract 37 at input 30*a* or at output 30*b* is not excluded.

Instead, FIG. 11 shows a second zone 32 comprises a first 37' tilted tract and at least one second 37" tilted tract, each in accordance with the tilted tract described above. Each of said first and second tilted tracts 37', 37" defines a respective twist of the second zone 32. The first and second tracts may have reverse twists such that the first tilted tract 37' may guide any overlapping items falling on the first zone 31 while the second tilted tract 37" may guide any overlapping items falling on a zone opposite the first zone 31 (if any).

As visible in FIG. 11, the second zone 32 has:

a first tract extending from the 30*a* input of the diverging module to a portion of the longitudinal centerline, a second tract extending from the longitudinal centerline portion to output 30*b* of diverging module 30.

The first 37' tilted tract may be defined within the first tract of the second zone 32, while the second 37' tilted tract may be defined within the second tract of the second zone 32.

Structurally, the second zone 32 comprises a conveyor belt 38 which defines the support surface of the second zone 32. The conveyor belt 38 is slidingly wrapped around at least one first and second idler rollers, optionally arranged at the input 30*a* and output 30*b*, respectively. The conveyor belt 38 of the second zone 32 may be made at least partially of rubber so as to define a support surface that, in cooperation with the items, defines a coefficient of friction, for example, greater than that defined by the first zone 31.

In greater detail still, the second zone 32 of the diverging module 30 comprises:

at least one support track 39, optionally extending from input 30*a* to output 30*b* of the diverging module, the conveyor belt 38 engaged to the support track 39. Conveyor belt 38 is movable by sliding relative to support track 39 to move the items in support of said conveyor belt.

Figure 12:
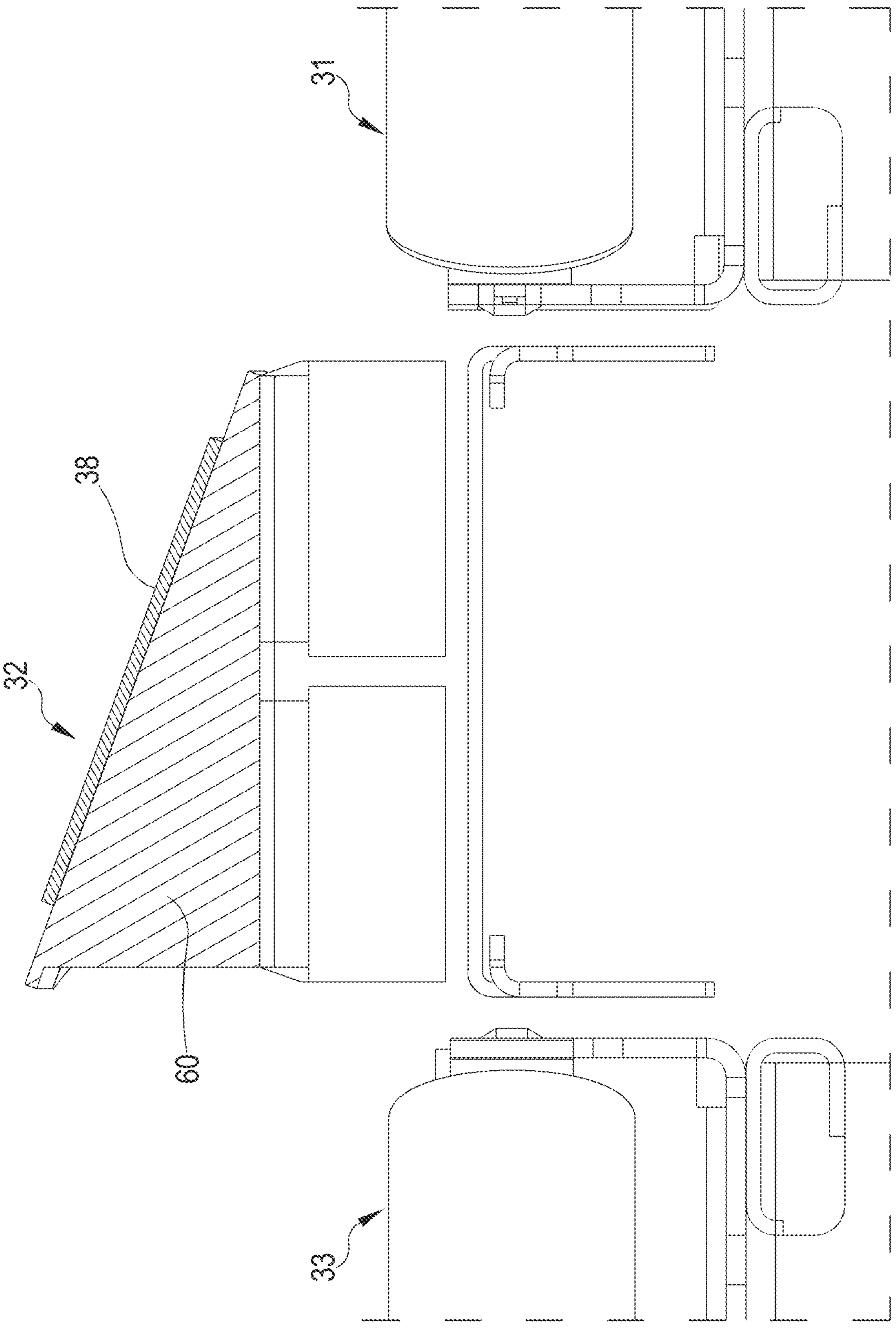
FIG. 12 is a detailed sectional view of the diverging module in FIG. 11.

The conveyor belt 38 may comprises at least one groove and/or ledge engaged to a respective ledge and/or groove of the supporting track 39.

Wherein the second zone has the at least one tilted tract 37, the second zone 32 may further comprise at least one incliner 60 engaged between said support track 39 and said conveyor belt 38: the incliner 60 is configured to incline at least in tract of conveyor belt 38 to define said tilted tract 37. As may be seen from FIG. 12, the inclinator 60 may comprise at least one plate, optionally fixed to the support track 39, tilted with respect to the support plane defined by the first zone 31 of the diverging module above which the conveyor belt 38 is movable for sliding.

In addition to or in place of the tilted tract 37, at least a part of the second zone 32 of the diverging module 30 may emerge receding from the support plane of the first zone 31 to define a rise 65 (FIG. 11). comprises a rise ramp 65*a* and a descent ramp 65*b* consecutively arranged along the main advancement direction A of the diverging module 30.

Rise ramp 65*a* results in inclination to the support plane defined by the first zone 31 by an angle of lower than 30°, specifically between 3° and 25°. The descent ramp 65*b* also results tilted with respect to the support plane defined by the first zone 31 by an angle of lower than 30°, specifically between 3° and 25°. In fact, rise 65 defines with respect to the first zone 31 a maximum height difference between 2 cm and 20 cm, optionally between 2 cm and 15 cm.

The rise ramp 65*a* may extend longitudinally (i.e., in the direction of the length of the second zone 32) for a tract lower than 50% of the total extension of the second zone 32, optionally lower than 30% of the total extension of the second zone 32. Rise ramp 65*a* may extend from input 30*a* of the diverging module in the direction of output 30*b*. Similarly, the descent ramp 65*b* may extend for a tract of lower than 50% of the total extension of the second zone 32, optionally lower than 30% of the total extension of the second zone 32; the descent ramp 65*b* may extend from output 30*b* of the diverging module in the direction of input 30*a*. In fact, rise 65 may extend the entire length of diverging module 10.

Structurally, rise 65 may be defined by the support track 39 above which the conveyor belt 38 is slidingly movable.

FIG. 11 illustrates, in a non-limiting way, a tilted tract 37 placed above the rise 65. In this condition, the tilted 60 is fixed to the rise ramp and/or the descent ramp in interposition between the conveyor 38 and the support track 39.

The first and second zones 31, 32 of diverging module 30 are independent. In detail, the first and second zones 31, 32 of the diverging module 30 are both configured to directly receive P items from the converging module 20 and move the items independently of each other.

The diverging module 30 may comprise only said first and second zones 31, 32. Alternatively, the diverging module 30 may comprise a third zone 33 side by side the second zone 32 on the opposite side of the first zone 31. In fact, the third zone 33 is symmetrical to the first zone with respect to the second zone 32.

The third zone 33 may be similar to the first zone 31 both functionally and structurally. In detail, the third zone 33 may be symmetrical to the first zone and have the same structure as described above in relation to the first zone. Specifically, the third zone 33 is configured to move P items that are resting on said third zone 33 from input 30*a* to output 30*b*.

As mentioned above, at least one part of the diverging module 30 defines a support plane; the third zone 33 may define, in cooperation with the first zone, the support plane. The third zone 33 of the diverging module 30 is configured to impart to the items P resting on it an advancement motion having a main component substantially parallel to the main advancement direction and a lateral component, transverse to the main component. The lateral component imparted by the third zone 33 is configured to move the items away from the second zone 32 and away from the first zone 31.

As described above, although the main movement of the diverging module 30 is predominantly rectilinear along the main advancement direction, that module 30 is configured to also impart a lateral movement to guide the items, in addition to along said main advancement direction, to a lateral zone of the diverging module 30. In detail, the first zone 31 of the diverging module 30 is configured to impart to the items resting on it an advancement motion along the main advancement direction defined by the diverging module 30 and a lateral movement away from the adjacent second zone 32.

Identically, the third zone 33 of the diverging module 30 is configured to impart to the P items resting on it an advancement motion along the main advancement direction defined by the diverging module 30 and a lateral movement away from the first zone 31.

Wherein there is a first and third zone, the diverging module may comprise the second zone 32 with the first 37' tilted tract configured to guide any overlapping items falling on the first zone 31 and the second 37' tilted tract configured to guide any overlapping items falling on the third zone 33.

As indicated above, conveyor 1 may comprise only the diverging module described above, or alternatively it may comprise at least one of de-stratifying module 2, sorter 10, and converging module 20. The movement of items along the sorter, converging module 20, and diverging module 30 is initially schematized in FIGS. 10A and 10B; in these figures it may be seen how the flow of items arriving from the converging module is distributed.

Control unit 50 of conveyor 1 may be further connected and active in command on diverging module 30 (see connection line "a" shown schematically in FIG. 2) to control the movement of items from input 30*a* to output 30*b* of diverging module 30. In particular, the control unit 50 may be active in command on the first and second zones 31, 32 of the diverging module 30 to control said zones independently of each other.

The sensor 54, for example comprising a camera and/or photocell, may be placed at the output 30*b* of the diverging module 30 and configured to emit a signal representative of at least one control parameter representative of at least one of the following information: the presence of one or more items on the diverging module 30, the presence of one or more items at the output of the diverging module 30, the presence of one or more items at the input 30*a* of the diverging module 30, the presence of one or more items at the at least one output from the converging module, the presence of one or more items at the input to the converging module.

Sensor 54 is connected to control unit 50 which is configured to control the movement of said first and second zones 31, 32 (and optionally the third zone) of diverging module 30, depending on the signal emitted by said sensor 54.

The movement of the rollers of the first zone roller conveyor 31 and optionally the conveyor belt may be imparted by at least one diverging module actuator 30 comprises, for example, an electric motor.

Control unit 50 may be connected to said at least one actuator of diverging module 30 to independently control the movement of said diverging module 30 with respect to sorter 10 and converging module 20 and, if present, with respect to de-stratifying module 2. The control unit may be connected to each of the actuators (optionally electric motors) of diverging module 30 to independently control the activation of the first and second roller conveyor assemblies and optionally the third zone conveyor belt 33.

Control unit 50 may be configured to control only the activation/deactivation of the electric motors to allow the rotation of the rollers in the roller conveyor; alternatively, control unit 50 may be further configured to adjust the rotation speed of the electric motors to control the speed of movement of the items placed on diverging module 30.

Conveyor 1 may comprise a single diverging module 30. Alternatively, as shown in the joined figures, conveyor 1 may comprise two diverging modules 30, one for each of the converging modules.

As may be seen, for example, from FIG. 2, control unit 50 may be further connected to diverging module 30 (see connection line "a") and sensor 54 (see connection line "h"). In fact, the items are placed in bulk on the de-stratifying module 2; in this condition, it is not possible to know a priori the progress of the items on conveyor 1: thanks to control unit 50, it is possible to control the activation of each part/module (e.g., the speeds of the first and second sectors, the direction and/or speeds of rotation of the sorter rollers, the rotation of the rollers of the converging module, the rotation of the rollers of the diverging module) in order to optimize the movement of the items P being advanced on conveyor 1.

Conveyor 1 in accordance with the fourth realization form may comprise only diverging module 30. Conveyor 1 in further realization forms may comprise, in addition to diverging module 30, at least one of said de-stratifying module 2, sorter 10, and converging module 20. For example, conveyor 1 may comprise only a diverging module 30 placed downstream of a converging module 20; alternatively, conveyor 1 may comprise, placed consecutively to each other, de-stratifying module 2, sorter 10, converging module 20, and finally diverging module 30.

The diverging module 30 may also be placed upstream of each de-stratifying module 2 so that the same module may properly distribute items to module 2, for example, to increase the ability to de-stratify items.

Handling System

It is also an object of the present invention to provide a system 100 for movement P items comprising a conveyor 1 in accordance with the description above.

The handling system 100 may further comprises at least one selector switch 40 placed downstream of the diverging module 30 with respect to the advancement trajectory A of items P along said system 100. Selector switch 40 extends longitudinally between an input 40*a* and an output 40*b*: input 40*a* of selector switch 40 is directly facing output 30*b* of diverging module 30 while output 40*b* of selector switch 40 is opposite input 40*a* of the same selector switch 40. Selector switch 40 may comprises:

- at least one first zone configured to receive items moved from at least the first zone 31 of the diverging module 30 and to impart items that are in support of it an advancement mode along the advancement trajectory A from input 40*a* to output 40*b* of the selector,
- at least one second zone configured to receive the items moved by the third zone 33 of the diverging module 10 and to impart to the items resting on it an advancement motion along the advancement trajectory A from input 40*a* to output 40*b* of the selector.

Control unit 50 may also be active in command on selector switch 40 to control said first and second zones; in particular, control unit 50 is active on at least the first zone of selector switch 40 to impart a advancement motion along advancement trajectory A with a first speed profile and active on at least the second zone of selector switch 40 to impart a advancement motion along advancement trajectory A with a second speed profile independent of the first speed profile.

However, Selector 40 may comprise additional zones as shown in FIG. 9; each zone may include a speed-controlled conveyor belt from Control Unit 50. Controlling each zone by different speed profiles allows the selector to further linearize the flow of items along the advancement trajectory. For example, selector 40 may be of the type in accordance with what is described in relation to the selector module in Patent Application No. WO2014136033A1, from page 38, line 10, to page 49, line 17.

As shown in FIGS. 14 and 15, system 100 may further comprises a control module 200 placed at the output of selector 40 and configured to emit a signal representative of the position of the items exiting the selector and in particular representative of the presence of one or more overlapping items. Control module 200 may be connected to the control unit, which is configured to emit an alarm signal wherein the presence of one or more overlapping items is identified. As shown in FIGS. 14 and 15, between the selector and the control module, the system 100 may further comprises another diverging module 30 in accordance with the above.

Item Handling Process

Also forming an object of the present invention is a process for handling items, for example using a conveyor 1 and/or a system 100 in accordance with the description above.

The process involves the arrangement of a plurality of bulk items on the de-stratifying module 2, for example, at input 3*a* of the first sector 3. The first sector moves, optionally descent, at least a portion of said items to the second sector 4 (FIGS. 7A and 7B), optionally passing through the intermediate sector 60. The process may involve moving at least some of the items along the first sector 3 at a first speed which are then served to the second sector 4: P items exiting the output 3*b* of the first sector 3 are arranged at the input of the second sector 4, optionally passing through intermediate sector 60.

The second sector 4 moves, ascent, the items resting on the upper surface 6 toward the output 4*b* of said sector, at a second speed higher than the first speed: the second speed may be adjusted so that the ratio between the second and first speed is between 1.5 and 5, optionally between 2 and 4.

The second sector is configured to move one or more items outside de-stratifying module 2, for example, to serve sorter 10 (FIG. 7C).

Items are arranged on sorter 10 at input 10*a* and toward the at least one output, e.g., first and/or second output 10*b*', 10*b*".

Sorter 10 moves the items away from the de-stratifying module 2 along a main, transverse, optionally orthogonal, advancement direction imparted to the items on the de-stratifying module 2 (FIG. 7C).

The items exiting the sorter are supplied to the converging module 20 which moves at least a portion of said items P along said converging module 20 along the advancement trajectory A in the direction of output 20*b*. The items moving on the converging module 20 move along the main advancement direction transverse, optionally orthogonal, to the main advancement direction of the items P placed on sorter 10: the items resting on the converging module are moved away from sorter 10.

The sorter 10 may directly supply the output items from the sorter to input 20*a* of the converging module 20. Alternatively, the items may be moved on the at least one descent (95' or 95" descent) which connects the at least one output of the sorter with input 20*a* of the converging module 20 (FIG. 7C).

Items resting on the first and second zones 21, 22 of the converging module 20 are moved along the main advancement direction while undergoing lateral movement to the transverse centerline zone, optionally to the third zone 23.

The output items from the converging module are at least partly linearized (placed along a line) or at least partly singularized.

The process may also involve moving the output items from the converging module, onto diverging module 30 and optionally onto the selector. In detail, items exiting the output 20*b* of converging module 20 are served to input 30*a* of diverging module 30. Items resting on the first and second zones 32, 32 of the diverging module 30 are moved along the main advancement direction while undergoing lateral movement away from the transverse centerline zone (FIGS. 10A and 10B).

P items exited by the diverging module 30 may be fed into the selector 40 which moves them along at least one main advancement direction substantially parallel to the main advancement direction defined by the diverging module. The selector has a plurality of longitudinal extension zones parallel to each other that may be adjusted independently of each other according to different speed profiles. In this way, the selector is able to manage the output order of items from selector 40.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both, unless the disclosure states otherwise. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A conveyor configured to handle items comprises at least one de-stratifying module configured to move the items along an advancement trajectory, wherein said de-stratifying module includes:

at least one first sector having an upper surface configured to receive in support one or more of the items, at least one second sector having a respective upper surface configured to receive in support one or more of the items, wherein the second sector is consecutive to the first sector, with respect to a respective advancement trajectory of the second sector, at least one sorter configured to move a plurality of the items along a respective advancement trajectory of the sorter, wherein the sorter is placed consecutively to the de-stratifying module, relative to the advancement trajectory of the de-stratifying module, at least one converging module configured to move a plurality of the items along an advancement trajectory of the converging module, wherein the converging module is consecutive to the sorter, relative to the advancement trajectory of the sorter, and at least one descent connecting the sorter with the converging module, and the conveyor further comprise at least one diverging module having at least one input and at least one output, wherein the diverging module is configured to move the items from the input to the output at least along a respective advancement trajectory of the diverging module, wherein said diverging module is downstream of the converging module with respect to the advancement trajectory of the items, wherein the diverging module has at least one first and at least one second zone side-by-side one to the other, wherein the first zone of the diverging module is configured to impart to the items resting on the same according to an advancement motion having a main component parallel to a main advancement direction and a lateral component, transverse to the main component, which allows said items to be moved away from the second zone, wherein the second zone has an abut surface suitable for receiving the items, said second zone being configured to move the items resting on said second zone toward the output, at least along said main advancement direction, and wherein the second zone of the diverging module comprises at least one tilted tract at which the abut surface of said second zone is, in cross-section according to a plane orthogonal to the main advancement direction, tilted with respect to a support plane defined by the first zone.

2. The conveyor according to claim 1, wherein the sorter comprises an input and at least one output, wherein the converging module comprises at least one input and at least one output, wherein the converging module is configured to move items along the respective advancement trajectory of the converging module between said input and output, and wherein the at least one descent is placed at the at least one output of the sorter and connects the at least one output of the sorter with the input of the converging module, wherein the at least one descent comprises a plane tilted with respect to an ideal horizontal plane by an angle in a range of 30° to 70°.

3. The conveyor according to claim 1, wherein the descent comprises at least one roller having a rotation axis transverse to an advancement trajectory tract defined by the sorter, and wherein the roller of the descent is at least partially rubber coated.

4. The conveyor according to claim 3, wherein the descent comprises a consecutive tilted plane, and wherein the roller of the descent is configured to define with an item resting on said roller a friction coefficient greater than a friction coefficient definable by the same item placed on the tilted plane of the descent.

5. The conveyor according to claim 1, wherein the upper surface of the second sector is configured to define an ascent path, tilted with respect to the upper surface of the first sector.

6. The conveyor according to claim 1, wherein the second sector extends longitudinally between an input and an output, and wherein the sorter defines a support plane configured to receive in support the one or more items, wherein the support plane of the sorter is placed below the output of the second sector or is aligned with said output.

7. The conveyor according to claim 1, wherein the upper surface of the first sector is configured to define with an item disposed on said upper surface a predetermined friction coefficient lower than a predetermined friction coefficient definable between the same item and the upper surface of the second sector.

8. The conveyor according to claim 1, wherein at least one of the first sector and the second sector is configured to move an ideal point of the upper surface of the respective sector according to a reciprocating motion, during which said sector performs at least one reversal of motion.

9. The conveyor according to claim 1, wherein the first sector is configured to move an ideal point of the upper surface of said first sector at a first speed, and wherein the second sector is configured to move an ideal point on the upper surface of said second sector at a second speed higher than the first speed of the first sector.

10. The conveyor according to claim 1, comprising at least one roller arranged at the output of the second sector, wherein said roller is configured to rotate about an axis transverse to the advancement trajectory imparted by the de-stratifying module, and wherein said roller has a rubberized outer surface.

11. The conveyor according to claim 1, wherein the first sector and the second sector comprises respective conveyor belts, at least partly made of rubber, and wherein the sorter and the converging module each comprises a respective roller conveyor.

12. The conveyor according to claim 1, wherein the at least one tilted tract has, according to the main direction of advancement, a variable inclination along its extension.

13. A conveyor configured to handle items comprising:

at least one de-stratifying module configured to move a plurality of the items along an advancement trajectory of the de-stratifying module, wherein said de-stratifying module has:

at least one first sector having an upper surface configured to receive in support of one or more the items, at least one second sector having a respective upper surface configured to receiving in support of one or more of the items, wherein the second sector is consecutive to the first sector, with respect to a respective advancement trajectory, wherein the upper surface of the second sector is configured to define an ascent path, tilted with respect to the upper surface of the first sector, wherein the upper surface of the first sector is configured to define with an item disposed on said upper surface a predetermined friction coefficient lower than a predetermined friction coefficient definable between the same item and the upper surface of the second sector, wherein the second sector extends longitudinally between an input and an output, wherein the conveyor further comprises at least one roller arranged at the output of the second sector, wherein said roller is configured to rotate about an axis transverse to the advancement trajectory imparted by the de-stratifying module, and wherein said roller has a rubberized outer surface.

14. The conveyor according to claim 13, wherein the first sector is configured to move an ideal point of the upper surface of said first sector at a first speed, and wherein the second sector is configured to move an ideal point on the upper surface of said second sector at a second speed higher than the first speed of the first sector.

15. A conveyor configured to handle items comprises at least one de-stratifying module configured to move a plurality of items along an advancement trajectory, wherein the de-stratifying module includes:

a first sector having an upper surface configured to receive in support the items, a second sector having a respective upper surface configured to receive in support the items, wherein the second sector is consecutive to the first sector with respect to a respective advancement trajectory of the second sector, a sorter configured to move the items along a respective advancement trajectory of the sorter, wherein the sorter is placed consecutively to the de-stratifying module relative to an advancement trajectory of the de-stratifying module, a converging module configured to move the items along an advancement trajectory of the converging module, wherein the converging module is consecutive to the sorter relative to the advancement trajectory of the sorter, and a descent connecting the sorter with the converging module, wherein the descent comprises a roller having a rotation axis transverse to the advancement trajectory tract of the sorter, wherein the roller of the descent is at least partially rubber coated, wherein the descent comprises a consecutive tilted plane, and wherein the roller of the descent is configured to define with an item resting on said roller a friction coefficient greater than a friction coefficient definable by the same item placed on the tilted plane of the descent.

16. A conveyor configured to handle items comprises at least one de-stratifying module configured to move items along an advancement trajectory, wherein said de-stratifying module includes:

a first sector having an upper surface configured to receive in support the items, a second sector having a respective upper surface configured to receive in support the items, wherein the second sector is consecutive to the first sector, with respect to a respective advancement trajectory of the second sector, a sorter configured to move the items along a respective advancement trajectory of the sorter, wherein the sorter is placed consecutively to the de-stratifying module relative to an advancement trajectory of the de-stratifying module, a converging module configured to move the items along an advancement trajectory of the converging module, wherein the converging module is consecutive to the sorter relative to the advancement trajectory of the sorter, and a descent connecting the sorter with the converging module, wherein the conveyor further comprises a roller arranged at an output of the second sector, wherein the roller is configured to rotate about an axis transverse to the advancement trajectory of the de-stratifying module, and wherein the roller has a rubberized outer surface.

* * * * *